US012562916B2

(12) United States Patent
Krishnan et al.

(10) Patent No.: US 12,562,916 B2
(45) Date of Patent: Feb. 24, 2026

(54) PAGING SUPPORT FOR ENCRYPTED GPU BUFFERS

(71) Applicant: Intel Corporation, Santa Clara, CA (US)

(72) Inventors: Vidhya Krishnan, Folsom, CA (US); Siddhartha Chhabra, Portland, OR (US); Vedvyas Shanbhogue, Austin, TX (US); Xiaoyu Ruan, Folsom, CA (US); Aditya Navale, Folsom, CA (US); Julien Carreno, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 837 days.

(21) Appl. No.: 17/692,930

(22) Filed: Mar. 11, 2022

(65) Prior Publication Data

US 2023/0291567 A1 Sep. 14, 2023

(51) Int. Cl.
| | |
|---|---|
| *H04L 9/32* | (2006.01) |
| *G06F 12/14* | (2006.01) |
| *G06T 1/60* | (2006.01) |
| *H04L 9/08* | (2006.01) |

(52) U.S. Cl.
CPC ........ *H04L 9/3242* (2013.01); *G06F 12/1408* (2013.01); *G06T 1/60* (2013.01); *H04L 9/0877* (2013.01)

(58) Field of Classification Search
CPC . H04L 9/3242; H04L 9/0877; G06F 12/1408; G06T 1/60
See application file for complete search history.

(56) References Cited

U.S. PATENT DOCUMENTS

| | | | | |
|---|---|---|---|---|
| 11,763,041 B2 * | 9/2023 | Huang | ................ | G06F 12/1483 713/193 |
| 2019/0095334 A1 * | 3/2019 | Shanbhogue | ....... | G06F 12/1475 |
| 2019/0196982 A1 * | 6/2019 | Rozas | ..................... | G06F 3/065 |
| 2019/0227827 A1 * | 7/2019 | Zmudzinski | ............ | G06F 21/57 |
| 2021/0064546 A1 * | 3/2021 | Zmudzinski | ........ | G06F 12/1063 |
| 2021/0406199 A1 * | 12/2021 | Kounavis | .............. | G06F 12/063 |

* cited by examiner

*Primary Examiner* — Shanto Abedin
(74) *Attorney, Agent, or Firm* — Jaffery Watson Hamilton & DeSanctis LLP

(57) ABSTRACT

Described herein is a paging technique that can be implemented in any accelerator with attached memory and support for operating on encrypted data when the CPU is not within the trusted compute base (TCB). Memory storing data that is encrypted using hardware physical address (HPA)-based encrypted can be paged out of accelerator device memory by decoupling encryption from the hardware physical address and re-encrypting the data for page-out. Upon page-in, the data is decrypted, the integrity and authenticity of the data is verified, then the data is re-encrypted using HPA-based encryption.

19 Claims, 33 Drawing Sheets

PROCESSOR 200

CORE 202A

CACHE UNIT(S) 204A

CORE 202N

CACHE UNIT(S) 204N

SHARED CACHE UNIT(S) - 206

RING - 212

I/O 213

SYSTEM AGENT CORE 210

DISPLAY CONTROLLER 211

MEMORY CONTROLLER 214

BUS CONTROLLER UNIT(S) 216

GRAPHICS PROCESSOR 208

EMBEDDED MEMORY MODULE 218

*FIG. 9A*     GRAPHICS PROCESSOR COMMAND FORMAT
900

| CLIENT 902 | OPCODE 904 | SUB-OPCODE 905 | DATA 906 | COMMAND SIZE 908 |
|---|---|---|---|---|

*FIG. 9B*     GRAPHICS PROCESSOR COMMAND SEQUENCE
910

DATA PROCESSING SYSTEM
1000

Interchangeable Chiplets
1195

Base Chiplet
1196

Bridge
Interconnect
1197

Base Chiplet
1198

SOC
INTEGRATED CIRCUIT
1200

APPLICATION
PROCESSOR(s)
1205

GRAPHICS
PROCESSOR
1210

IMAGE
PROCESSOR
1215

VIDEO
PROCESSOR
1220

USB
1225

UART
1230

SPI/SDIO
1235

$I^2S/I^2C$
1240

DISPLAY
1245

SECURITY
ENGINE
1270

MEMORY
CTRL.
1265

FLASH
1260

MIPI
1255

HDMI
1250

GRAPHICS PROCESSOR
1310

1700

Determine to page out a memory page that stores HPA-encrypted data
1702

Determine if an entry is available in the current MAC page
1704

Entry Available?
1705

YES

NO

Issue Instruction to trusted HW to evict the memory page
1706

Issue instruction to trusted HW to evict the current MAC page
1708

Page out current MAC page and Initialize new MAC page
1710

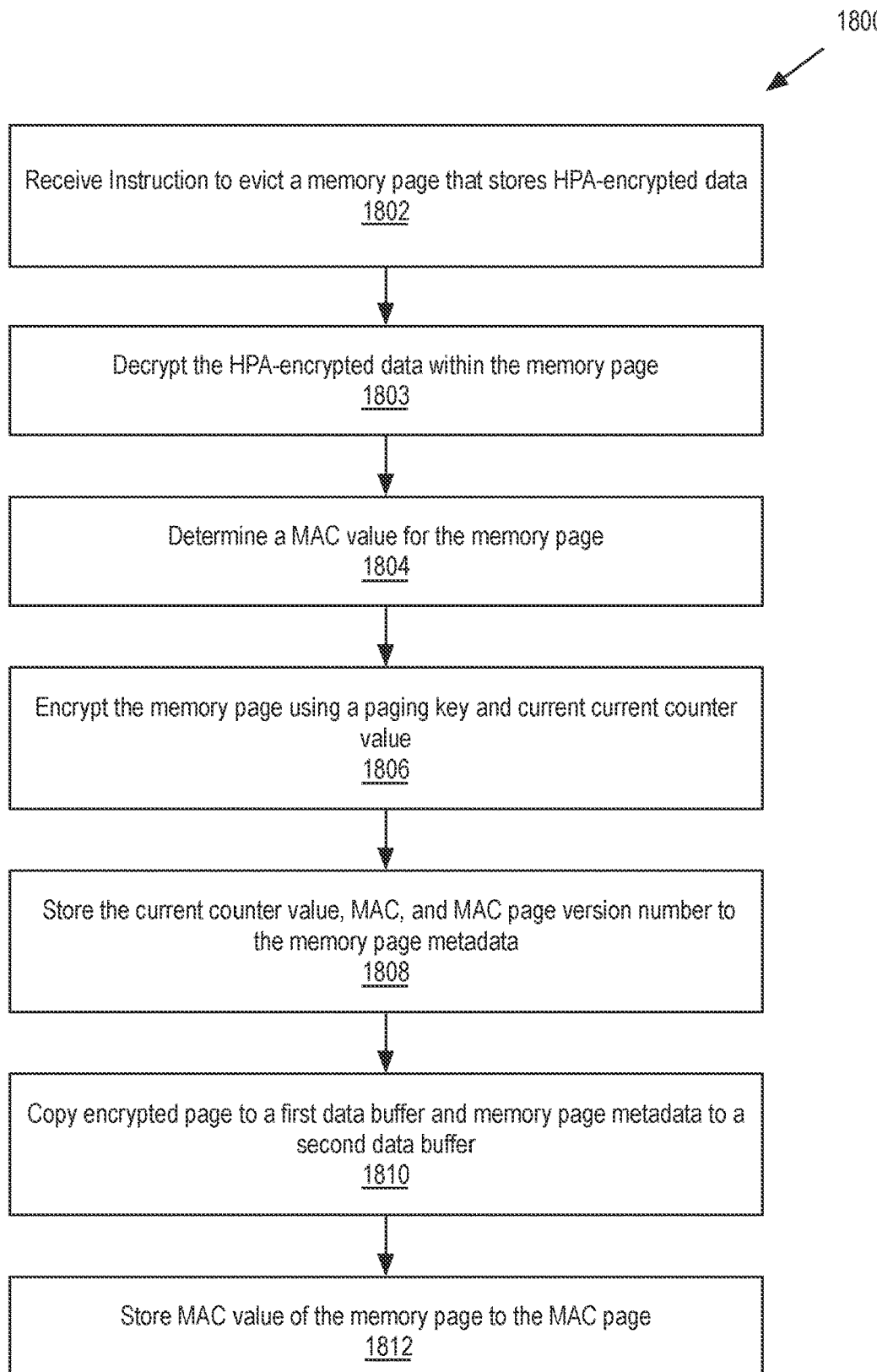

1800

Receive Instruction to evict a memory page that stores HPA-encrypted data
1802

Decrypt the HPA-encrypted data within the memory page
1803

Determine a MAC value for the memory page
1804

Encrypt the memory page using a paging key and current current counter value
1806

Store the current counter value, MAC, and MAC page version number to the memory page metadata
1808

Copy encrypted page to a first data buffer and memory page metadata to a second data buffer
1810

Store MAC value of the memory page to the MAC page
1812

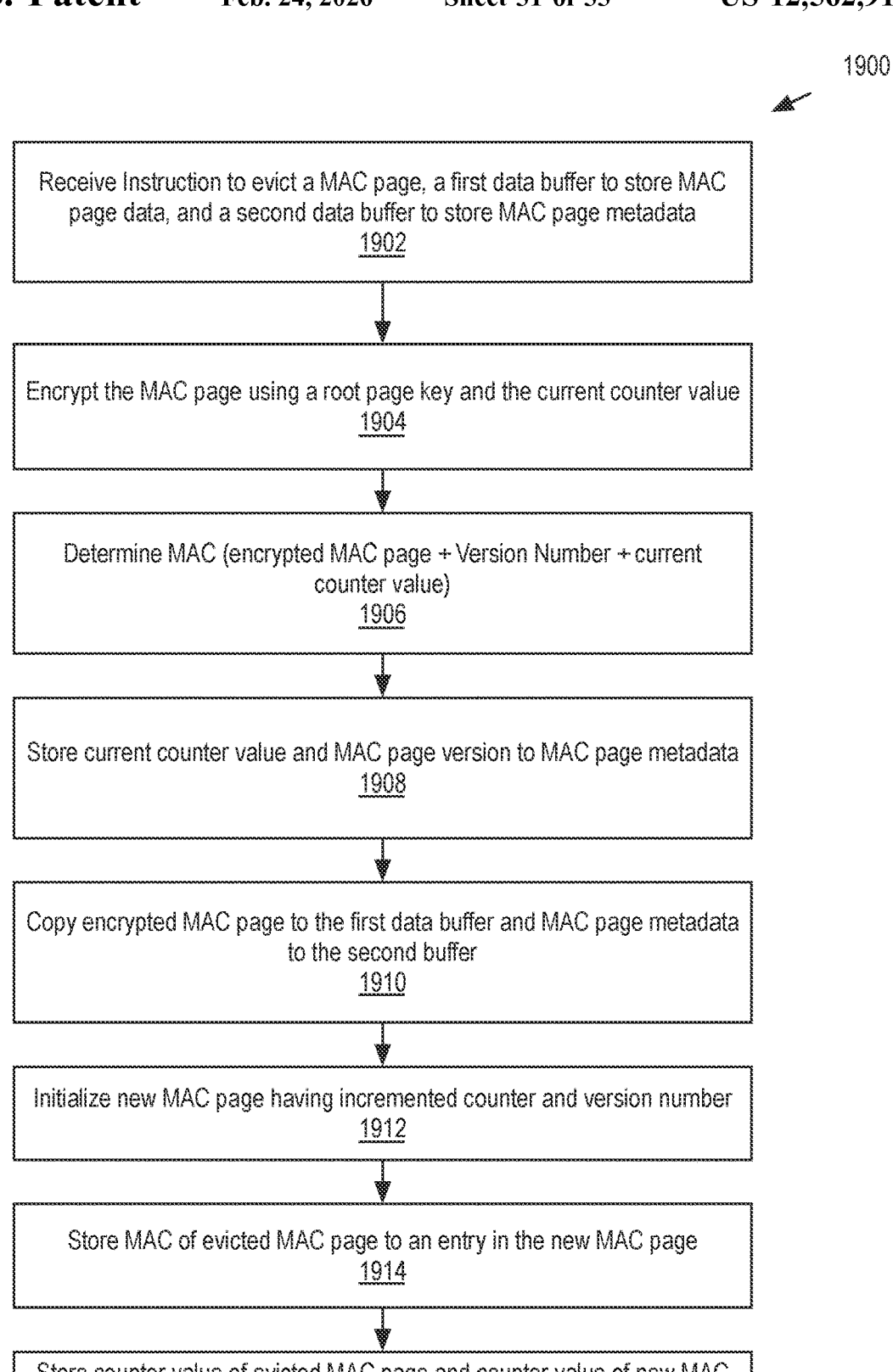

Receive Instruction to evict a MAC page, a first data buffer to store MAC page data, and a second data buffer to store MAC page metadata
1902

Encrypt the MAC page using a root page key and the current counter value
1904

Determine MAC (encrypted MAC page + Version Number + current counter value)
1906

Store current counter value and MAC page version to MAC page metadata
1908

Copy encrypted MAC page to the first data buffer and MAC page metadata to the second buffer
1910

Initialize new MAC page having incremented counter and version number
1912

Store MAC of evicted MAC page to an entry in the new MAC page
1914

Store counter value of evicted MAC page and counter value of new MAC page to an entry in the new MAC page
1916

*FIG. 19*

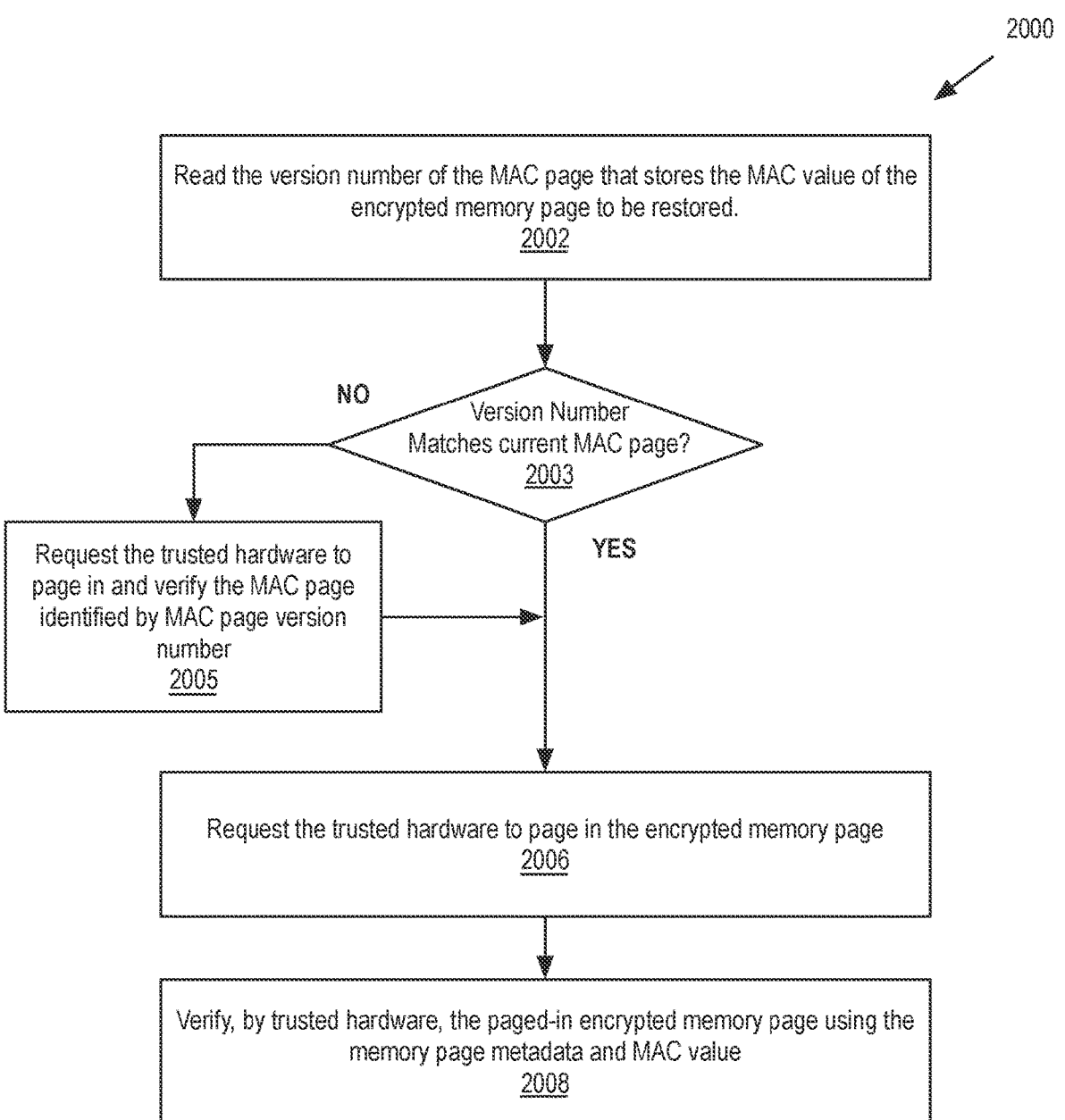

2000

Read the version number of the MAC page that stores the MAC value of the encrypted memory page to be restored.
2002

Version Number Matches current MAC page?
2003

NO

YES

Request the trusted hardware to page in and verify the MAC page identified by MAC page version number
2005

Request the trusted hardware to page in the encrypted memory page
2006

Verify, by trusted hardware, the paged-in encrypted memory page using the memory page metadata and MAC value
2008

FIG. 20

PAGING SUPPORT FOR ENCRYPTED GPU BUFFERS

FIELD

Embodiments described herein generally relate to computing systems. More particularly, embodiments are described to enable paging support for AES XTS encrypted GPU buffers when CPU is not within the trusted compute base of the computing system.

BACKGROUND OF THE DISCLOSURE

Accelerators with attached memory can store encrypted data. For example, accelerator devices can include support for data that is encrypted using the Advanced Encryption Standard (AES), including the AES XEX Tweakable Block Ciphertext Stealing (XTS) mode, which uses an encryption key as well as a tweakable key (e.g., tweak). In some implementations, the hardware physical address (HPA) of a stored block of data is used as the tweak when encrypting such data via AES XTS. This encryption mechanism is used in use cases such as, for example, playback of media that is protected via digital rights management (DRM) encryption. Using the HPA as a tweak limits the ability to decrypt encrypted data once the data is copied to a different physical address than the address for which is encrypted. However, such data cannot be paged out of the device memory of the accelerator, as there is no guarantee that the data will be paged back into the original physical address. Accordingly, many accelerator devices will disable paging entirely for buffers that are encrypted using AES XTS with HPA-based encryption.

BRIEF DESCRIPTION OF THE DRAWINGS

The present invention is illustrated by way of example and not limitation in the figures of the accompanying drawings in which like references indicate similar elements, and in which:

FIG. 11A-11D illustrate an integrated circuit package assembly, according to an embodiment;

FIG. 18 illustrates a method to evict a memory page during page migration, according to an embodiment;

FIG. 19 illustrates a method to evict a MAC page during page migration, according to an embodiment;

FIG. 20 illustrates a method to restore a memory page and an associated MAC page during page migration, according to an embodiment.

DETAILED DESCRIPTION

A graphics processing unit (GPU) is communicatively coupled to host/processor cores to accelerate, for example, graphics operations, machine-learning operations, pattern analysis operations, and/or various general-purpose GPU (GPGPU) functions. The GPU may be communicatively coupled to the host processor/cores over a bus or another interconnect (e.g., a high-speed interconnect such as Peripheral Component Interconnect Express (PCIe) or NVLink). Alternatively, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

The processes depicted in the figures that follow can be performed by processing logic that comprises hardware (e.g., circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Described herein is a paging technique that can be implemented in any accelerator with attached memory and support for operating on encrypted data when the CPU is not within the trusted compute base (TCB). In one embodiment, the accelerator device includes a hardware paging engine that allows the paging of encrypted memory into a special paging crypto domain that maintains security of data while decoupling encryption of paged out data from the use of a hardware paging address as an encryption tweak.

System Overview

Figure 1:
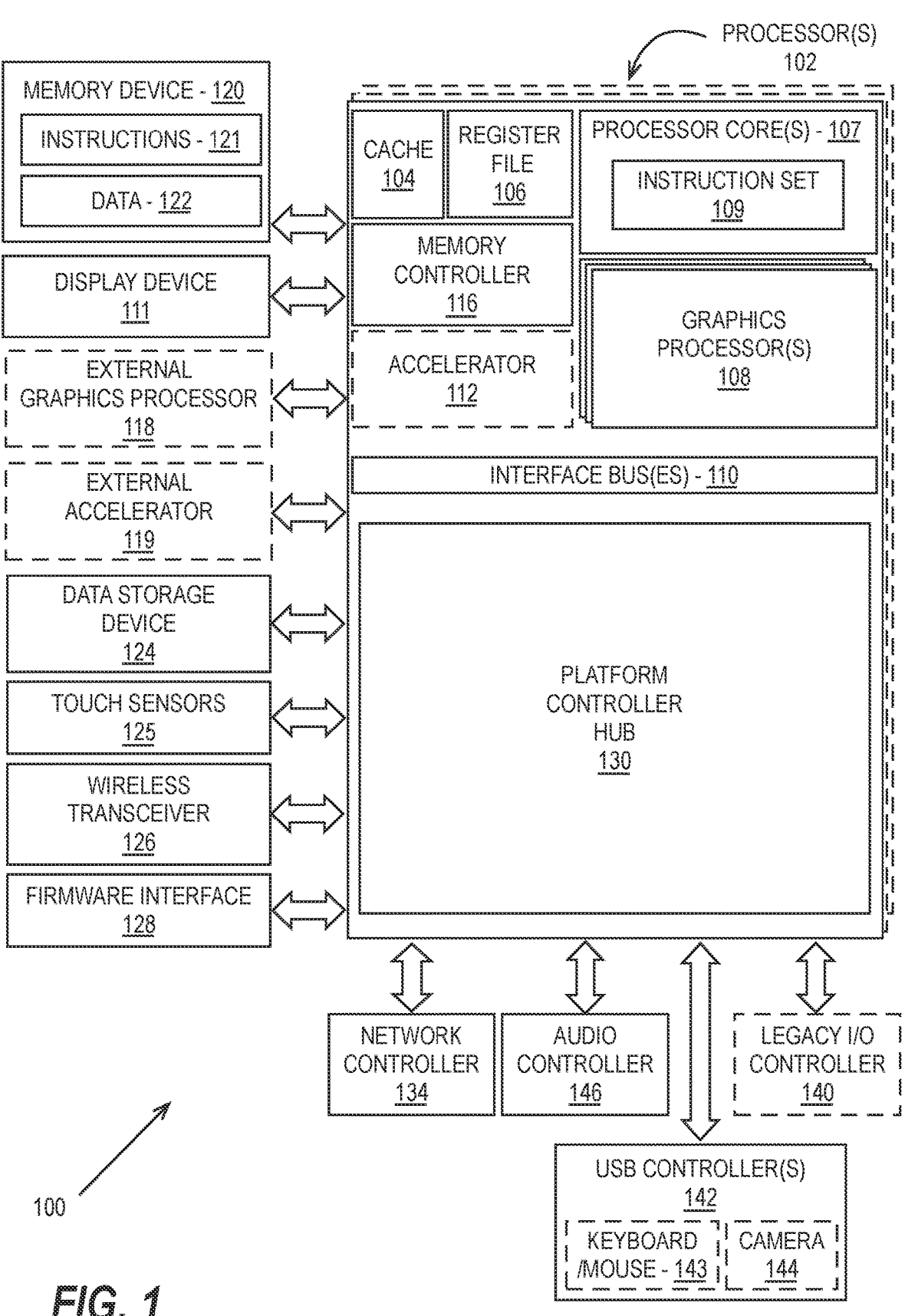
FIG. 1 is a block diagram of a processing system, according to an embodiment.

FIG. 1 is a block diagram of a processing system 100, according to an embodiment. Processing system 100 may be used in a single processor desktop system, a multiprocessor workstation system, or a server system having a large number of processors 102 or processor cores 107. In one embodiment, the processing system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, processing system 100 can include, couple with, or be integrated within: a server-based gaming platform; a game console, including a game and media console; a mobile gaming console, a handheld game console, or an online game console. In some embodiments the processing system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, processing system 100 can include, couple with, or be integrated within a self-driving vehicle such as a bus, tractor trailer, car, motor or electric power cycle, plane, or glider (or any combination thereof). The self-driving vehicle may use processing system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the processing system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include a memory controller 116 and a platform controller hub 130. The memory controller 116 facilitates communication between a memory device and other components of the processing system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the processing system 100, to store data 122 and instructions 121 for use when the one or more processors 102 executes an application or process. The memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high-definition audio controller. In one embodiment the processing system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the processing system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102 and reside in a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to processing system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIGS. 2A-2D illustrate computing systems and graphics processors provided by embodiments described herein. The elements of FIGS. 2A-2D having the same reference numbers (or names) as the elements of any other figure herein can operate or function in any manner similar to that described elsewhere herein, but are not limited to such.

Figure 2A:
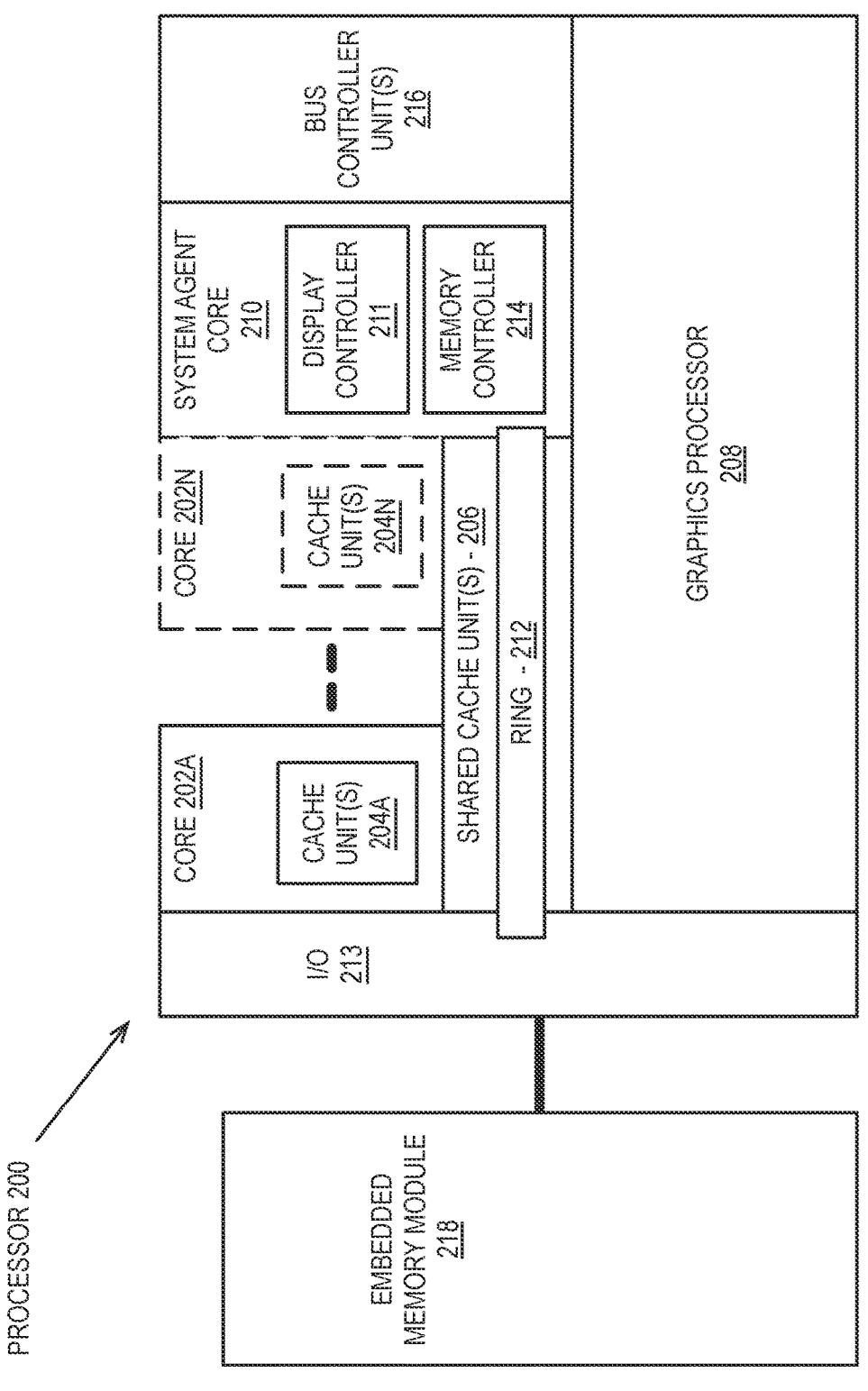
FIG. 2A-2D illustrate computing systems and graphics processors provided by embodiments described herein.

FIG. 2A is a block diagram of an embodiment of a processor 200 having one or more processor cores 202A-202N, an integrated memory controller 214, and an integrated graphics processor 208. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect or may be integrated within the graphics processor 208.

In some embodiments, a ring-based interconnect 212 is used to couple the internal components of the processor 200. However, an alternative interconnect unit may be used, such as a point-to-point interconnect, a switched interconnect, a mesh interconnect, or other techniques, including techniques well known in the art. In some embodiments, graphics processor 208 couples with the ring-based interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module or a high-bandwidth memory (HBM) module. In some embodiments, each of the processor cores 202A-202N and graphics processor 208 can use the embedded memory module 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment, processor cores 202A-202N are heterogeneous in terms of microarchitecture, where one or more cores having a relatively higher power consumption couple with one or more power cores having a lower power consumption. In one embodiment, processor cores 202A-202N are heterogeneous in terms of computational capability. Additionally, processor 200 can be implemented on one or more chips or as an SoC integrated circuit having the illustrated components, in addition to other components.

Figure 2B:
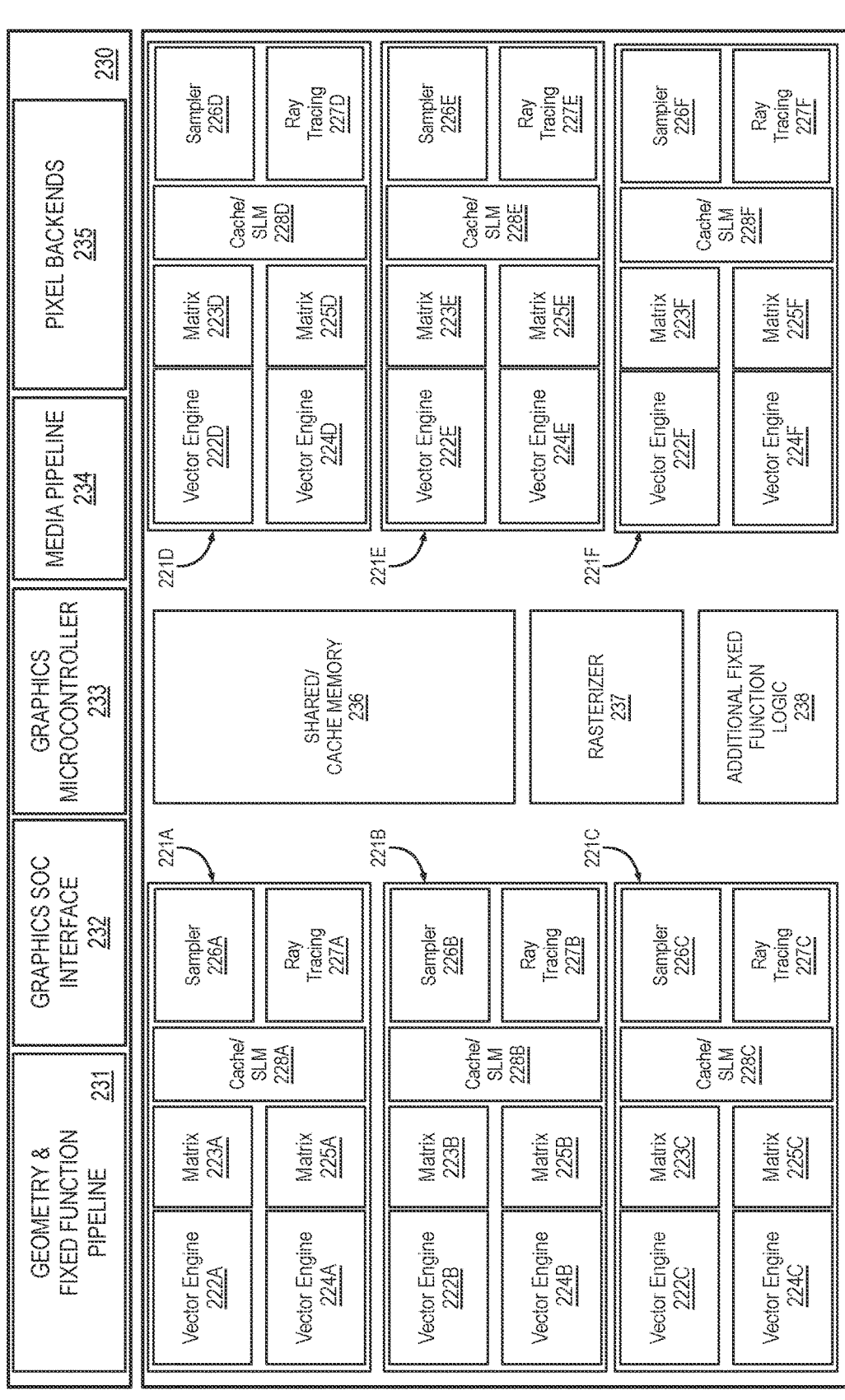

FIG. 2B is a block diagram of hardware logic of a graphics processor core block 219, according to some embodiments described herein. In some embodiments, elements of FIG. 2B having the same reference numbers (or names) as the elements of any other figure herein may operate or function in a manner similar to that described elsewhere herein. The graphics processor core block 219 is exemplary of one partition of a graphics processor. The graphics processor core block 219 can be included within the integrated graphics processor 208 of FIG. 2A or a discrete graphics processor, parallel processor, and/or compute accelerator. A graphics processor as described herein may include multiple graphics core blocks based on target power and performance envelopes. Each graphics processor core block 219 can include a function block 230 coupled with multiple graphics cores 221A-221F that include modular blocks of fixed function logic and general-purpose programmable logic. The graphics processor core block 219 also includes shared/cache memory 236 that is accessible by all graphics cores 221A-221F, rasterizer logic 237, and additional fixed function logic 238.

In some embodiments, the function block 230 includes a geometry/fixed function pipeline 231 that can be shared by all graphics cores in the graphics processor core block 219. In various embodiments, the geometry/fixed function pipeline 231 includes a 3D geometry pipeline a video front-end unit, a thread spawner and global thread dispatcher, and a unified return buffer manager, which manages unified return buffers. In one embodiment the function block 230 also includes a graphics SoC interface 232, a graphics microcontroller 233, and a media pipeline 234. The graphics SoC interface 232 provides an interface between the graphics processor core block 219 and other core blocks within a graphics processor or compute accelerator SoC. The graphics microcontroller 233 is a programmable sub-processor that is configurable to manage various functions of the graphics processor core block 219, including thread dispatch, scheduling, and pre-emption. The media pipeline 234 includes logic to facilitate the decoding, encoding, pre-processing, and/or post-processing of multimedia data, including image and video data. The media pipeline 234 implement media operations via requests to compute or sampling logic within the graphics cores 221-221F. One or more pixel backends 235 can also be included within the function block 230. The pixel backends 235 include a cache memory to store pixel color values and can perform blend operations and lossless color compression of rendered pixel data.

In one embodiment the graphics SoC interface 232 enables the graphics processor core block 219 to communicate with general-purpose application processor cores (e.g., CPUs) and/or other components within an SoC or a system host CPU that is coupled with the SoC via a peripheral interface. The graphics SoC interface 232 also enables communication with off-chip memory hierarchy elements such as a shared last level cache memory, system RAM, and/or embedded on-chip or on-package DRAM. The SoC interface 232 can also enable communication with fixed function devices within the SoC, such as camera imaging pipelines, and enables the use of and/or implements global memory atomics that may be shared between the graphics processor core block 219 and CPUs within the SoC. The graphics SoC interface 232 can also implement power management controls for the graphics processor core block 219 and enable an interface between a clock domain of the graphics processor core block 219 and other clock domains within the SoC. In one embodiment the graphics SoC interface 232 enables receipt of command buffers from a command streamer and global thread dispatcher that are configured to provide commands and instructions to each of one or more graphics cores within a graphics processor. The commands and instructions can be dispatched to the media pipeline 234 when media operations are to be performed, the geometry and fixed function pipeline 231 when graphics processing operations are to be performed. When compute operations are to be performed, compute dispatch logic can dispatch the commands to the graphics cores 221A-221F, bypassing the geometry and media pipelines.

The graphics microcontroller 233 can be configured to perform various scheduling and management tasks for the graphics processor core block 219. In one embodiment the graphics microcontroller 233 can perform graphics and/or compute workload scheduling on the various vector engines 222A-222F, 224A-224F and matrix engines 223A-223F, 225A-225F within the graphics cores 221A-221F. In this scheduling model, host software executing on a CPU core of an SoC including the graphics processor core block 219 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 233 can also facilitate low-power or idle states for the graphics processor core block 219, providing the graphics processor core block 219 with the ability to save and restore registers within the graphics processor core block 219 across low-power state transitions independently from the operating system and/or graphics driver software on the system.

The graphics processor core block 219 may have greater than or fewer than the illustrated graphics cores 221A-221F, up to N modular graphics cores. For each set of N graphics cores, the graphics processor core block 219 can also include shared/cache memory 236, which can be configured as shared memory or cache memory, rasterizer logic 237, and additional fixed function logic 238 to accelerate various graphics and compute processing operations.

Within each graphics cores 221A-221F is set of execution resources that may be used to perform graphics, media, and compute operations in response to requests by graphics pipeline, media pipeline, or shader programs. The graphics cores 221A-221F include multiple vector engines 222A-222F, 224A-224F, matrix acceleration units 223A-223F, 225A-225D, cache/shared local memory (SLM), a sampler 226A-226F, and a ray tracing unit 227A-227F.

The vector engines 222A-222F, 224A-224F are general-purpose graphics processing units capable of performing floating-point and integer/fixed-point logic operations in service of a graphics, media, or compute operation, including graphics, media, or compute/GPGPU programs. The vector engines 222A-222F, 224A-224F can operate at variable vector widths using SIMD, SIMT, or SIMT+SIMD execution modes. The matrix acceleration units 223A-223F, 225A-225D include matrix-matrix and matrix-vector acceleration logic that improves performance on matrix operations, particularly low and mixed precision (e.g., INT8, FP16, BF16) matrix operations used for machine learning. In one embodiment, each of the matrix acceleration units 223A-223F, 225A-225D includes one or more systolic arrays of processing elements that can perform concurrent matrix multiply or dot product operations on matrix elements.

The sampler 225A-225F can read media or texture data into memory and can sample data differently based on a configured sampler state and the texture/media format that is being read. Threads executing on the vector engines 222A-222F, 224A-224F or matrix acceleration units 223A-223F, 225A-225D can make use of the cache/SLM 228A-228F within each execution core. The cache/SLM 228A-228F can be configured as cache memory or as a pool of shared memory that is local to each of the respective graphics cores 221A-221F. The ray tracing units 227A-227F within the graphics cores 221A-221F include ray traversal/intersection circuitry for performing ray traversal using bounding volume hierarchies (BVHs) and identifying intersections between rays and primitives enclosed within the BVH volumes. In one embodiment the ray tracing units 227A-227F include circuitry for performing depth testing and culling (e.g., using a depth buffer or similar arrangement). In one implementation, the ray tracing units 227A-227F perform traversal and intersection operations in concert with image denoising, at least a portion of which may be performed using an associated matrix acceleration unit 223A-223F, 225A-225D.

Figure 2C:
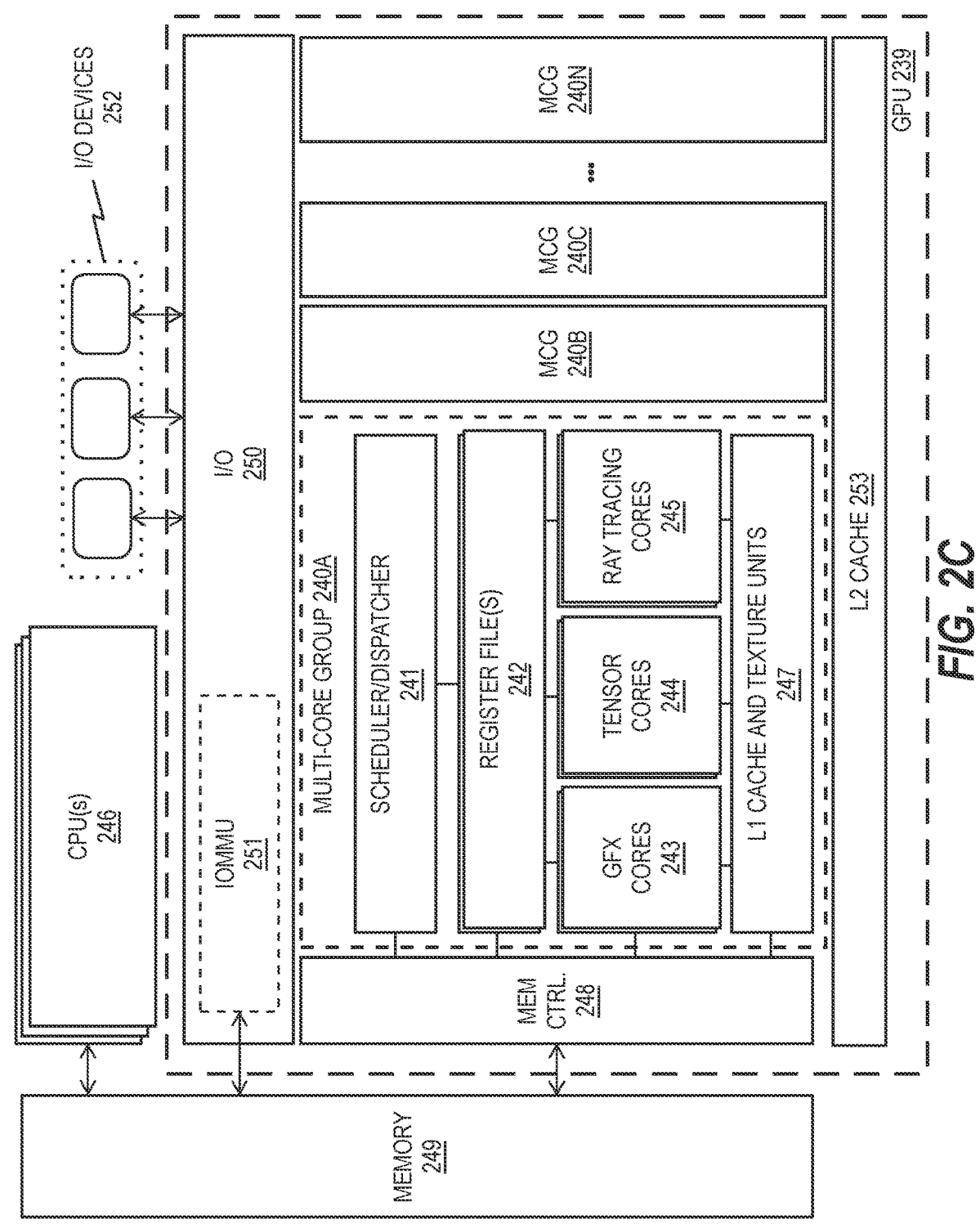

FIG. 2C illustrates a graphics processing unit (GPU) 239 that includes dedicated sets of graphics processing resources arranged into multi-core groups 240A-240N. The details of multi-core group 240A are illustrated. Multi-core groups 240B-240N may be equipped with the same or similar sets of graphics processing resources.

As illustrated, a multi-core group 240A may include a set of graphics cores 243, a set of tensor cores 244, and a set of ray tracing cores 245. A scheduler/dispatcher 241 schedules and dispatches the graphics threads for execution on the various cores 243, 244, 245. In one embodiment the tensor cores 244 are sparse tensor cores with hardware to enable multiplication operations having a zero-value input to be bypassed. The graphics cores 243 of the GPU 239 of FIG.

2C differ in hierarchical abstraction level relative to the graphics cores 221A-221F of FIG. 2B, which are analogous to the multi-core groups 240A-240N of FIG. 2C. The graphics cores 243, tensor cores 244, and ray tracing cores 245 of FIG. 2C are analogous to, respectively, the vector engines 222A-222F, 224A-224F, matrix engines 223A-223F, 225A-225F, and ray tracing units 227A-227F of FIG. 2B.

A set of register files 242 can store operand values used by the cores 243, 244, 245 when executing the graphics threads. These may include, for example, integer registers for storing integer values, floating point registers for storing floating point values, vector registers for storing packed data elements (integer and/or floating-point data elements) and tile registers for storing tensor/matrix values. In one embodiment, the tile registers are implemented as combined sets of vector registers.

One or more combined level 1 (L1) caches and shared memory units 247 store graphics data such as texture data, vertex data, pixel data, ray data, bounding volume data, etc., locally within each multi-core group 240A. One or more texture units 247 can also be used to perform texturing operations, such as texture mapping and sampling. A Level 2 (L2) cache 253 shared by all or a subset of the multi-core groups 240A-240N stores graphics data and/or instructions for multiple concurrent graphics threads. As illustrated, the L2 cache 253 may be shared across a plurality of multi-core groups 240A-240N. One or more memory controllers 248 couple the GPU 239 to a memory 249 which may be a system memory (e.g., DRAM) and/or a dedicated graphics memory (e.g., GDDR6 memory).

Input/output (I/O) circuitry 250 couples the GPU 239 to one or more I/O devices 252 such as digital signal processors (DSPs), network controllers, or user input devices. An on-chip interconnect may be used to couple the I/O devices 252 to the GPU 239 and memory 249. One or more I/O memory management units (IOMMUs) 251 of the I/O circuitry 250 couple the I/O devices 252 directly to the memory 249. In one embodiment, the IOMMU 251 manages multiple sets of page tables to map virtual addresses to physical addresses in memory 249. In this embodiment, the I/O devices 252, CPU(s) 246, and GPU 239 may share the same virtual address space.

In one implementation, the IOMMU 251 supports virtualization. In this case, it may manage a first set of page tables to map guest/graphics virtual addresses to guest/graphics physical addresses and a second set of page tables to map the guest/graphics physical addresses to system/host physical addresses (e.g., within memory 249). The base addresses of each of the first and second sets of page tables may be stored in control registers and swapped out on a context switch (e.g., so that the new context is provided with access to the relevant set of page tables). While not illustrated in FIG. 2C, each of the cores 243, 244, 245 and/or multi-core groups 240A-240N may include translation lookaside buffers (TLBs) to cache guest virtual to guest physical translations, guest physical to host physical translations, and guest virtual to host physical translations.

In one embodiment, the CPUs 246, GPU 239, and I/O devices 252 are integrated on a single semiconductor chip and/or chip package. The memory 249 may be integrated on the same chip or may be coupled to the memory controllers 248 via an off-chip interface. In one implementation, the memory 249 comprises GDDR6 memory which shares the same virtual address space as other physical system-level memories, although the underlying principles of the embodiments described herein are not limited to this specific implementation.

In one embodiment, the tensor cores 244 include a plurality of functional units specifically designed to perform matrix operations, which are the fundamental compute operation used to perform deep learning operations. For example, simultaneous matrix multiplication operations may be used for neural network training and inferencing. The tensor cores 244 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 244. The training of neural networks, in particular, requires a significant number of matrix dot product operations. In order to process an inner-product formulation of an N×N×N matrix multiply, the tensor cores 244 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 244 to ensure that the most efficient precision is used for different workloads (e.g., such as inferencing workloads which can tolerate quantization to bytes and half-bytes).

In one embodiment, the ray tracing cores 245 accelerate ray tracing operations for both real-time ray tracing and non-real-time ray tracing implementations. In particular, the ray tracing cores 245 include ray traversal/intersection circuitry for performing ray traversal using bounding volume hierarchies (BVHs) and identifying intersections between rays and primitives enclosed within the BVH volumes. The ray tracing cores 245 may also include circuitry for performing depth testing and culling (e.g., using a Z buffer or similar arrangement). In one implementation, the ray tracing cores 245 perform traversal and intersection operations in concert with the image denoising techniques described herein, at least a portion of which may be executed on the tensor cores 244. For example, in one embodiment, the tensor cores 244 implement a deep learning neural network to perform denoising of frames generated by the ray tracing cores 245. However, the CPU(s) 246, graphics cores 243, and/or ray tracing cores 245 may also implement all or a portion of the denoising and/or deep learning algorithms.

In addition, as described above, a distributed approach to denoising may be employed in which the GPU 239 is in a computing device coupled to other computing devices over a network or high-speed interconnect. In this embodiment, the interconnected computing devices share neural network learning/training data to improve the speed with which the overall system learns to perform denoising for different types of image frames and/or different graphics applications.

In one embodiment, the ray tracing cores 245 process all BVH traversal and ray-primitive intersections, saving the graphics cores 243 from being overloaded with thousands of instructions per ray. In one embodiment, each ray tracing core 245 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 240A can simply launch a ray probe, and the ray tracing cores 245 independently perform ray traversal and intersection and return hit data (e.g., a hit, no hit, multiple hits, etc.) to the thread context. The other cores 243, 244 are freed to perform other graphics or compute work while the ray tracing cores 245 perform the traversal and intersection operations.

In one embodiment, each ray tracing core 245 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 243 and tensor cores 244) are freed to perform other forms of graphics work.

In one particular embodiment described below, a hybrid rasterization/ray tracing approach is used in which work is distributed between the graphics cores 243 and ray tracing cores 245.

In one embodiment, the ray tracing cores 245 (and/or other cores 243, 244) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 245, graphics cores 243 and tensor cores 244 is Vulkan 1.1.85. Note, however, that the underlying principles of the embodiments described herein are not limited to any particular ray tracing ISA.

In general, the various cores 245, 244, 243 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the child volumes a ray will traverse.

Exceptions—Includes various types of exception handlers (e.g., invoked for various error conditions).

In one embodiment the ray tracing cores 245 may be adapted to accelerate general-purpose compute operations that can be accelerated using computational techniques that are analogous to ray intersection tests. A compute framework can be provided that enables shader programs to be compiled into low level instructions and/or primitives that perform general-purpose compute operations via the ray tracing cores. Exemplary computational problems that can benefit from compute operations performed on the ray tracing cores 245 include computations involving beam, wave, ray, or particle propagation within a coordinate space. Interactions associated with that propagation can be computed relative to a geometry or mesh within the coordinate space. For example, computations associated with electromagnetic signal propagation through an environment can be accelerated via the use of instructions or primitives that are executed via the ray tracing cores. Diffraction and reflection of the signals by objects in the environment can be computed as direct ray-tracing analogies.

Ray tracing cores 245 can also be used to perform computations that are not directly analogous to ray tracing. For example, mesh projection, mesh refinement, and volume sampling computations can be accelerated using the ray tracing cores 245. Generic coordinate space calculations, such as nearest neighbor calculations can also be performed. For example, the set of points near a given point can be discovered by defining a bounding box in the coordinate space around the point. BVH and ray probe logic within the ray tracing cores 245 can then be used to determine the set of point intersections within the bounding box. The intersections constitute the origin point and the nearest neighbors to that origin point. Computations that are performed using the ray tracing cores 245 can be performed in parallel with computations performed on the graphics cores 243 and tensor cores 244. A shader compiler can be configured to compile a compute shader or other general-purpose graphics processing program into low level primitives that can be parallelized across the graphics cores 243, tensor cores 244, and ray tracing cores 245.

Figure 2D:
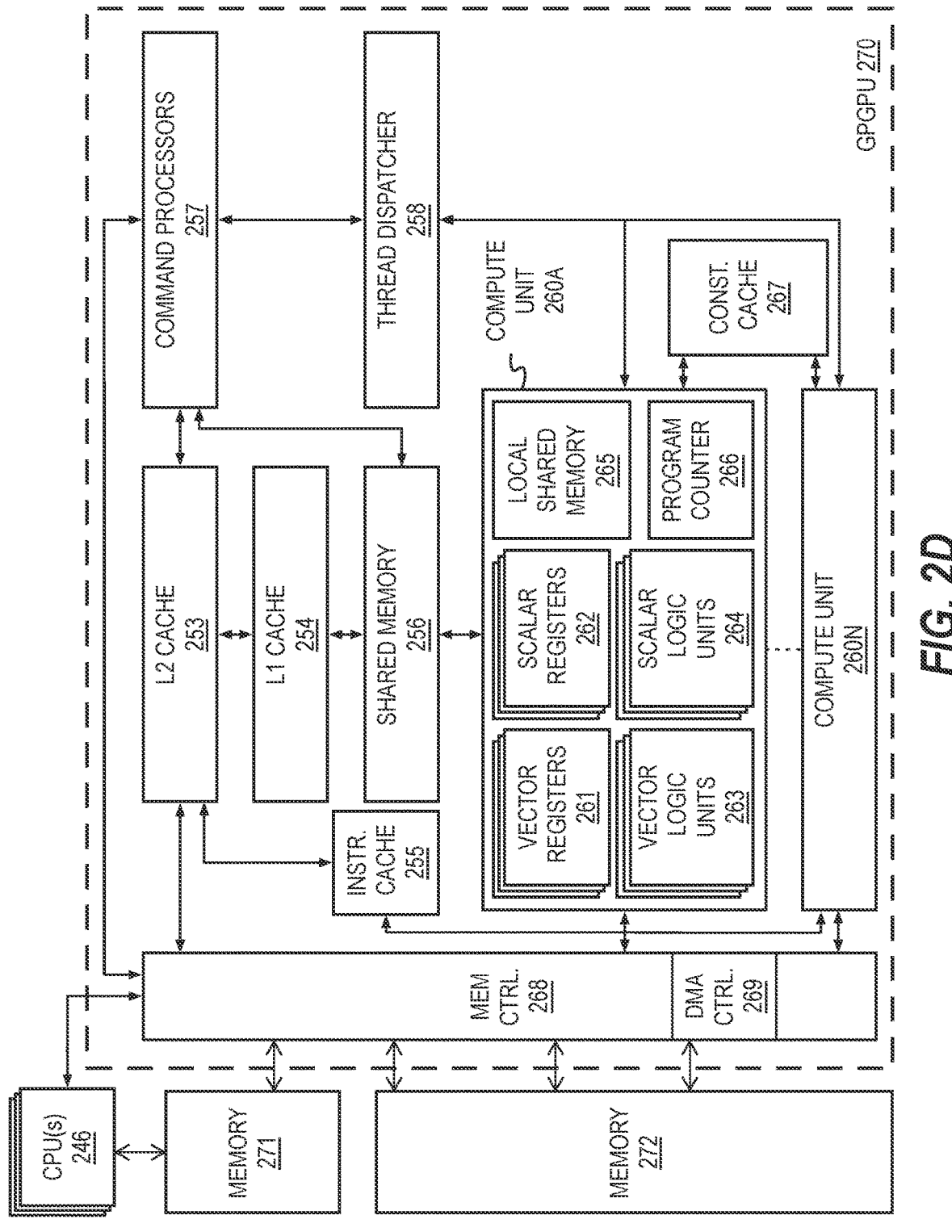

FIG. 2D is a block diagram of general-purpose graphics processing unit (GPGPU) 270 that can be configured as a graphics processor and/or compute accelerator, according to embodiments described herein. The GPGPU 270 can interconnect with host processors (e.g., one or more CPU(s) 246) and memory 271, 272 via one or more system and/or memory busses. In one embodiment the memory 271 is system memory that may be shared with the one or more CPU(s) 246, while memory 272 is device memory that is dedicated to the GPGPU 270. In one embodiment, components within the GPGPU 270 and memory 272 may be mapped into memory addresses that are accessible to the one or more CPU(s) 246. Access to memory 271 and 272 may be facilitated via a memory controller 268. In one embodiment the memory controller 268 includes an internal direct memory access (DMA) controller 269 or can include logic to perform operations that would otherwise be performed by a DMA controller.

The GPGPU 270 includes multiple cache memories, including an L2 cache 253, L1 cache 254, an instruction cache 255, and shared memory 256, at least a portion of which may also be partitioned as a cache memory. The GPGPU 270 also includes multiple compute units 260A-260N, which represent a hierarchical abstraction level analogous to the graphics cores 221A-221F of FIG. 2B and the multi-core groups 240A-240N of FIG. 2C. Each compute unit 260A-260N includes a set of vector registers 261, scalar registers 262, vector logic units 263, and scalar logic units 264. The compute units 260A-260N can also include local shared memory 265 and a program counter 266. The compute units 260A-260N can couple with a constant cache 267, which can be used to store constant data, which is data that will not change during the run of kernel or shader program that executes on the GPGPU 270. In one embodiment the constant cache 267 is a scalar data cache and cached data can be fetched directly into the scalar registers 262.

During operation, the one or more CPU(s) 246 can write commands into registers or memory in the GPGPU 270 that has been mapped into an accessible address space. The command processors 257 can read the commands from registers or memory and determine how those commands will be processed within the GPGPU 270. A thread dispatcher 258 can then be used to dispatch threads to the compute units 260A-260N to perform those commands. Each compute unit 260A-260N can execute threads independently of the other compute units. Additionally, each compute unit 260A-260N can be independently configured for conditional computation and can conditionally output the results of computation to memory. The command processors 257 can interrupt the one or more CPU(s) 246 when the submitted commands are complete.

Figure 3A:
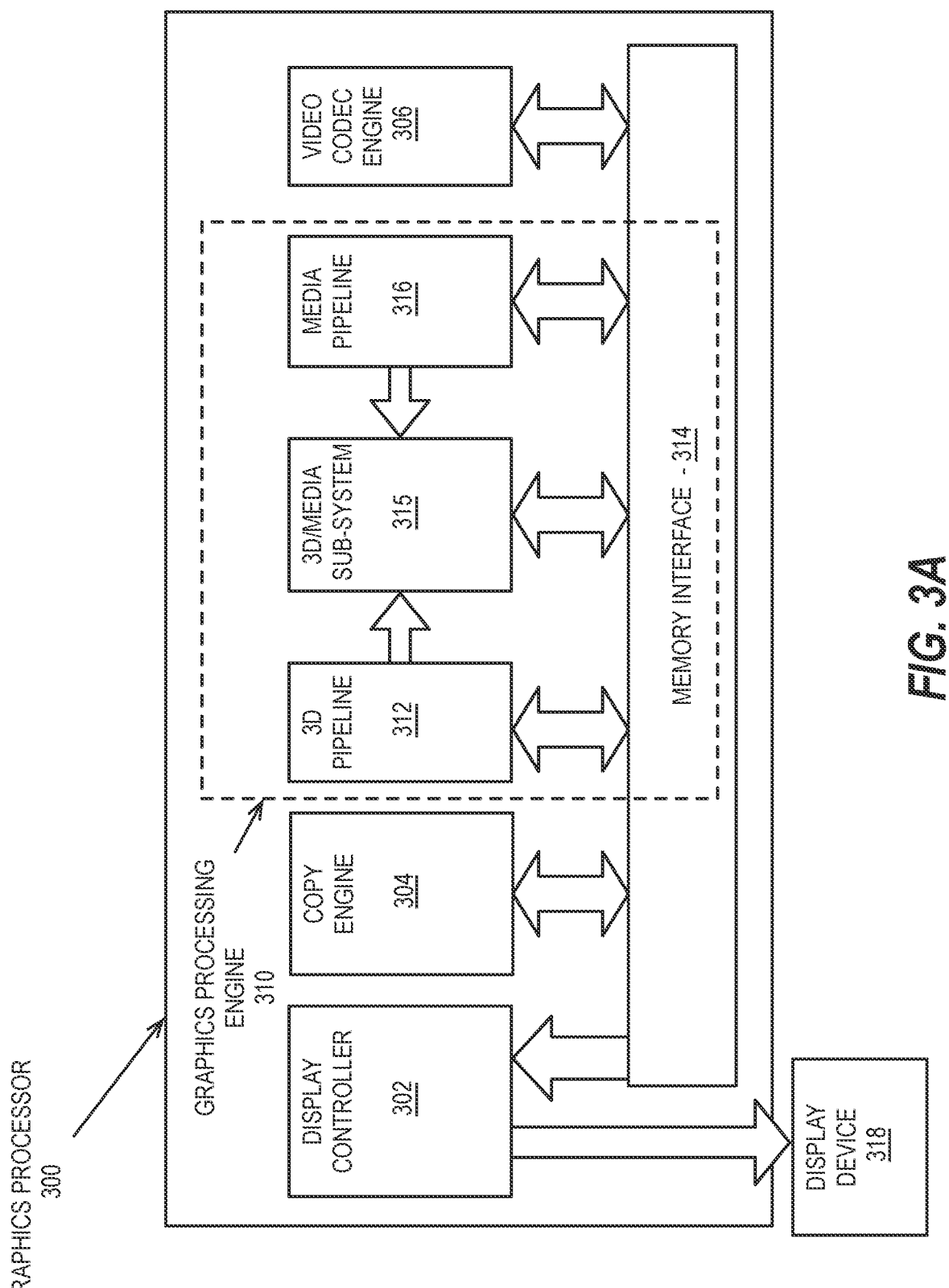
FIG. 3A-3C illustrate block diagrams of additional graphics processor and compute accelerator architectures provided by embodiments described herein.
Figure 3B:
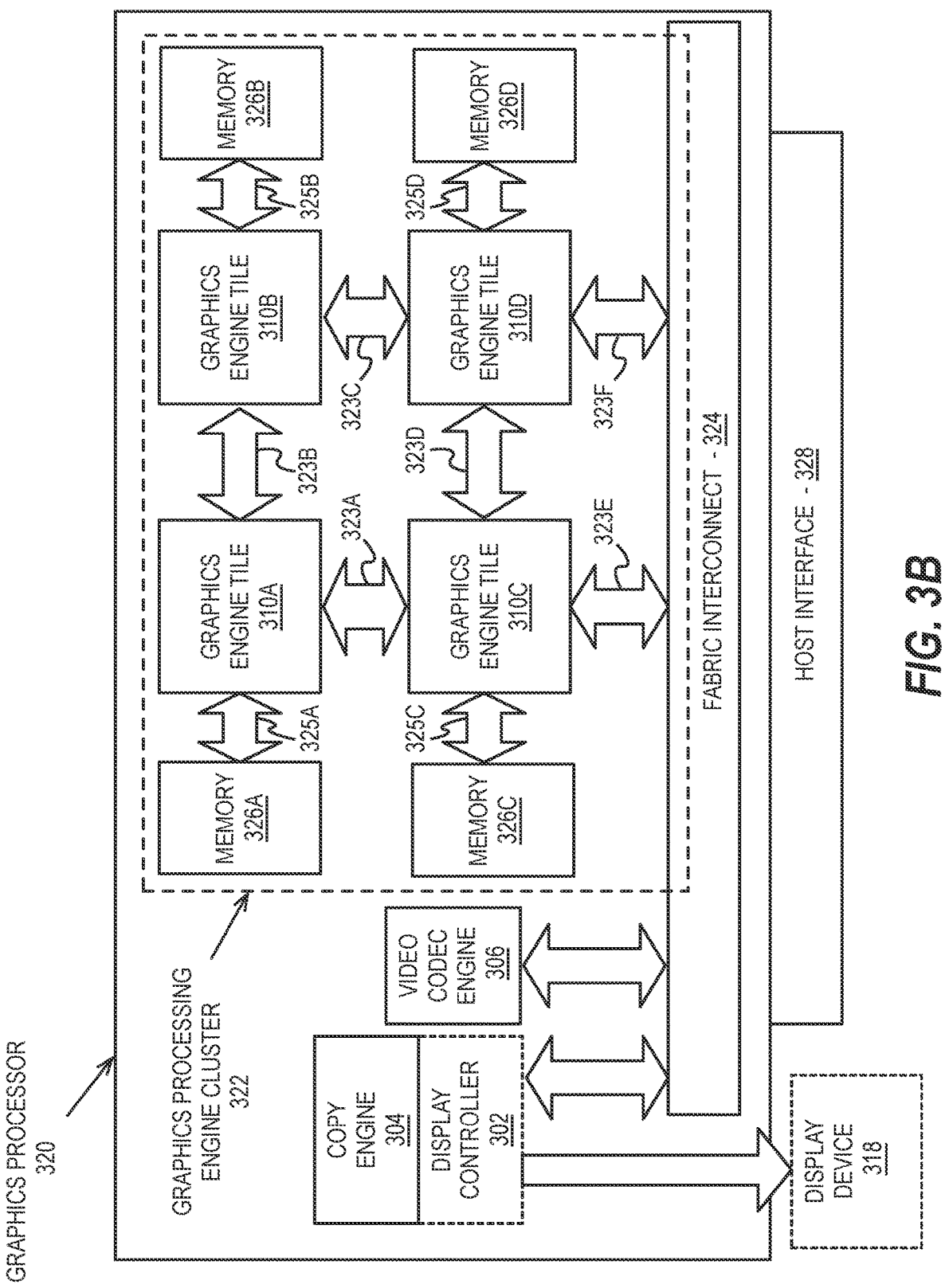
Figure 3C:
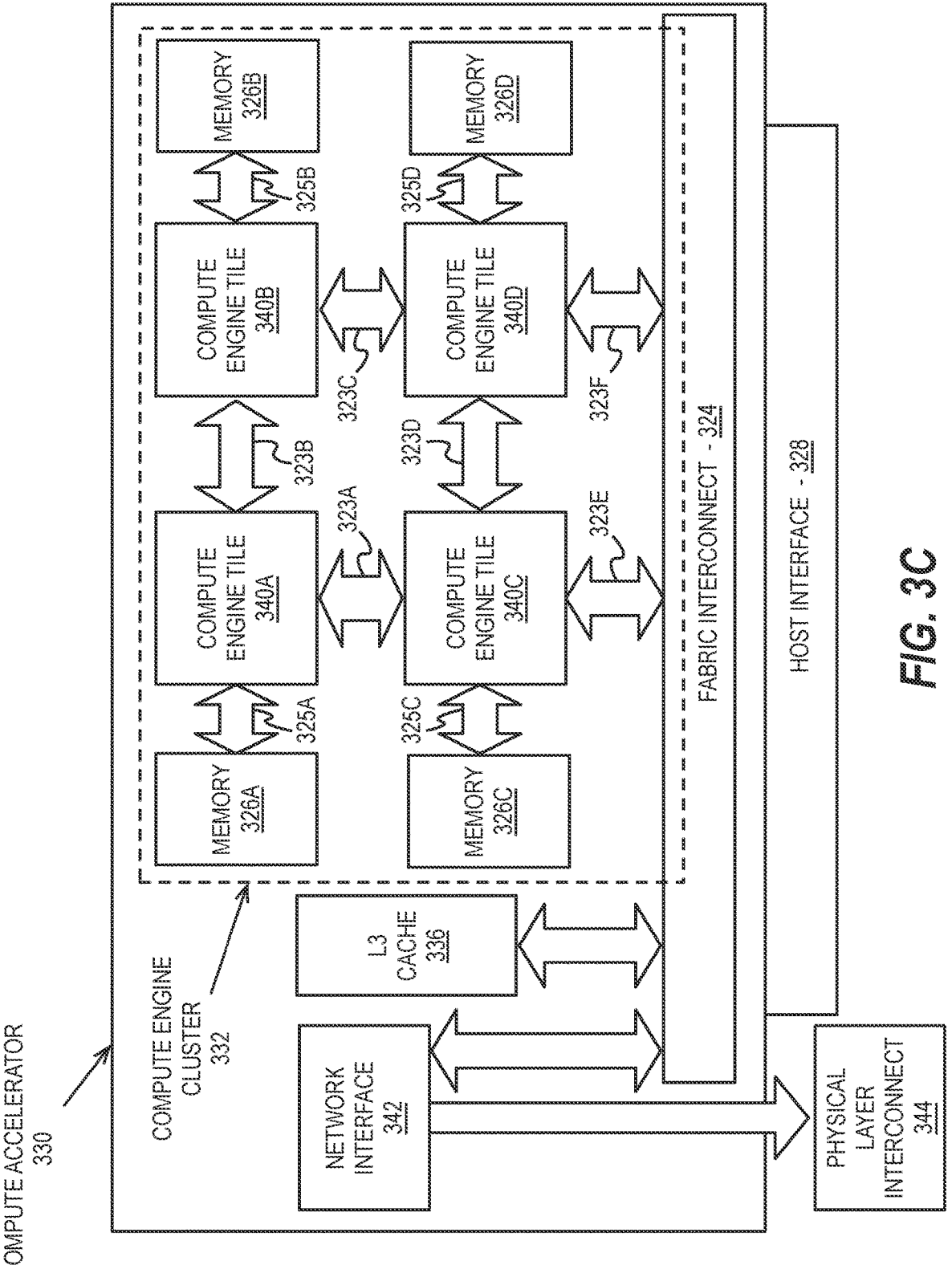

FIGS. 3A-3C illustrate block diagrams of additional graphics processor and compute accelerator architectures provided by embodiments described herein. The elements of FIGS. 3A-3C having the same reference numbers (or names) as the elements of any other figure herein can operate or function in any manner similar to that described elsewhere herein, but are not limited to such.

FIG. 3A is a block diagram of a graphics processor 300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 318. Display controller 302 includes hardware for one or more overlay planes for the display and composition of multiple layers of video or user interface elements. The display device 318 can be an internal or external display device. In one embodiment the display device 318 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media subsystem 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media subsystem 315. The spawned threads perform computations for the media operations on one or more graphics cores included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics cores to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

FIG. 3B illustrates a graphics processor 320 having a tiled architecture, according to embodiments described herein. In one embodiment the graphics processor 320 includes a graphics processing engine cluster 322 having multiple instances of the graphics processing engine 310 of FIG. 3A within a graphics engine tile 310A-310D. Each graphics engine tile 310A-310D can be interconnected via a set of tile interconnects 323A-323F. Each graphics engine tile 310A-310D can also be connected to a memory module or memory device 326A-326D via memory interconnects 325A-325D. The memory devices 326A-326D can use any graphics memory technology. For example, the memory devices 326A-326D may be graphics double data rate (GDDR) memory. The memory devices 326A-326D, in one embodiment, are HBM modules that can be on-die with their respective graphics engine tile 310A-310D. In one embodiment the memory devices 326A-326D are stacked memory devices that can be stacked on top of their respective graphics engine tile 310A-310D. In one embodiment, each graphics engine tile 310A-310D and associated memory 326A-326D reside on separate chiplets, which are bonded to a base die or base substrate, as described on further detail in FIGS. 11B-11D.

The graphics processor 320 may be configured with a non-uniform memory access (NUMA) systemin which memory devices 326A-326D are coupled with associated graphics engine tiles 310A-310D. A given memory device may be accessed by graphics engine tiles other than the tile to which it is directly connected. However, access latency to the memory devices 326A-326D may be lowest when accessing a local tile. In one embodiment, a cache coherent NUMA (ccNUMA) system is enabled that uses the tile interconnects 323A-323F to enable communication between cache controllers within the graphics engine tiles 310A-310D to maintain a consistent memory image when more than one cache stores the same memory location.

The graphics processing engine cluster 322 can connect with an on-chip or on-package fabric interconnect 324. In one embodiment the fabric interconnect 324 includes a network processor, network on a chip (NoC), or another switching processor to enable the fabric interconnect 324 to act as a packet switched fabric interconnect that switches data packets between components of the graphics processor 320. The fabric interconnect 324 can enable communication between graphics engine tiles 310A-310D and components such as the video codec engine 306 and one or more copy engines 304. The copy engines 304 can be used to move data out of, into, and between the memory devices 326A-326D and memory that is external to the graphics processor 320 (e.g., system memory). The fabric interconnect 324 can also couple with one or more of the tile interconnects 323A-323F to facilitate or enhance the interconnection between the graphics engine tiles 310A-310D. The fabric interconnect 324 is also configurable to interconnect multiple instances of the graphics processor 320 (e.g., via the host interface 328), enabling tile-to-tile communication between graphics engine tiles 310A-310D of multiple GPUs. In one embodiment, the graphics engine tiles 310A-310D of multiple GPUs can be presented to a host system as a single logical device.

The graphics processor 320 may optionally include a display controller 302 to enable a connection with the display device 318. The graphics processor may also be configured as a graphics or compute accelerator. In the accelerator configuration, the display controller 302 and display device 318 may be omitted.

The graphics processor 320 can connect to a host system via a host interface 328. The host interface 328 can enable communication between the graphics processor 320, system memory, and/or other system components. The host interface 328 can be, for example a PCI express bus or another type of host system interface. For example, the host interface 328 may be an NVLink or NVSwitch interface. The host interface 328 and fabric interconnect 324 can cooperate to enable multiple instances of the graphics processor 320 to act as single logical device. Cooperation between the host interface 328 and fabric interconnect 324 can also enable the individual graphics engine tiles 310A-310D to be presented to the host system as distinct logical graphics devices.

FIG. 3C illustrates a compute accelerator 330, according to embodiments described herein. The compute accelerator 330 can include architectural similarities with the graphics processor 320 of FIG. 3B and is optimized for compute acceleration. A compute engine cluster 332 can include a set of compute engine tiles 340A-340D that include execution logic that is optimized for parallel or vector-based general-purpose compute operations. In some embodiments, the compute engine tiles 340A-340D do not include fixed function graphics processing logic, although in one embodiment one or more of the compute engine tiles 340A-340D can include logic to perform media acceleration. The compute engine tiles 340A-340D can connect to memory 326A-326D via memory interconnects 325A-325D. The memory 326A-326D and memory interconnects 325A-325D may be similar technology as in graphics processor 320 or can be different. The graphics compute engine tiles 340A-340D can also be interconnected via a set of tile interconnects 323A-323F and may be connected with and/or interconnected by a fabric interconnect 324. Cross-tile communications can be facilitated via the fabric interconnect 324. The fabric interconnect 324 (e.g., via the host interface 328) can also facilitate communication between compute engine tiles 340A-340D of multiple instances of the compute accelerator 330. In one embodiment the compute accelerator 330 includes a large L3 cache 336 that can be configured as a device-wide cache. The compute accelerator 330 can also connect to a host processor and memory via a host interface 328 in a similar manner as the graphics processor 320 of FIG. 3B.

The compute accelerator 330 can also include an integrated network interface 342. In one embodiment the network interface 342 includes a network processor and controller logic that enables the compute engine cluster 332 to communicate over a physical layer interconnect 344 without requiring data to traverse memory of a host system. In one embodiment, one of the compute engine tiles 340A-340D is replaced by network processor logic and data to be transmitted or received via the physical layer interconnect 344 may be transmitted directly to or from memory 326A-326D. Multiple instances of the compute accelerator 330 may be joined via the physical layer interconnect 344 into a single logical device. Alternatively, the various compute engine tiles 340A-340D may be presented as distinct network accessible compute accelerator devices.

Graphics Processing Engine

Figure 4:
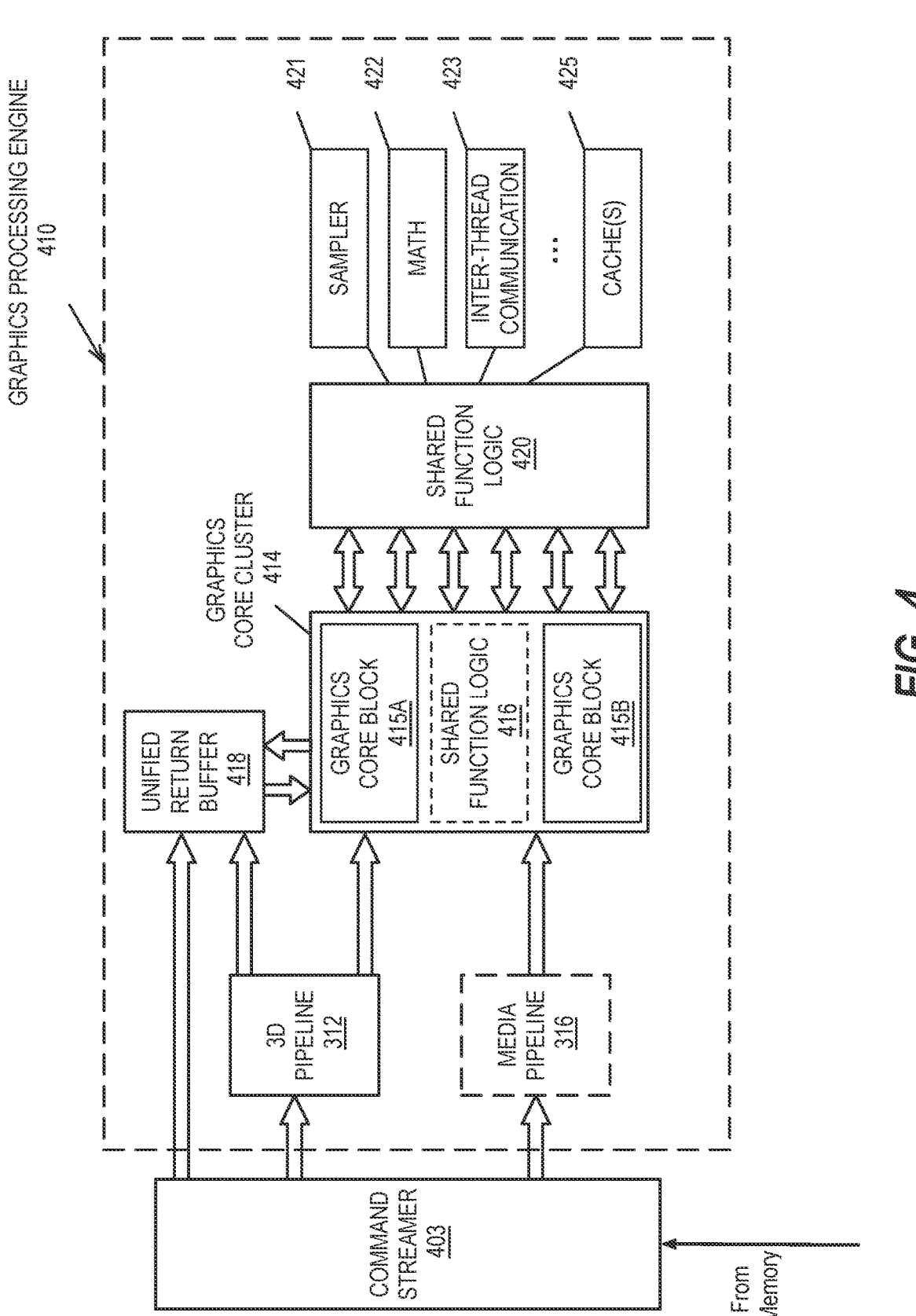
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3A and may also represent a graphics engine tile 310A-310D of FIG. 3B. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3A are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. Alternatively or additionally, the command streamer 403 may be directly coupled to a unified return buffer 418. The unified return buffer 418 may be communicatively coupled to a graphics core cluster 414. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core cluster 414. In one embodiment the graphics core cluster 414 include one or more blocks of graphics cores (e.g., graphics core block 415A, graphics core block 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic, such as matrix or AI acceleration logic.

In various embodiments the 3D pipeline 312 can include fixed function and programmable logic to process one or more shader programs, such as vertex shaders, geometry shaders, pixel shaders, fragment shaders, compute shaders, or other shader and/or GPGPU programs, by processing the instructions and dispatching execution threads to the graphics core cluster 414. The graphics core cluster 414 provides a unified block of execution resources for use in processing these shader programs. Multi-purpose execution logic within the graphics core blocks 415A-415B of the graphics core cluster 414 includes support for various 3D API shader languages and can execute multiple simultaneous execution threads associated with multiple shaders.

In some embodiments, the graphics core cluster 414 includes execution logic to perform media functions, such as video and/or image processing. In one embodiment, the graphics cores include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2A.

Output data generated by threads executing on the graphics core cluster 414 can output data to memory in a unified return buffer (URB) 418. The URB 418 can store data for multiple threads. In some embodiments the URB 418 may be used to send data between different threads executing on the graphics core cluster 414. In some embodiments the URB 418 may additionally be used for synchronization between threads on the graphics core array and fixed function logic within the shared function logic 420.

In some embodiments, graphics core cluster 414 is scalable, such that the cluster includes a variable number of graphics cores, each having a variable number of graphics cores based on the target power and performance level of GPE 410. In one embodiment the execution resources are dynamically scalable, such that execution resources may be enabled or disabled as needed.

The graphics core cluster 414 couples with shared function logic 420 that includes multiple resources that are shared between the graphics cores in the graphics core array. The shared functions within the shared function logic 420 are hardware logic units that provide specialized supplemental functionality to the graphics core cluster 414. In various embodiments, shared function logic 420 may include, but is not limited to sampler 421, math 422, and inter-thread communication (ITC) 423 logic. Additionally, some embodiments implement one or more cache(s) 425 within the shared function logic 420. The shared function logic 420 can implement the same or similar functionality as the additional fixed function logic 238 of FIG. 2B.

A shared function is implemented at least in a case where the demand for a given specialized function is insufficient for inclusion within the graphics core cluster 414. Instead, a single instantiation of that specialized function is implemented as a stand-alone entity in the shared function logic 420 and shared among the execution resources within the graphics core cluster 414. The precise set of functions that are shared between the graphics core cluster 414 and included within the graphics core cluster 414 varies across embodiments. In some embodiments, specific shared functions within the shared function logic 420 that are used extensively by the graphics core cluster 414 may be included within shared function logic 416 within the graphics core cluster 414. In various embodiments, the shared function logic 416 within the graphics core cluster 414 can include some or all logic within the shared function logic 420. In one embodiment, all logic elements within the shared function logic 420 may be duplicated within the shared function logic 416 of the graphics core cluster 414. In one embodiment the shared function logic 420 is excluded in favor of the shared function logic 416 within the graphics core cluster 414.

Graphics Processing Resources

Figure 5A:
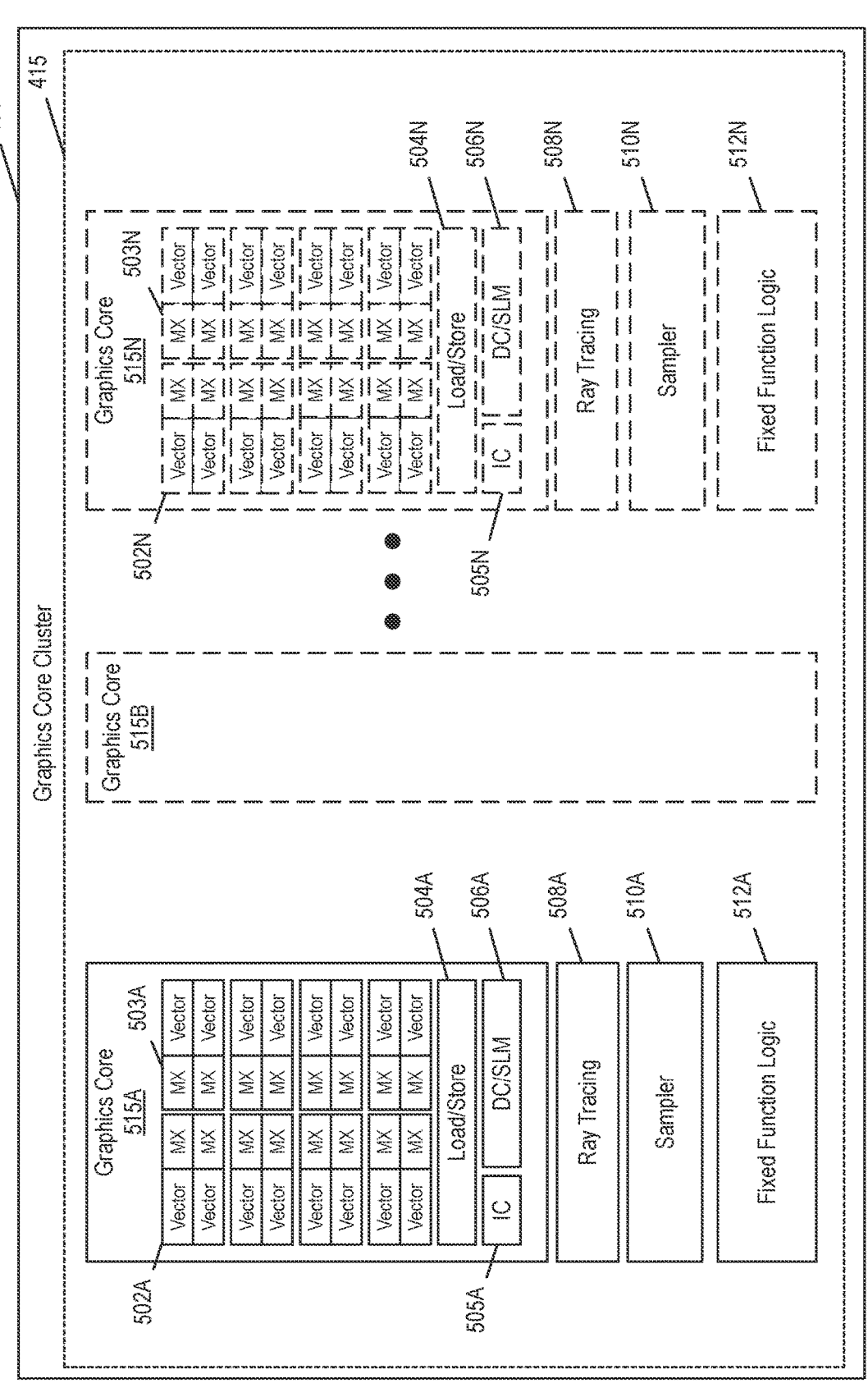
FIG. 5A-5C illustrate thread execution logic including an array of processing elements employed in a graphics processor core according to embodiments.
Figure 5B:
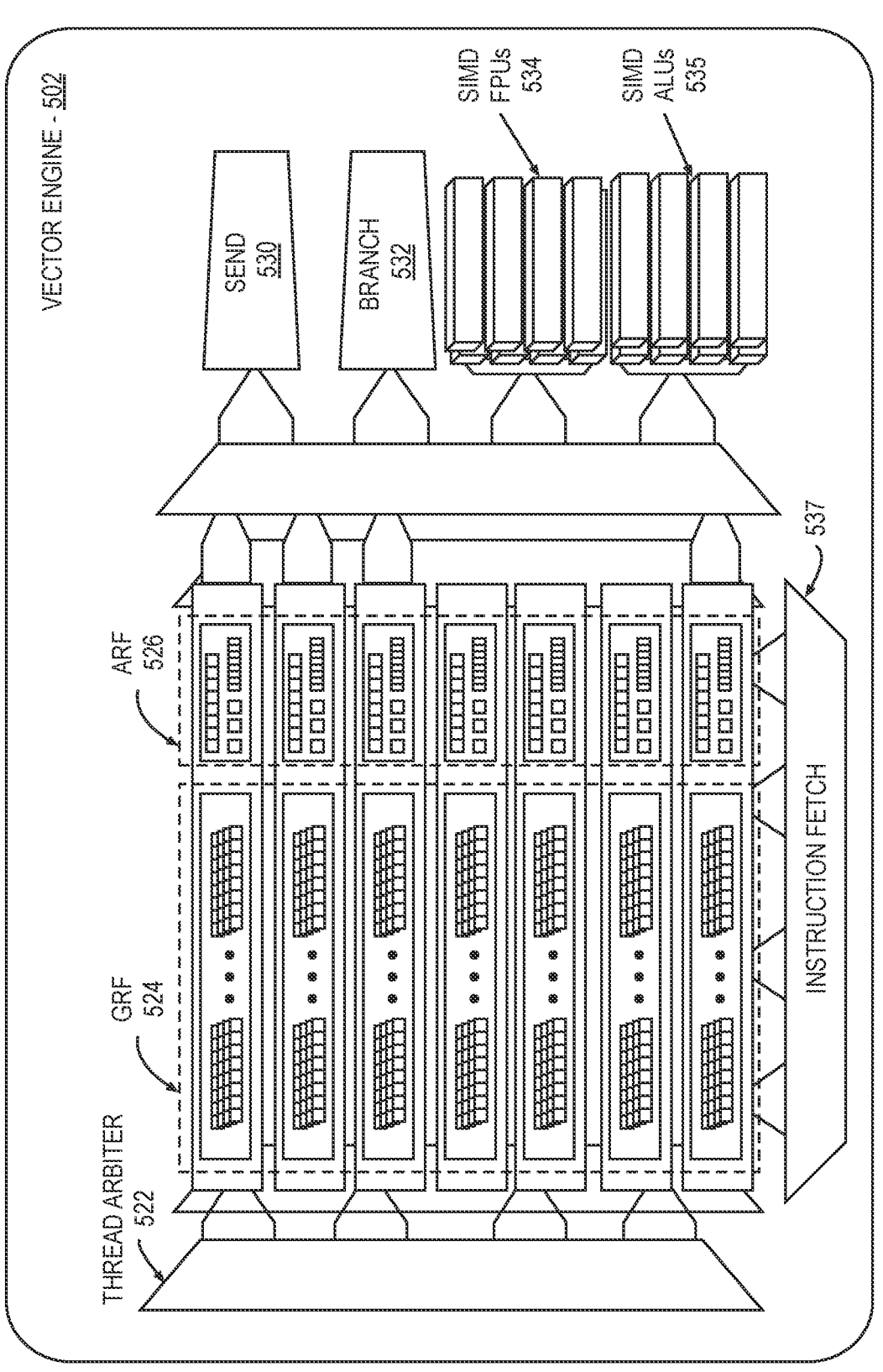
Figure 5C:
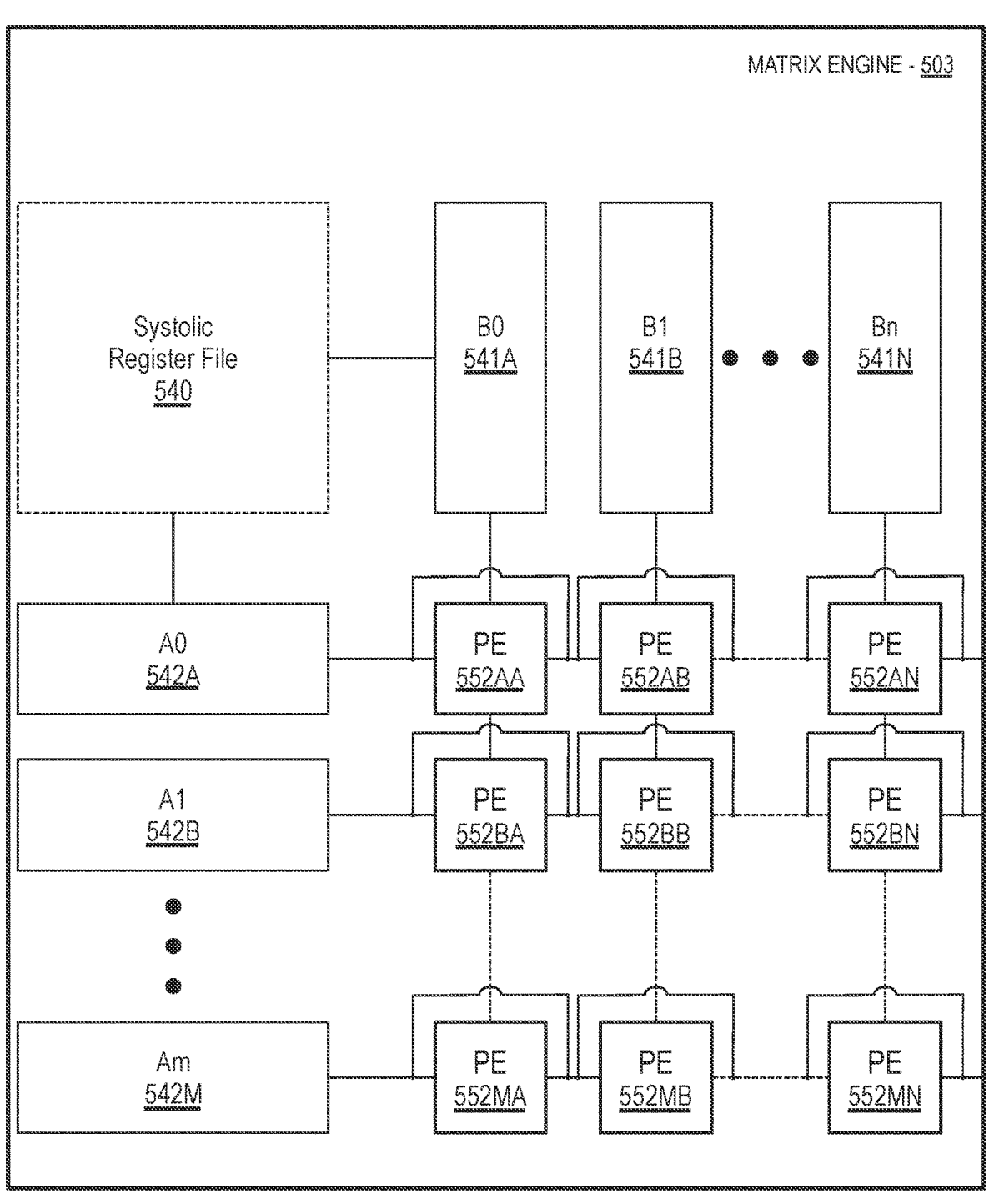

FIG. 5A-5C illustrate execution logic including an array of processing elements employed in a graphics processor, according to embodiments described herein. FIG. 5A illustrates graphics core cluster, according to an embodiment. FIG. 5B illustrates a vector engine of a graphics core, according to an embodiment. FIG. 5C illustrates a matrix engine of a graphics core, according to an embodiment. Elements of FIG. 5A-5C having the same reference numbers as the elements of any other figure herein may operate or function in any manner similar to that described elsewhere herein, but are not limited as such. For example, the elements of FIG. 5A-5C can be considered in the context of the graphics processor core block 219 of FIG. 2B, and/or the graphics core blocks 415A-415B of FIG. 4. In one embodiment, the elements of FIG. 5A-5C have similar functionality to equivalent components of the graphics processor 208 of FIG. 2A, the GPU 239 of FIG. 2C or the GPGPU 270 of FIG. 2D.

As shown in FIG. 5A, in one embodiment the graphics core cluster 414 includes a graphics core block 415, which may be graphics core block 415A or graphics core block 415B of FIG. 4. The graphics core block 415 can include any number of graphics cores (e.g., graphics core 515A, graphics core 515B, through graphics core 515N). Multiple instances of the graphics core block 415 may be included. In one embodiment the elements of the graphics cores 515A-515N have similar or equivalent functionality as the elements of the graphics cores 221A-221F of FIG. 2B. In such embodiment, the graphics cores 515A-515N each include circuitry including but not limited to vector engines 502A-502N, matrix engines 503A-503N, memory load/store units 504A-504N, instruction caches 505A-505N, data caches/shared local memory 506A-506N, ray tracing units 508A-508N, samplers 510A-2710N. The circuitry of the graphics cores 515A-515N can additionally include fixed function logic 512A-512N. The number of vector engines 502A-502N and matrix engines 503A-503N within the graphics cores 515A-515N of a design can vary based on the workload, performance, and power targets for the design.

With reference to graphics core 515A, the vector engine 502A and matrix engine 503A are configurable to perform parallel compute operations on data in a variety of integer and floating-point data formats based on instructions associated with shader programs. Each vector engine 502A and matrix engine 503A can act as a programmable general-purpose computational unit that is capable of executing multiple simultaneous hardware threads while processing multiple data elements in parallel for each thread. The vector engine 502A and matrix engine 503A support the processing of variable width vectors at various SIMD widths, including but not limited to SIMD8, SIMD16, and SIMD32. Input data elements can be stored as a packed data type in a register and the vector engine 502A and matrix engine 503A can process the various elements based on the data size of the elements. For example, when operating on a 256-bit wide vector, the 256 bits of the vector are stored in a register and the vector is processed as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible. In one embodiment, the vector engine 502A and matrix engine 503A are also configurable for SIMT operation on warps or thread groups of various sizes (e.g., 8, 16, or 32 threads).

Continuing with graphics core 515A, the memory load/store unit 504A services memory access requests that are issued by the vector engine 502A, matrix engine 503A, and/or other components of the graphics core 515A that have access to memory. The memory access request can be processed by the memory load/store unit 504A to load or store the requested data to or from cache or memory into a register file associated with the vector engine 502A and/or matrix engine 503A. The memory load/store unit 504A can also perform prefetching operations. In one embodiment, the memory load/store unit 504A is configured to provide SIMT scatter/gather prefetching or block prefetching for data stored in memory 610, from memory that is local to other tiles via the tile interconnect 608, or from system memory. Prefetching can be performed to a specific L1 cache (e.g., data cache/shared local memory 506A), the L2 cache 604 or the L3 cache 606. In one embodiment, a prefetch to the L3 cache 606 automatically results in the data being stored in the L2 cache 604.

The instruction cache 505A stores instructions to be executed by the graphics core 515A. In one embodiment, the graphics core 515A also includes instruction fetch and prefetch circuitry that fetches or prefetches instructions into the instruction cache 505A. The graphics core 515A also includes instruction decode logic to decode instructions within the instruction cache 505A. The data cache/shared local memory 506A can be configured as a data cache that is managed by a cache controller that implements a cache replacement policy and/or configured as explicitly managed shared memory. The ray tracing unit 508A includes circuitry to accelerate ray tracing operations. The sampler 510A provides texture sampling for 3D operations and media sampling for media operations. The fixed function logic 512A includes fixed function circuitry that is shared between the various instances of the vector engine 502A and matrix engine 503A. Graphics cores 515B-515N can operate in a similar manner as graphics core 515A.

Functionality of the instruction caches 505A-505N, data caches/shared local memory 506A-506N, ray tracing units 508A-508N, samplers 510A-2710N, and fixed function logic 512A-512N corresponds with equivalent functionality in the graphics processor architectures described herein. For example, the instruction caches 505A-505N can operate in a similar manner as instruction cache 255 of FIG. 2D. The data caches/shared local memory 506A-506N, ray tracing units 508A-508N, and samplers 510A-2710N can operate in a similar manner as the cache/SLM 228A-228F, ray tracing units 227A-227F, and samplers 226A-226F of FIG. 2B. The fixed function logic 512A-512N can include elements of the geometry/fixed function pipeline 231 and/or additional fixed function logic 238 of FIG. 2B. In one embodiment, the ray tracing units 508A-508N include circuitry to perform ray tracing acceleration operations performed by the ray tracing cores 245 of FIG. 2C.

As shown in FIG. 5B, in one embodiment the vector engine 502 includes an instruction fetch unit 537, a general register file array (GRF) 524, an architectural register file array (ARF) 526, a thread arbiter 522, a send unit 530, a branch unit 532, a set of SIMD floating point units (FPUs) 534, and in one embodiment a set of integer SIMD ALUs 535. The GRF 524 and ARF 526 includes the set of general register files and architecture register files associated with each hardware thread that may be active in the vector engine 502. In one embodiment, per thread architectural state is maintained in the ARF 526, while data used during thread execution is stored in the GRF 524. The execution state of each thread, including the instruction pointers for each thread, can be held in thread-specific registers in the ARF 526.

In one embodiment the vector engine 502 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per graphics core, where graphics core resources are divided across logic used to execute multiple simultaneous threads. The number of logical threads that may be executed by the vector engine 502 is not limited to the number of hardware threads, and multiple logical threads can be assigned to each hardware thread.

In one embodiment, the vector engine 502 can co-issue multiple instructions, which may each be different instructions. The thread arbiter 522 can dispatch the instructions to one of the send unit 530, branch unit 532, or SIMD FPU(s) 534 for execution. Each execution thread can access 128 general-purpose registers within the GRF 524, where each register can store 32 bytes, accessible as a variable width vector of 32-bit data elements. In one embodiment, each thread has access to 4 Kbytes within the GRF 524, although embodiments are not so limited, and greater or fewer register resources may be provided in other embodiments. In one embodiment the vector engine 502 is partitioned into seven hardware threads that can independently perform computational operations, although the number of threads per vector engine 502 can also vary according to embodiments. For example, in one embodiment up to 16 hardware threads are supported. In an embodiment in which seven threads may access 4 Kbytes, the GRF 524 can store a total of 28 Kbytes. Where 16 threads may access 4 Kbytes, the GRF 524 can store a total of 64 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 530. In one embodiment, branch instructions are dispatched to a dedicated branch unit 532 to facilitate SIMD divergence and eventual convergence.

In one embodiment the vector engine 502 includes one or more SIMD floating point units (FPU(s)) 534 to perform floating-point operations. In one embodiment, the FPU(s) 534 also support integer computation. In one embodiment the FPU(s) 534 can execute up to M number of 32-bit floating-point (or integer) operations, or execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 535 are also present and may be specifically optimized to perform operations associated with machine learning computations. In one embodiment, the SIMD ALUs are replaced by an additional set of SIMD FPUs 534 that are configurable to perform integer and floating-point operations. In one embodiment, the SIMD FPUs 534 and SIMD ALUs 535 are configurable to execute SIMT programs. In one embodiment, combined SIMD+SIMT operation is supported.

In one embodiment, arrays of multiple instances of the vector engine 502 can be instantiated in a graphics core. For scalability, product architects can choose the exact number of vector engines per graphics core grouping. In one embodiment the vector engine 502 can execute instructions across a plurality of execution channels. In a further embodiment, each thread executed on the vector engine 502 is executed on a different channel.

As shown in FIG. 5C, in one embodiment the matrix engine 503 includes an array of processing elements that are configured to perform tensor operations including vector/matrix and matrix/matrix operations, such as but not limited to matrix multiply and/or dot product operations. The matrix engine 503 is configured with M rows and N columns of processing elements (PE 552AA-PE 552MN) that include multiplier and adder circuits organized in a pipelined fashion. In one embodiment, the processing elements 552AA-PE 552MN make up the physical pipeline stages of an N wide and M deep systolic array that can be used to perform vector/matrix or matrix/matrix operations in a data-parallel manner, including matrix multiply, fused multiply-add, dot product or other general matrix-matrix multiplication (GEMM) operations. In one embodiment the matrix engine 503 supports 16-bit floating point operations, as well as 8-bit, 4-bit, 2-bit, and binary integer operations. The matrix engine 503 can also be configured to accelerate specific machine learning operations. In such embodiments, the matrix engine 503 can be configured with support for the bfloat (brain floating point) 16-bit floating point format or a tensor float 32-bit floating point format (TF32) that have different numbers of mantissa and exponent bits relative to Institute of Electrical and Electronics Engineers (IEEE) 754 formats.

In one embodiment, during each cycle, each stage can add the result of operations performed at that stage to the output of the previous stage. In other embodiments, the pattern of data movement between the processing elements 552AA-552MN after a set of computational cycles can vary based on the instruction or macro-operation being performed. For example, in one embodiment partial sum loopback is enabled and the processing elements may instead add the output of a current cycle with output generated in the previous cycle. In one embodiment, the final stage of the systolic array can be configured with a loopback to the initial stage of the systolic array. In such embodiment, the number of physical pipeline stages may be decoupled from the number of logical pipeline stages that are supported by the matrix engine 503. For example, where the processing elements 552AA-552MN are configured as a systolic array of M physical stages, a loopback from stage M to the initial pipeline stage can enable the processing elements 552AA-PE552MN to operate as a systolic array of, for example, 2M, 3M, 4M, etc., logical pipeline stages.

In one embodiment, the matrix engine 503 includes memory 541A-541N, 542A-542M to store input data in the form of row and column data for input matrices. Memory 542A-542M is configurable to store row elements (A0-Am) of a first input matrix and memory 541A-541N is configurable to store column elements (B0-Bn) of a second input matrix. The row and column elements are provided as input to the processing elements 552AA-552MN for processing. In one embodiment, row and column elements of the input matrices can be stored in a systolic register file 540 within the matrix engine 503 before those elements are provided to the memory 541A-541N, 542A-542M. In one embodiment, the systolic register file 540 is excluded and the memory 541A-541N, 542A-542M is loaded from registers in an associated vector engine (e.g., GRF 524 of vector engine 502 of FIG. 5B) or other memory of the graphics core that includes the matrix engine 503 (e.g., data cache/shared local memory 506A for matrix engine 503A of FIG. 5A). Results generated by the processing elements 552AA-552MN are then output to an output buffer and/or written to a register file (e.g., systolic register file 540, GRF 524, data cache/shared local memory 506A-506N) for further processing by other functional units of the graphics processor or for output to memory.

In some embodiments, the matrix engine 503 is configured with support for input sparsity, where multiplication operations for sparse regions of input data can be bypassed by skipping multiply operations that have a zero-value operand. In one embodiment, the processing elements 552AA-552MN are configured to skip the performance of certain operations that have zero value input. In one embodiment, sparsity within input matrices can be detected and operations having known zero output values can be bypassed before being submitted to the processing elements 552AA-552MN. The loading of zero value operands into processing elements can be bypassed and the processing elements 552AA-552MN can be configured to perform multiplications on the non-zero value input elements. The matrix engine 503 can also be configured with support for output sparsity, such that operations with results that are pre-determined to be zero are bypassed. For input sparsity and/or output sparsity, in one embodiment, metadata is provided to the processing elements 552AA-552MN to indicate, for a processing cycle, which processing elements and/or data channels are to be active during that cycle.

In one embodiment, the matrix engine 503 includes hardware to enable operations on sparse data having a compressed representation of a sparse matrix that stores non-zero values and metadata that identifies the positions of the non-zero values within the matrix. Exemplary compressed representations include but are not limited to compressed tensor representations such as compressed sparse row (CSR), compressed sparse column (CSC), compressed sparse fiber (CSF) representations. Support for compressed representations enable operations to be performed on input in a compressed tensor format without requiring the compressed representation to be decompressed or decoded. In such embodiment, operations can be performed only on non-zero input values and the resulting non-zero output values can be mapped into an output matrix. In some embodiments, hardware support is also provided for machine-specific lossless data compression formats that are used when transmitting data within hardware or across system busses. Such data may be retained in a compressed format for sparse input data and the matrix engine 503 can used the compression metadata for the compressed data to enable operations to be performed on only non-zero values, or to enable blocks of zero data input to be bypassed for multiply operations.

In various embodiments, input data can be provided by a programmer in a compressed tensor representation, or a codec can compress input data into the compressed tensor representation or another sparse data encoding. In addition to support for compressed tensor representations, streaming compression of sparse input data can be performed before the data is provided to the processing elements 552AA-552MN. In one embodiment, compression is performed on data written to a cache memory associated with the graphics core cluster 414, with the compression being performed with an encoding that is supported by the matrix engine 503. In one embodiment, the matrix engine 503 includes support for input having structured sparsity in which a pre-determined level or pattern of sparsity is imposed on input data. This data may be compressed to a known compression ratio, with the compressed data being processed by the processing elements 552AA-552MN according to metadata associated with the compressed data.

Figure 6:
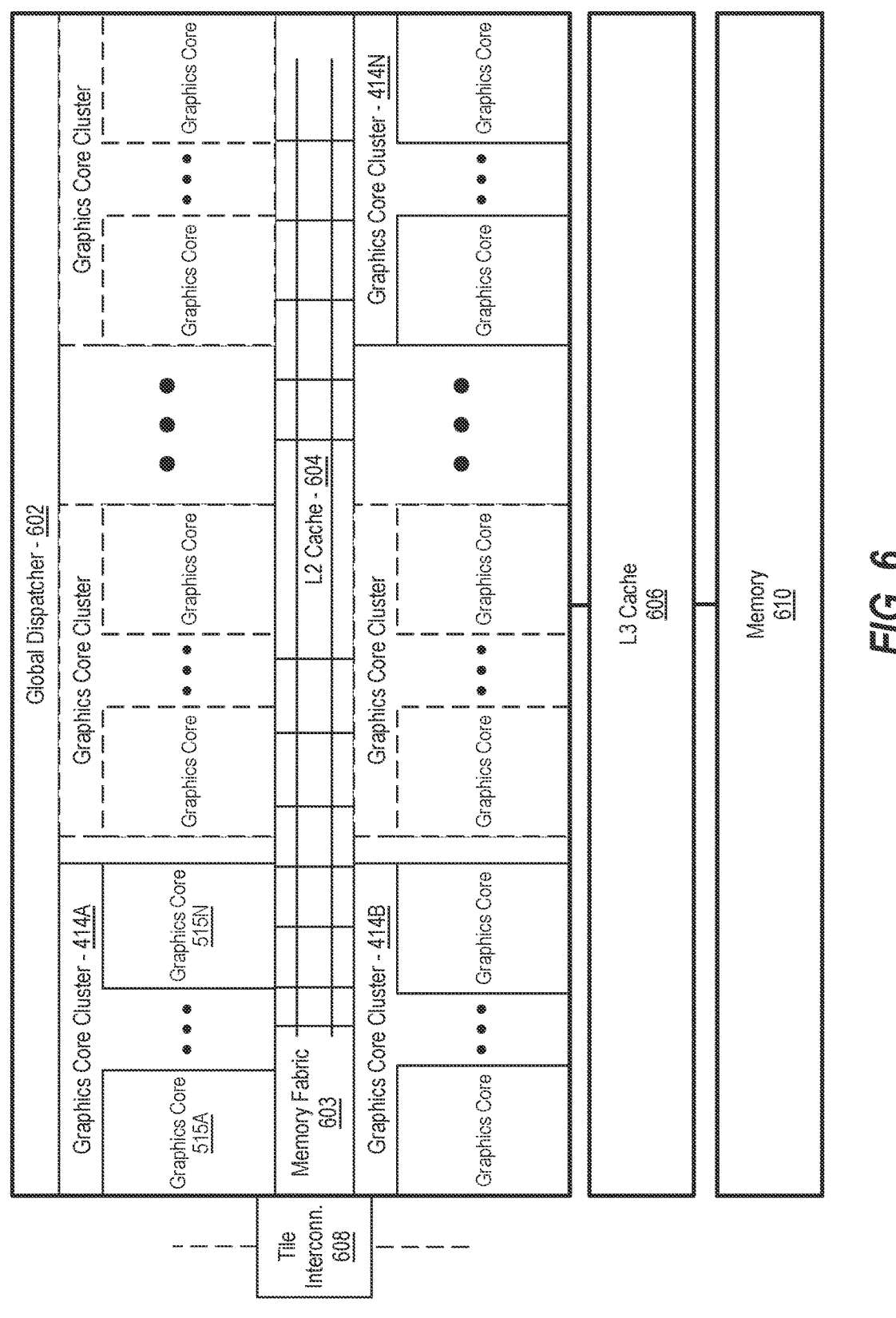
FIG. 6 illustrates a tile of a multi-tile processor, according to an embodiment.

FIG. 6 illustrates a tile 600 of a multi-tile processor, according to an embodiment. In one embodiment, the tile 600 is representative of one of the graphics engine tiles 310A-310D of FIG. 3B or compute engine tiles 340A-340D of FIG. 3C. The tile 600 of the multi-tile graphics processor includes an array of graphics core clusters (e.g., graphics core cluster 414A, graphics core cluster 414B, through graphics core cluster 414N), with each graphics core cluster having an array of graphics cores 515A-515N. The tile 600 also includes a global dispatcher 602 to dispatch threads to processing resources of the tile 600.

The tile 600 can include or couple with an L3 cache 606 and memory 610. In various embodiments, the L3 cache 606 may be excluded or the tile 600 can include additional levels of cache, such as an L4 cache. In one embodiment, each instance of the tile 600 in the multi-tile graphics processor has an associated memory 610, such as in FIG. 3B and FIG. 3C. In one embodiment, a multi-tile processor can be configured as a multi-chip module in which the L3 cache 606 and/or memory 610 reside on separate chiplets than the graphics core clusters 414A-414N. In this context, a chiplet is an at least partially packaged integrated circuit that includes distinct units of logic that can be assembled with other chiplets into a larger package. For example, the L3 cache 606 can be included in a dedicated cache chiplet or can reside on the same chiplet as the graphics core clusters 414A-414N. In one embodiment, the L3 cache 606 can be included in an active base die or active interposer, as illustrated in FIG. 11C.

A memory fabric 603 enables communication among the graphics core clusters 414A-414N, L3 cache 606, and memory 610. An L2 cache 604 couples with the memory fabric 603 and is configurable to cache transactions performed via the memory fabric 603. A tile interconnect 608 enables communication with other tiles on the graphics processors and may be one of tile interconnects 323A-323F of FIGS. 3B and 3C. In embodiments in which the L3 cache 606 is excluded from the tile 600, the L2 cache 604 may be configured as a combined L2/L3 cache. The memory fabric 603 is configurable to route data to the L3 cache 606 or memory controllers associated with the memory 610 based on the presence or absence of the L3 cache 606 in a specific implementation. The L3 cache 606 can be configured as a per-tile cache that is dedicated to processing resources of the tile 600 or may be a partition of a GPU-wide L3 cache.

Figure 7:
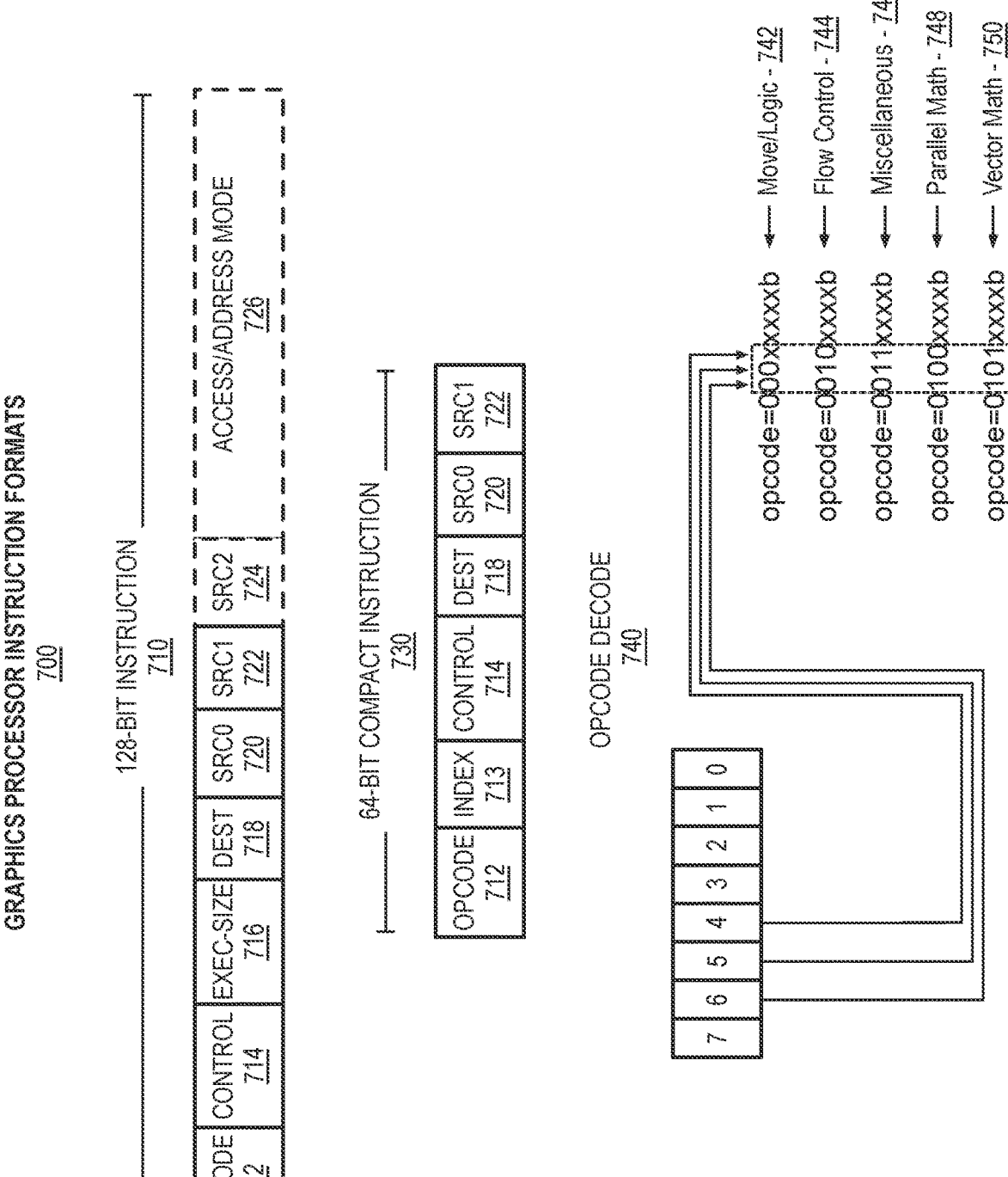
FIG. 7 is a block diagram illustrating a graphics processor instruction formats according to some embodiments.

FIG. 7 is a block diagram illustrating graphics processor instruction formats 700 according to some embodiments. In one or more embodiment, the graphics processor cores support an instruction set having instructions in multiple formats. The solid lined boxes illustrate the components that are generally included in a graphics core instruction, while the dashed lines include components that are optional or that are only included in a sub-set of the instructions. In some embodiments, the graphics processor instruction formats 700 described and illustrated are macro-instructions, in that they are instructions supplied to the graphics core, as opposed to micro-operations resulting from instruction decode once the instruction is processed. Thus, a single instruction may cause hardware to perform multiple micro-operations.

In some embodiments, the graphics processor natively supports instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit compacted instruction format 730. The native instructions available in the 64-bit compacted instruction format 730 vary by embodiment. In some embodiments, the instruction is compacted in part using a set of index values in an index field 713. The graphics core hardware references a set of compaction tables based on the index values and uses the compaction table outputs to reconstruct a native instruction in the 128-bit instruction format 710. Other sizes and formats of instruction can be used.

For each format, instruction opcode 712 defines the operation that the graphics core is to perform. The graphics cores execute each instruction in parallel across the multiple data elements of each operand. For example, in response to an add instruction the graphics core performs a simultaneous add operation across each color channel representing a texture element or picture element. By default, the graphics core performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compacted instruction format 730.

Some graphics core instructions have up to three operands including two source operands, src0 720, src1 722, and one destination 718. In some embodiments, the graphics cores support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on instruction opcode 712 bit-fields to simplify Opcode decode 740. For an 8-bit opcode, bits 4, 5, and 6 allow the graphics core to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math instruction group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands. The illustrated opcode decode 740, in one embodiment, can be used to determine which portion of a graphics core will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 8:
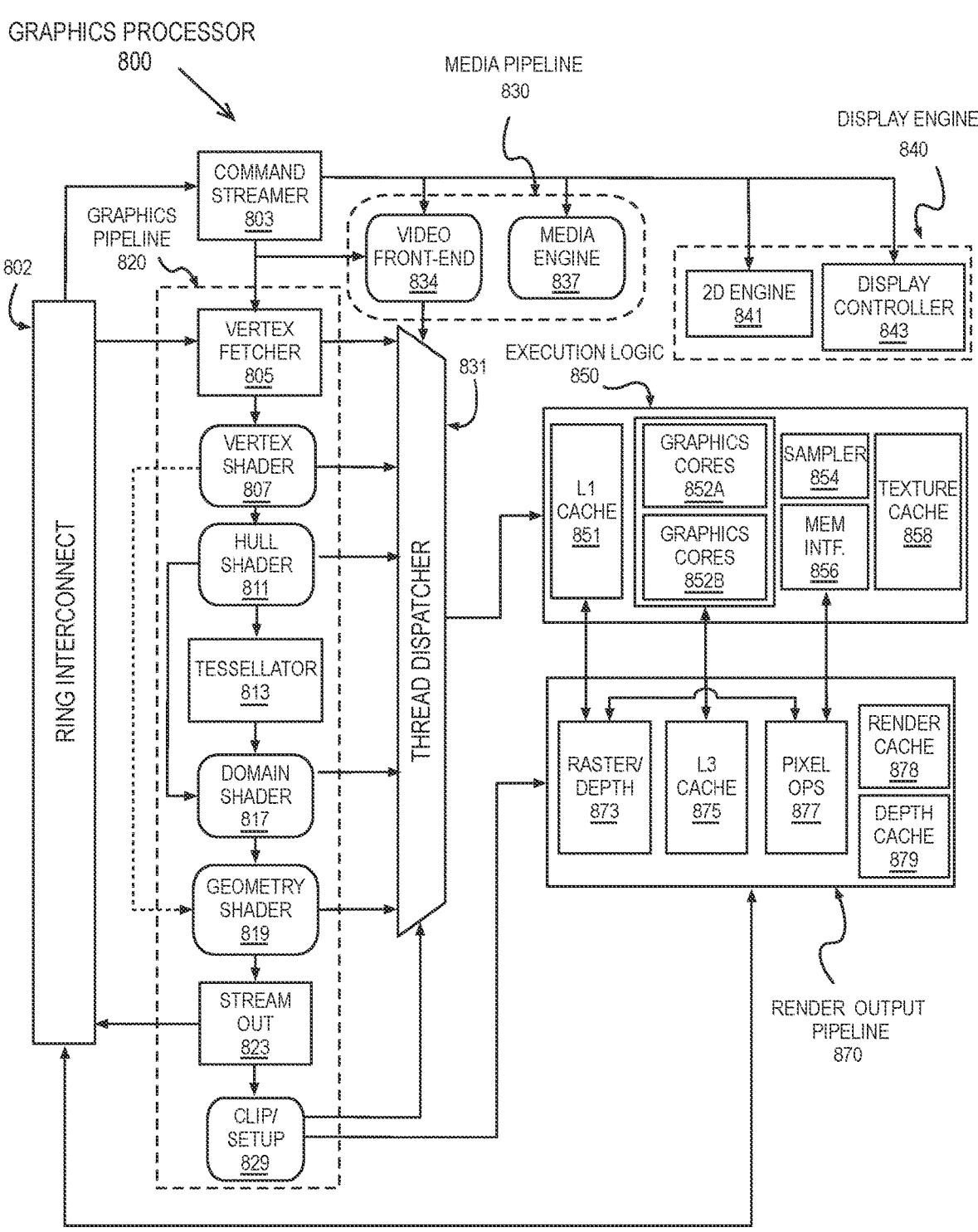
FIG. 8 is a block diagram of a graphics processor according to another embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to graphics cores 852A-852B via a thread dispatcher 831.

In some embodiments, graphics cores 852A-852B are an array of vector processors having an instruction set for performing graphics and media operations. In some embodiments, graphics cores 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed. The tessellation components can operate based on data received from the vertex shader 807.

In some embodiments, complete geometric objects can be processed by a geometry shader 819 via one or more threads dispatched to graphics cores 852A-852B or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, graphics cores 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and graphics cores 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g., bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
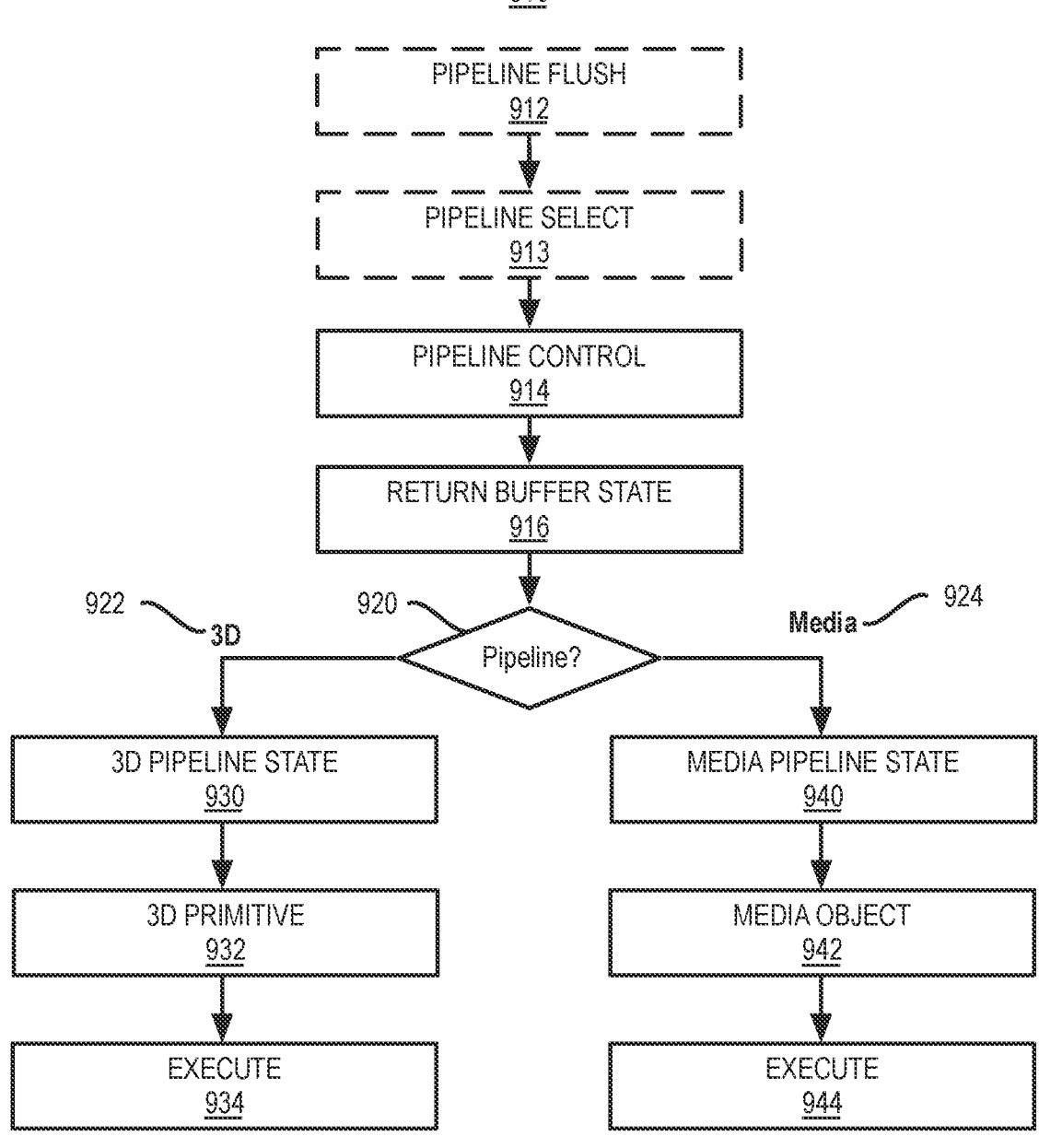
FIG. 9A-9B illustrate a graphics processor command format and command sequence, according to some embodiments.

FIG. 9A is a block diagram illustrating a graphics processor command format 900 that may be used to program graphics processing pipelines according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and a data field 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word. Other command formats can be used.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands related to the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader programs to the graphics cores.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back-end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
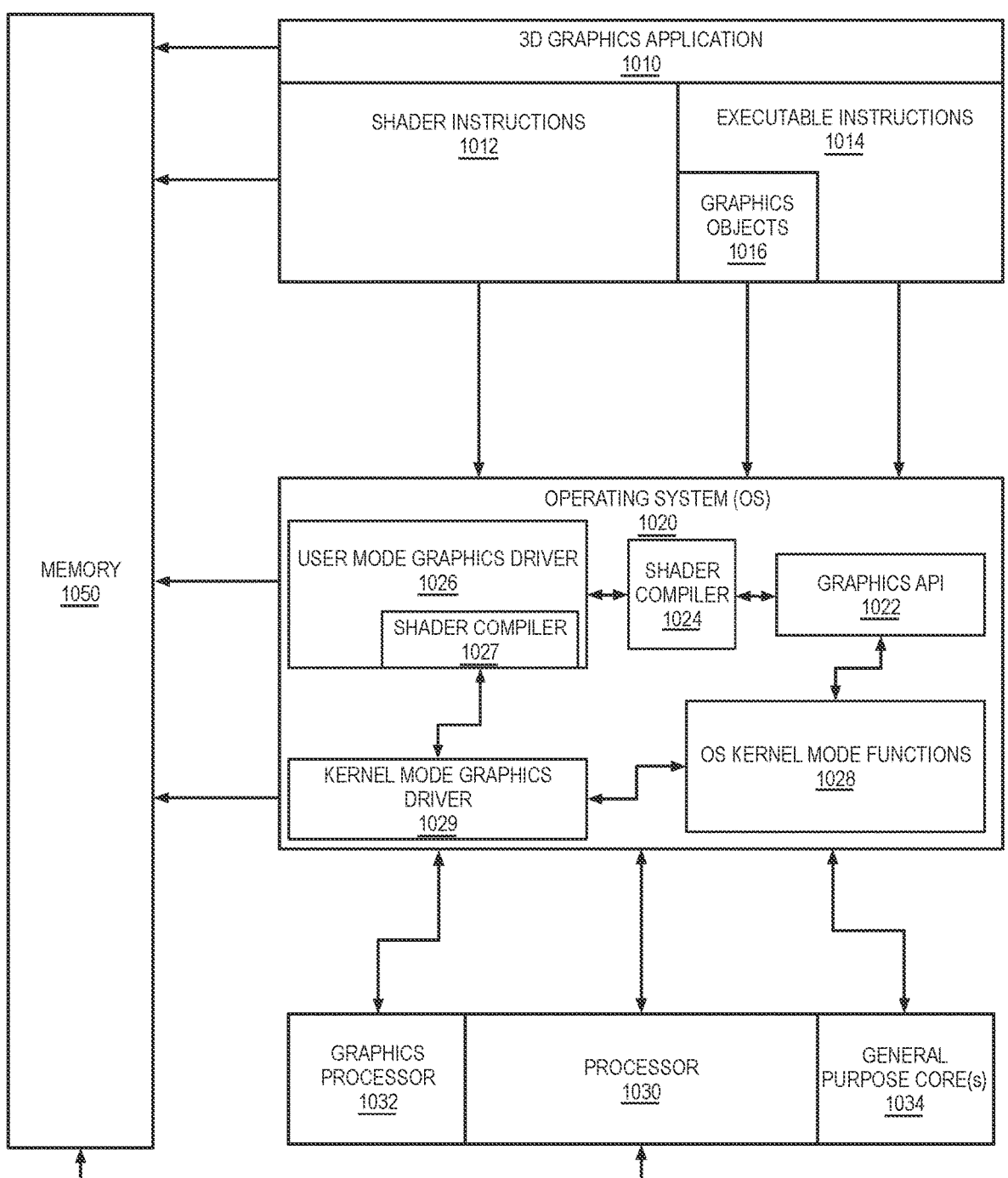
FIG. 10 illustrates exemplary graphics software architecture for a data processing system according to some embodiments.

FIG. 10 illustrates an exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High-Level Shader Language (HLSL) of Direct3D, the OpenGL Shader Language (GLSL), and so forth. The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
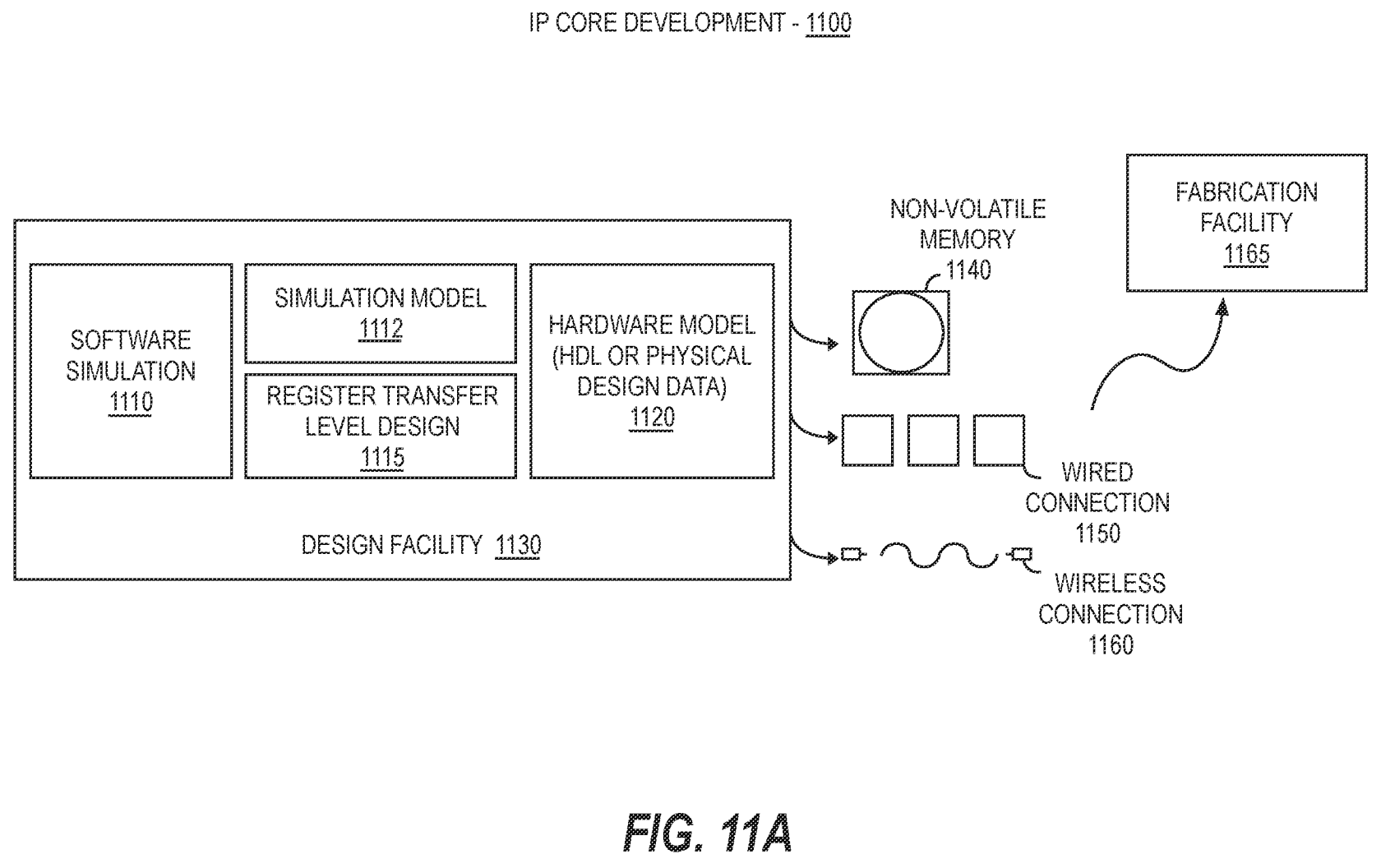

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3$^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
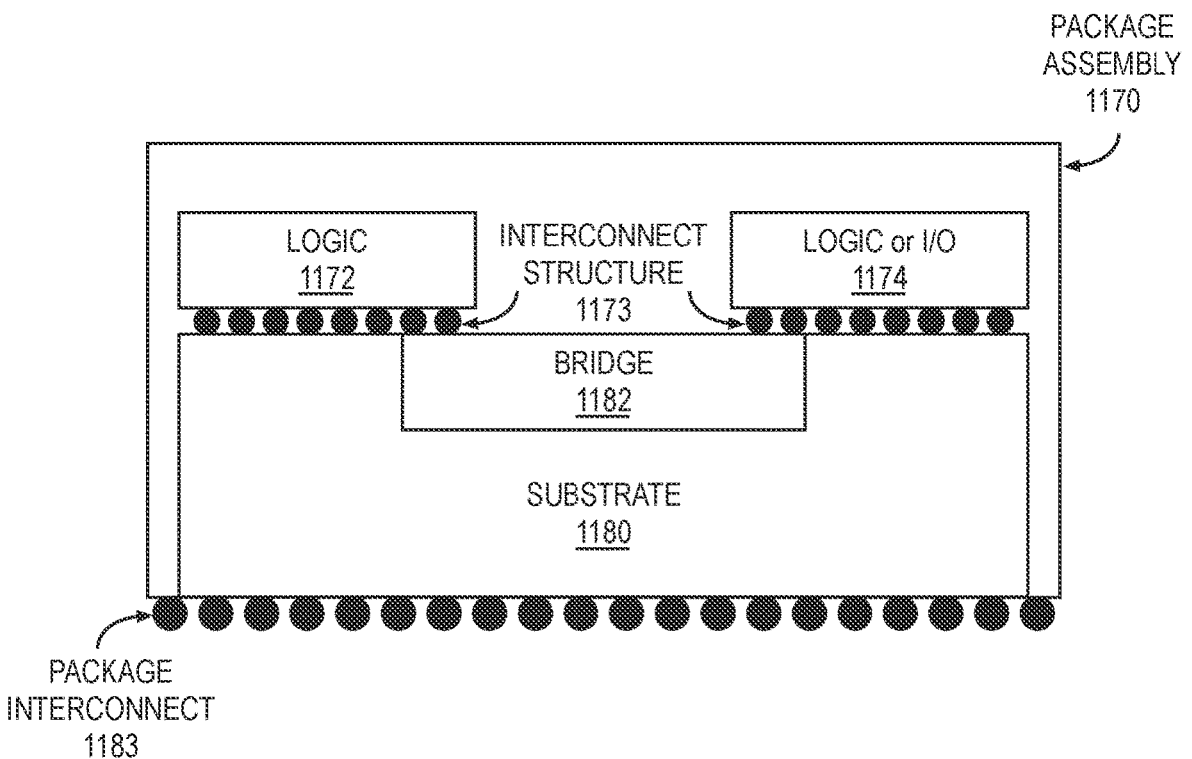
Figure 11C:
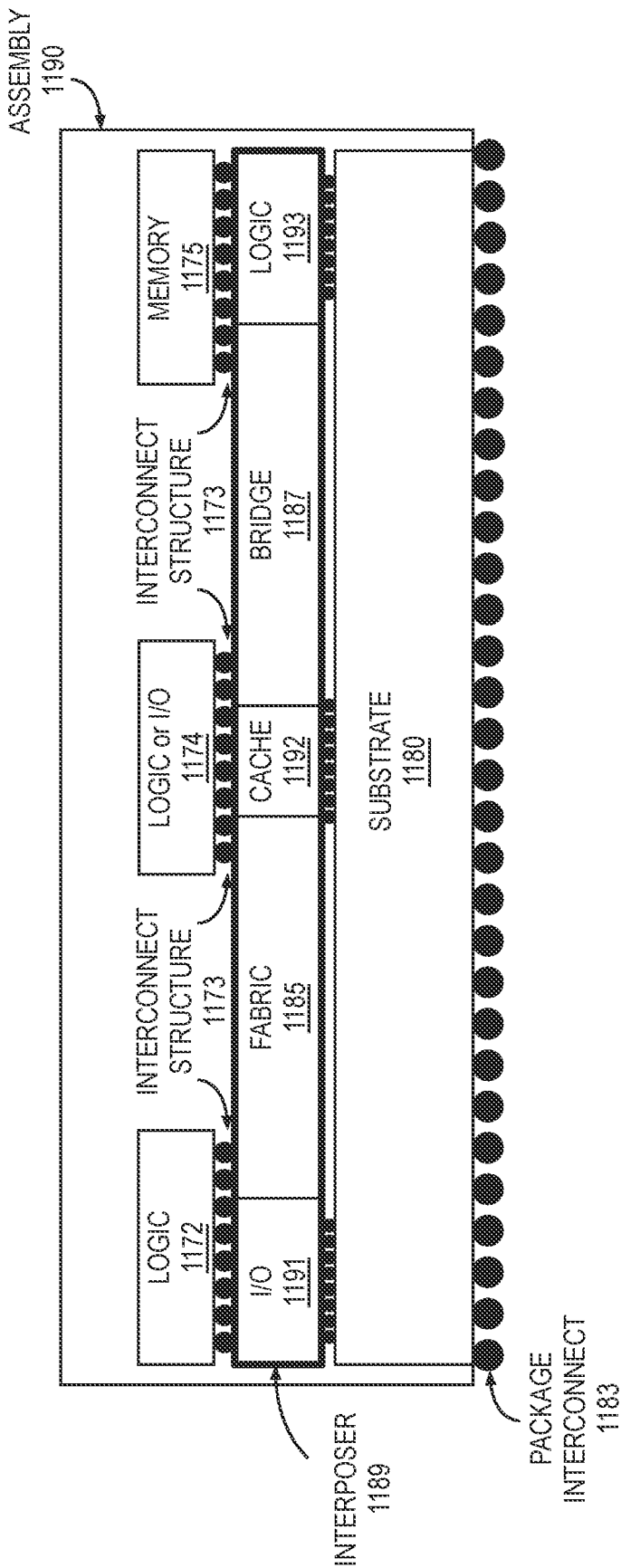

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

FIG. 11C illustrates a package assembly 1190 that includes multiple units of hardware logic chiplets connected to a substrate 1180. A graphics processing unit, parallel processor, and/or compute accelerator as described herein can be composed from diverse silicon chiplets that are separately manufactured. A diverse set of chiplets with different IP core logic can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

In various embodiments a package assembly 1190 can include components and chiplets that are interconnected by a fabric 1185 and/or one or more bridges 1187. The chiplets within the package assembly 1190 may have a 2.5D arrangement using Chip-on-Wafer-on-Substrate stacking in which multiple dies are stacked side-by-side on a silicon interposer 1189 that couples the chiplets with the substrate 1180. The substrate 1180 includes electrical connections to the package interconnect 1183. In one embodiment the silicon interposer 1189 is a passive interposer that includes through-silicon vias (TSVs) to electrically couple chiplets within the package assembly 1190 to the substrate 1180. In one embodiment, silicon interposer 1189 is an active interposer that includes embedded logic in addition to TSVs. In such embodiment, the chiplets within the package assembly 1190 are arranged using 3D face to face die stacking on top of the active interposer 1189. The active interposer 1189 can include hardware logic for I/O 1191, cache memory 1192, and other hardware logic 1193, in addition to interconnect fabric 1185 and a silicon bridge 1187. The fabric 1185 enables communication between the various logic chiplets 1172, 1174 and the logic 1191, 1193 within the active interposer 1189. The fabric 1185 may be an NoC interconnect or another form of packet switched fabric that switches data packets between components of the package assembly. For complex assemblies, the fabric 1185 may be a dedicated chiplet enables communication between the various hardware logic of the package assembly 1190.

Bridge structures 1187 within the active interposer 1189 may be used to facilitate a point-to-point interconnect between, for example, logic or I/O chiplets 1174 and memory chiplets 1175. In some implementations, bridge structures 1187 may also be embedded within the substrate 1180. The hardware logic chiplets can include special purpose hardware logic chiplets 1172, logic or I/O chiplets 1174, and/or memory chiplets 1175. The hardware logic chiplets 1172 and logic or I/O chiplets 1174 may be implemented at least partly in configurable logic or fixed-functionality logic hardware and can include one or more portions of any of the processor core(s), graphics processor(s), parallel processors, or other accelerator devices described herein. The memory chiplets 1175 can be DRAM (e.g., GDDR, I-IBM) memory or cache (SRAM) memory. Cache memory 1192 within the active interposer 1189 (or substrate 1180) can act as a global cache for the package assembly 1190, part of a distributed global cache, or as a dedicated cache for the fabric 1185.

Each chiplet can be fabricated as separate semiconductor die and coupled with a base die that is embedded within or coupled with the substrate 1180. The coupling with the substrate 1180 can be performed via an interconnect structure 1173. The interconnect structure 1173 may be configured to route electrical signals between the various chiplets and logic within the substrate 1180. The interconnect structure 1173 can include interconnects such as, but not limited to bumps or pillars. In some embodiments, the interconnect structure 1173 may be configured to route electrical signals such as, for example, input/output (I/O) signals and/or power or ground signals associated with the operation of the logic, I/O, and memory chiplets. In one embodiment, an additional interconnect structure couples the active interposer 1189 with the substrate 1180.

In some embodiments, the substrate 1180 is an epoxy-based laminate substrate. The substrate 1180 may include other suitable types of substrates in other embodiments. The package assembly 1190 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, a logic or I/O chiplet 1174 and a memory chiplet 1175 can be electrically coupled via a bridge 1187 that is configured to route electrical signals between the logic or I/O chiplet 1174 and a memory chiplet 1175. The bridge 1187 may be a dense interconnect structure that provides a route for electrical signals. The bridge 1187 may include a bridge substrate composed of glass or a suitable semiconductor material. Electrical routing features can be formed on the bridge substrate to provide a chip-to-chip connection between the logic or I/O chiplet 1174 and a memory chiplet 1175. The bridge 1187 may also be referred to as a silicon bridge or an interconnect bridge. For example, the bridge 1187, in some embodiments, is an Embedded Multi-die Interconnect Bridge (EMIB). In some embodiments, the bridge 1187 may simply be a direct connection from one chiplet to another chiplet.

Figure 11D:
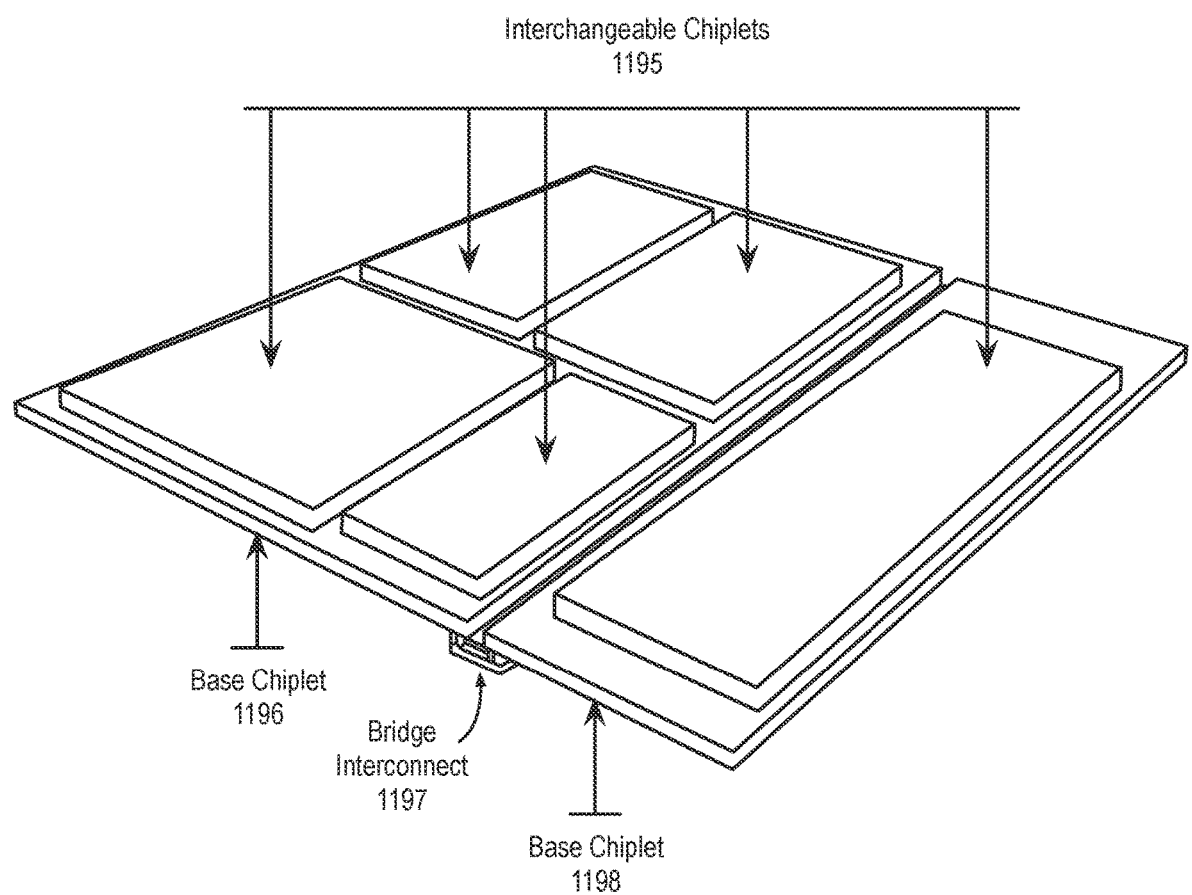

FIG. 11D illustrates a package assembly 1194 including interchangeable chiplets 1195, according to an embodiment. The interchangeable chiplets 1195 can be assembled into standardized slots on one or more base chiplets 1196, 1198. The base chiplets 1196, 1198 can be coupled via a bridge interconnect 1197, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 1196, 1198, which can be fabricated using a different process technology relative to the interchangeable chiplets 1195 that are stacked on top of the base chiplets. For example, the base chiplets 1196, 1198 can be fabricated using a larger process technology, while the interchangeable chiplets can be manufactured using a smaller process technology. One or more of the interchangeable chiplets 1195 may be memory (e.g., DRAM) chiplets. Different memory densities can be selected for the package assembly 1194 based on the power, and/or performance targeted for the product that uses the package assembly 1194. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Exemplary System on a Chip Integrated Circuit

Figure 12:
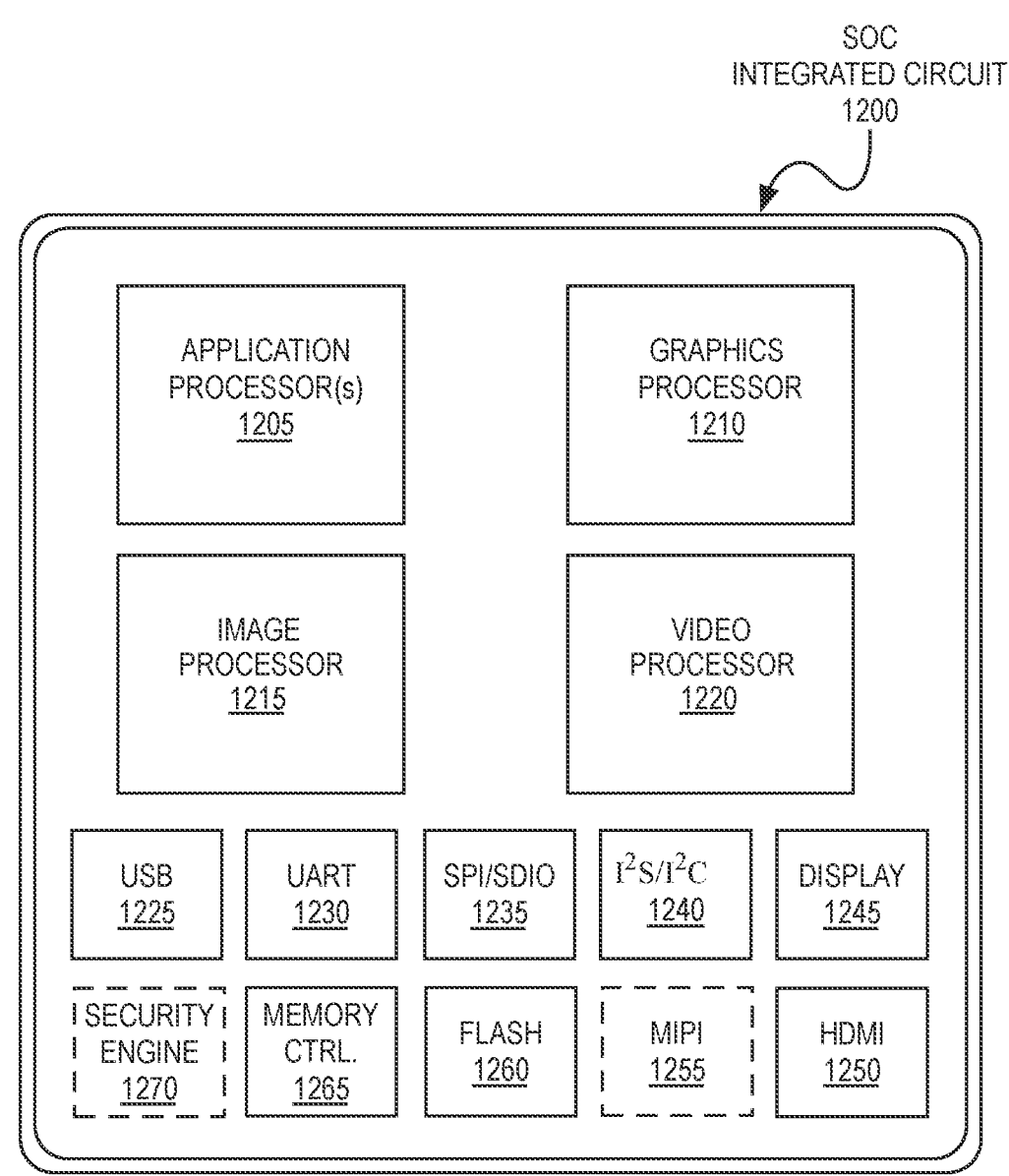
FIG. 12 is a block diagram illustrating an exemplary system on a chip integrated circuit that may be fabricated using one or more IP cores, according to an embodiment.
Figure 13A:
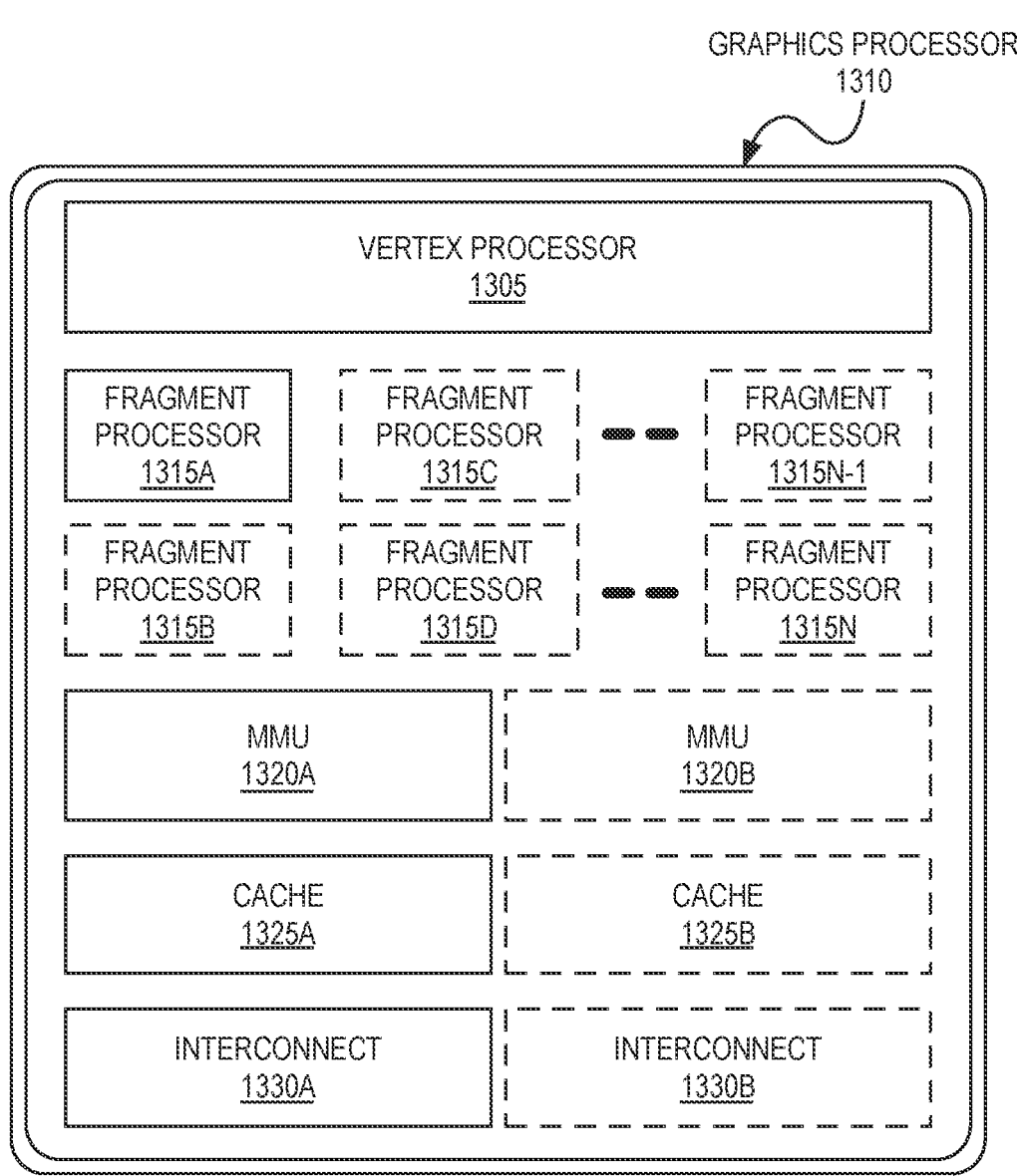
FIG. 13A-13B illustrate exemplary graphics processors that may be fabricated using one or more IP cores, according to embodiments described herein.
Figure 13B:
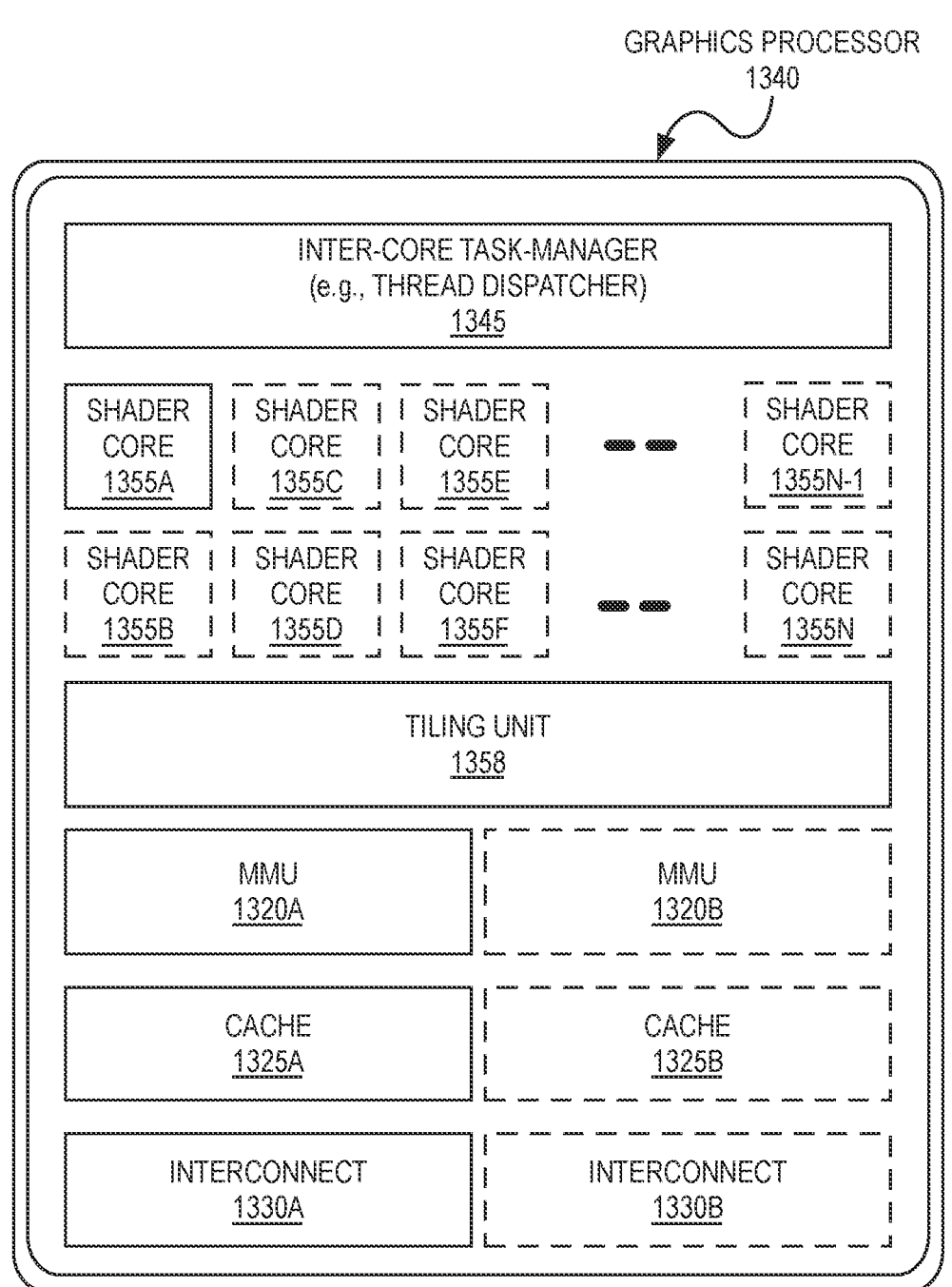

FIG. 12 and FIG. 13A-13B illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of graphics processor 1310 and graphics processor 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, cache(s) 1325A-1325B, and circuit interconnect(s) 1330A-1330B of the graphics processor 1310 of FIG. 13A. Graphics processor 1340 includes one or more shader core(s) 1355A-1355N (e.g., 1355A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The unified shader core architecture is also configurable to execute direct compiled high-level GPGPU programs (e.g., CUDA). The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14:
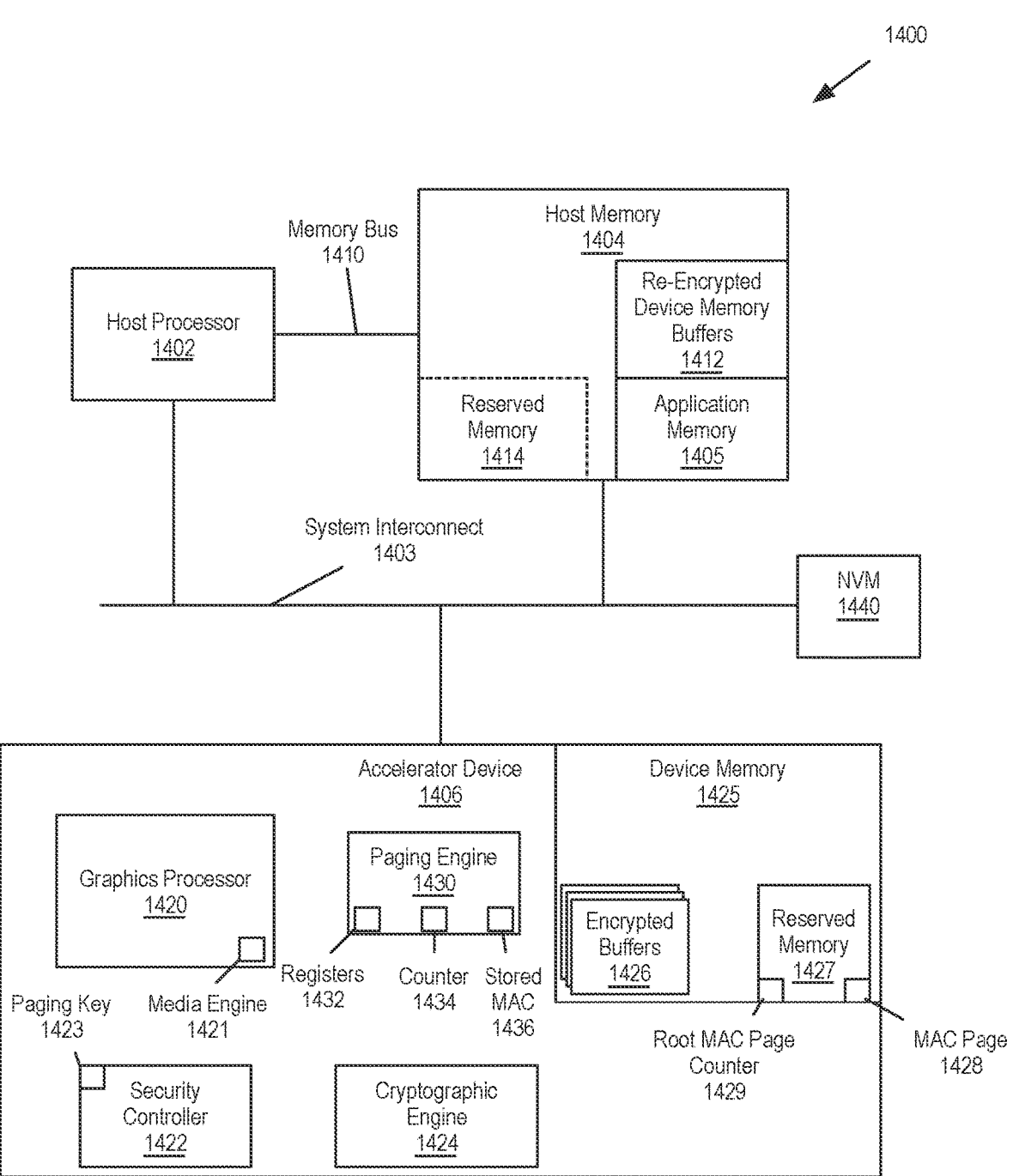
FIG. 14 illustrates a data processing system that includes support for the paging of encrypted device memory, according to embodiments described herein.

FIG. 14 illustrates a data processing system 1400 that includes support for the paging of encrypted device memory, according to embodiments described herein. The data processing system 1400 includes a host processor 1402 (e.g., CPU) that couples with host memory 1404 (e.g., system memory) and an accelerator device 1406 (e.g., GPU, media accelerator), and non-volatile memory (NVM 1440). The NVM 1440 can be a magnetic hard disk device or solid-state memory device. The NVM 1440 can be system storage space that is managed by the host processor 1402. In one embodiment the NVM 1440 may be accessed directly by the accelerator device 1406. In one embodiment, the NVM 1440 can be included on-board the accelerator device 1406. Although the data processing system 1400 is illustrated with the accelerator device 1406 being a discrete device, the concepts described herein are also applicable to any device having a dedicated memory that stores encrypted data that may be paged out to a host or system memory pool and/or non-volatile memory.

The accelerator device 1406 includes a graphics processor 1420, a security controller 1422, a cryptographic engine 1424, a paging engine 1430, and device memory 1425. The graphics processor 1420 can be one of multiple graphics processors in the accelerator device 1406, which may be a multi-tile or multi-die device and/or a multi-chip module. In one embodiment, the graphics processor 1420 includes a media engine 1421 that includes video encode and/or decode circuitry. The media engine 1421 may also reside on a separate tile or die as the graphics processor 1420. The accelerator device 1406 is associated with a dedicated portion of reserved memory that is used to store data that is used the operation of the device. In one embodiment, the reserved memory 1427 is a portion of the device memory 1425, although in other embodiments reserved memory 1414 in host memory 1404 may be used. In such embodiments, data described as being stored in reserved memory 1427 will instead be stored in reserved memory 1414. The reserved memory 1414 and/or reserved memory 1427 are access limited portions of memory. In one embodiment, at least portions of reserved memory 1414 and/or reserved memory 1427 are not accessible by the host processor 1402. For example, reserved memory 1414 and/or reserved memory may be mapped out of the address space that is accessible by the host processor 1402.

The host memory 1404 includes application memory 1405 for an application that is executed by the host processor 1402. In one embodiment, the host processor 1402 couples with the host memory 1404 via a memory bus 1410. The host processor 1402 and the accelerator device 1406 couple via a system interconnect 1403 such as, but not limited to, a PCI Express interconnect. The system interconnect 1403 enables communication between the host processor 1402 and the accelerator device 1406. The accelerator device 1406 can also be configured to access the host memory 1404 via I/O transactions facilitated by one or more DMA controllers. In one embodiment, the one or more DMA controllers enable data transfers to be routed between the host memory 1404 and the accelerator device 1406 without requiring the execution of explicit load and store commands by the host processor 1402 and can access the host memory 1404 via the memory bus 1410 and associated memory controllers within the host processor 1402. In one embodiment, at least a portion of the host memory 1404 is coupled directly with the system interconnect 1403 and is accessible via a compute express link (CXL) protocol, such as the CXL.mem protocol.

The graphics processor 1420 and media engine 1421 are configurable to perform operations on data stored within encrypted buffers 1426 in the device memory 1425. The encrypted buffers 1426 can include data such as DRM encrypted media or other data that is encrypted using AES XTS or another HPA-based encryption scheme. When memory pressure associated with the device memory 1425 indicates that memory pages that store encrypted buffers 1426 should be paged out to the host memory 1404 and/or the NVM 1440, memory pages of the device memory 1425 that store the encrypted buffers 1426 are decrypted and re-encrypted before being paged out to the host memory 1404 and/or NVM 1440. The paged-out encrypted buffers 1426 can be stored as re-encrypted device memory buffers 1412 in the host memory 1404.

In one embodiment, the pages are decrypted and re-encrypted by the cryptographic engine 1424 at the request of the paging engine 1430 during the page-out and page-in process. The paging engine 1430 can initiate the page-out or page-in of memory in response to a command or instruction that is received from an application that is executed by the host processor 1402, which may be an untrusted application. To maintain the security of the encrypted buffers 1426, pages that store the encrypted buffers 1426 are re-encrypted during page-out and decrypted during page-in. The re-encryption and decryption are performed using a paging key 1423 that is known only to the accelerator device 1406. In one embodiment, the paging key 1423 is stored within and/or managed by the security controller 1422. The paging key 1423 can be derived from a base hardware key using a key derivation function. In a virtualized environment, each virtual instance of the accelerator device 1406 has a different instance of the paging key 1423 that is generated when booting the virtual environment. The verify the integrity of memory pages, a message authentication code (MAC) is generated for pages during page-out and verified during page-in. The MAC value, which may also be referred to as a checksum, error detection code, hash, keyed hash, message authentication code, or protected checksum, is used to verify the authenticity and the integrity of re-encrypted data that is stored in memory that is accessible to untrusted hardware and software. The MAC value may be a keyed-hash message authentication code (HMAC) that is generated using any one or more of a variety of cryptographic algorithms, such as, but not limited to cryptographic hash functions. The MAC value may also be generated using block cipher algorithms.

The MACs for paged-out pages are stored in an indexed slot within a MAC page 1428 that is stored in the reserved memory 1427 (or in one embodiment, reserved memory 1414). The base address of the MAC page 1428 is stored in a register in a set of registers 1432 that are included within or associated with the paging engine. In one embodiment, the register that stores the base address of the MAC page 1428 is access protected and can only be written to by the security controller 1422.

Each instance of the MAC page 1428 has an associated counter value, which is based on a counter 1434 that is included within or associated with the paging engine 1430. The counter value for each instance of the MAC page 1428 is used as a version number for that instance of the MAC page 1428. Additionally, each entry in the MAC page 1428 has an associated counter value. At least a portion of the current value of the counter 1434 is stored in always-on memory that is preserved during low power device or system states. The counter 1434 is readable by software that executes on the host processor 1402 and is self-incrementing by the hardware of the accelerator device 1406. The counter value for an evicted page that stores one or more of the encrypted buffers 1426 is stored as metadata for the evicted page. The version number of the MAC page that stores the MAC for the evicted page is also stored in the metadata. The metadata for an evicted page is used as an additional input for re-encryption during page-out and decryption during page-in.

As no limit is applied to the number of pages of encrypted data that may be paged out, when the MAC page 1428 becomes full, the MAC page 1428 itself may be paged out and a new instance of the MAC page 1428 may be created and/or loaded into the reserved memory 1427. The paging engine 1430 can store one or more MAC values (e.g., stored MAC 1436) in the event the active instance of the MAC page 1428 is paged out. The MAC value of a MAC page to be paged in can be read from the MAC page that stores that MAC value of the MAC page to be loaded and stored to the stored MAC 1436. The MAC page to be paged in can then be verified via the use of the stored MAC 1436.

The set of registers 1432 can also include a register that stores the version number that will be used for the next MAC page to be loaded when the current instance of the MAC page 1428 becomes full and is paged out. The multiple instances of the MAC page 1428 may be logically arranged in a hierarchical manner, with a root instance of the MAC page 1428 and successive child page instances of the MAC page 1428. In one embodiment, each child instance of the MAC page 1428 includes a pointer or reference to the previous instance of the MAC page. Metadata for each evicted page that is paged out includes a version number that identifies the instance of the MAC page 1428 that stores the MAC for the page. This metadata enables the correct instance of the MAC page 1428 to be loaded to verify a previously evicted page during page-in. In one embodiment, software executed by the host processor 1402 (e.g., the application associated with the application memory 1405).

Figure 15A:
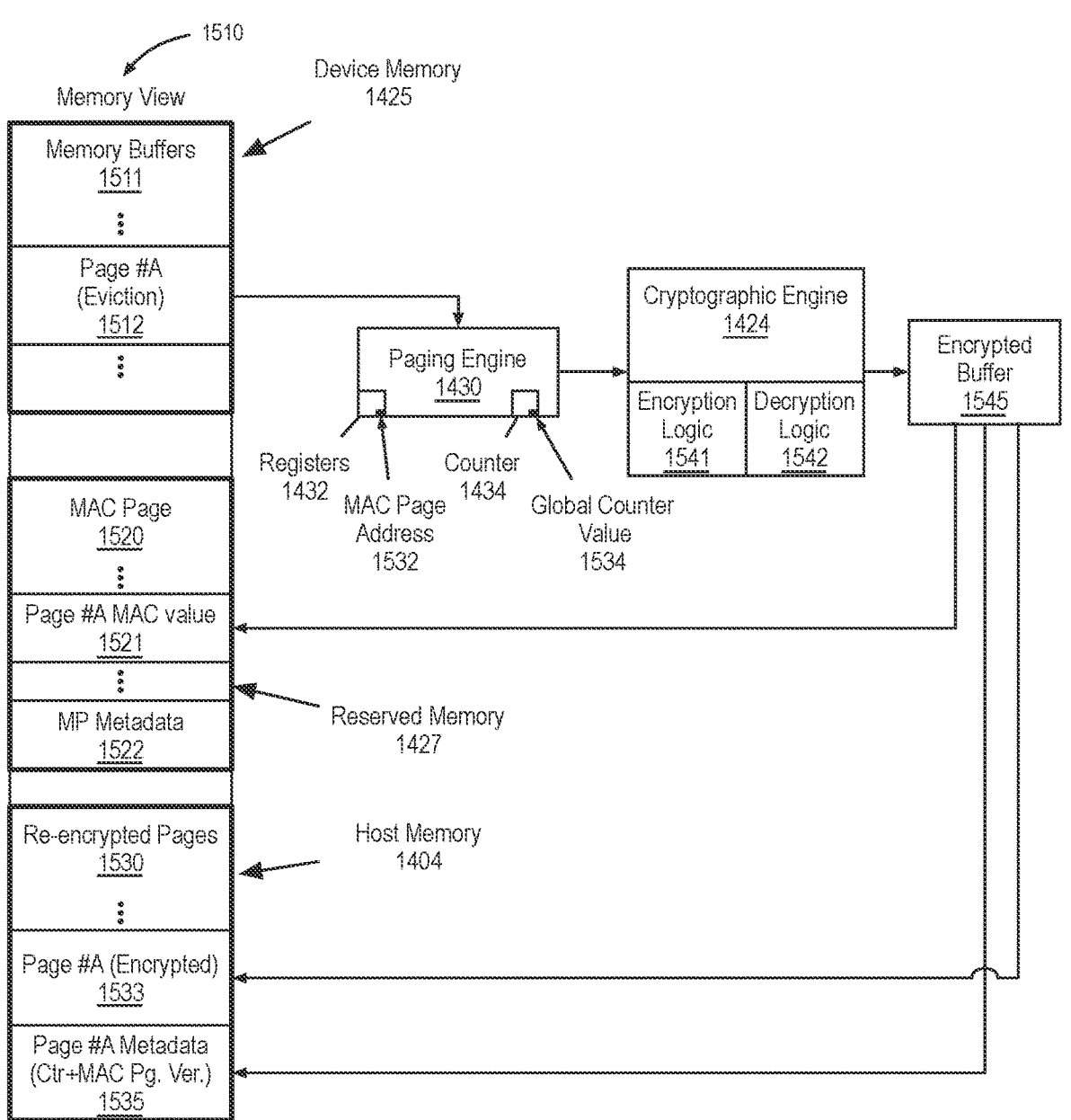
FIG. 15A-15B illustrate paging for encrypted memory pages, according to embodiments described herein.
Figure 15B:
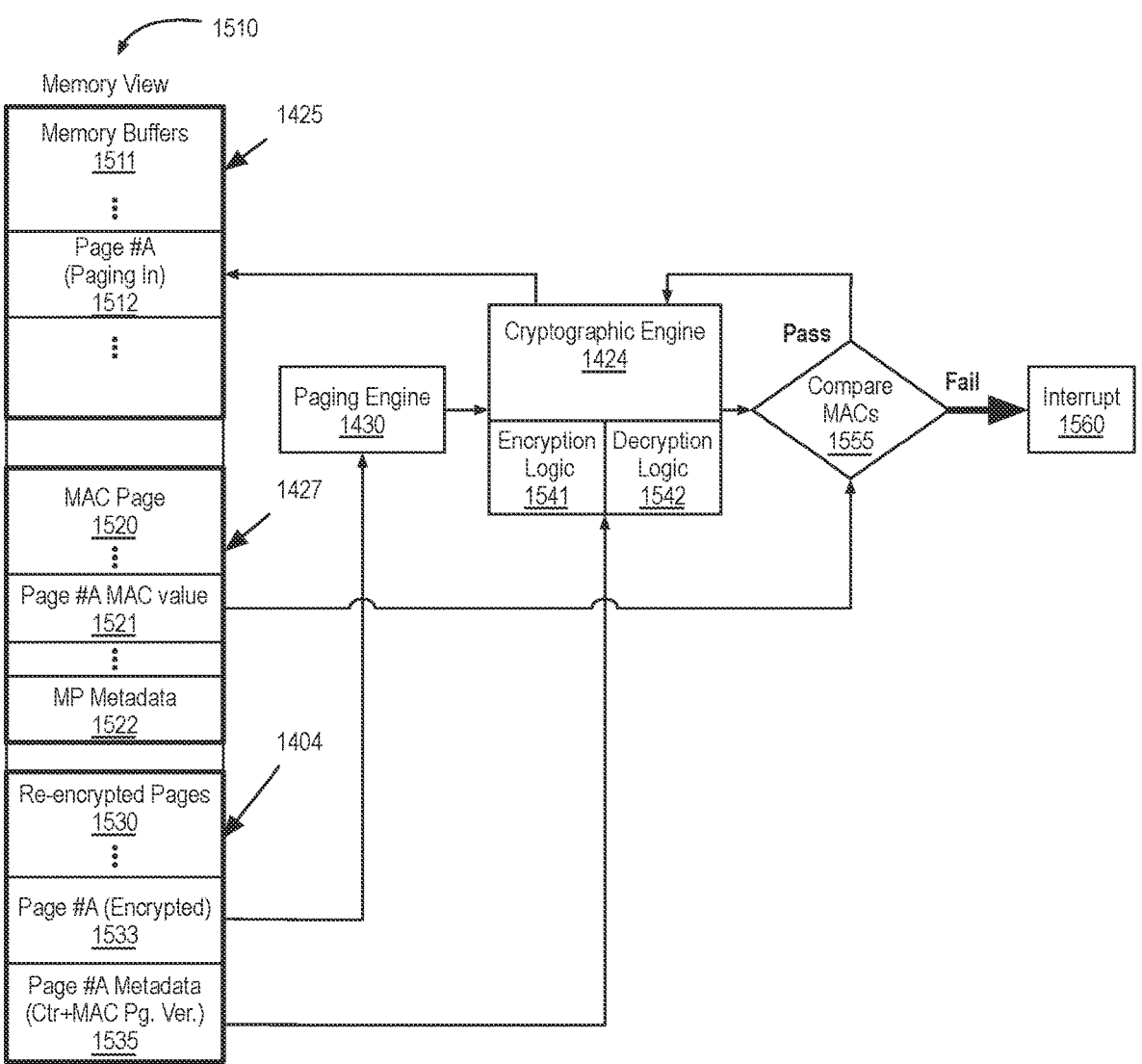

FIG. 15A-15B illustrate paging for encrypted memory pages, according to embodiments described herein. FIG. 15A illustrates eviction of a device memory page in memory associated with an accelerator device. FIG. 15B illustrates restoration of an evicted page back into the memory associated with the accelerator device.

As shown in FIG. 15A, a memory view 1510 illustrates exemplary contents of device memory 1425, reserved memory 1427, and host memory 1404. The device memory 1425 stores memory buffers, which can include encrypted memory buffers 1426 shown in FIG. 14. Encrypted memory buffers are stored in memory pages of the device memory 1425. Reserved memory 1427 is used to store a MAC page 1520 that stores MAC values for evicted pages that store encrypted memory buffers. The host memory 1404 stores re-encrypted memory pages 1530, which store data from encrypted memory buffers that are stored in evicted pages. The encrypted memory buffers are decrypted from the HPA-based encryption scheme and the evicted memory page is re-encrypted using the paging key 1423.

During device initialization, device initialization software associated with a device driver or firmware executed by the accelerator device configures the MAC page 1520 in the reserved memory 1427. The base address for the MAC page 1520 (MAC page address 1532) is stored in a register within the registers 1432 of the paging engine 1430. The register that stores the MAC page address 1532 is access protected and, in one embodiment, can only be set by the security controller 1422. The MAC page 1520 also stores MAC page metadata 1522 that includes identification information for the current and previous instances of the MAC page 1520, as detailed further in FIG. 16.

Page #A 1512 is illustrated as an exemplary memory page that can be selected for eviction from device memory 1425 due to memory pressure. In response to a request to evict Page #A 1512, the paging engine 1430 can process Page #A 1512 for eviction. The paging engine 1430 can provide, to the cryptographic engine 1424, a global counter value 1534 that is the current value of the counter 1434 and a reference to Page #A 1512. The cryptographic engine 1424 includes circuitry that provides encryption logic 1541 and decryption logic 1542. As the accelerator device 1406 is authorized to decrypt encrypted buffers within Page #A 1512, the cryptographic engine 1424 has access to the cryptographic material to decrypt the encrypted buffers that are encrypted using HPA-based encryption. The encrypted buffers in Page #A 1512 are decrypted by the cryptographic engine 1424 using the decryption logic 1542. The encryption logic 1541 can then encrypt (e.g., re-encrypt) Page #A 1512 using the paging key 1423 and the global counter value 1534 to generate an encrypted buffer 1545. The encrypted buffer 1545 includes a Page #A MAC value 1521, an encrypted version of Page #A 1533, and Page #A metadata 1535. The Page #A metadata 1535 includes the global counter value 1534 used to generate an encrypted version of Page #A 1533, as well as the version number for the MAC page 1520 that stores the Page #A MAC value 1521. In one embodiment, the Page #A MAC value 1521 is generated for Page #A 1512 after decryption and before re-encryption. The Page #A MAC value 1521 is stored to an entry in the MAC page 1520 in the reserved memory 1427. The encrypted version of Page #A 1533 and Page #A metadata 1535 are stored to the re-encrypted memory pages 1530 in the host memory 1404.

Re-encrypted memory pages 1530 in the host memory 1404 may be further paged out to non-volatile memory (e.g., NVM 1440) by a host operating system due to memory pressure associated with the host memory 1404 without any further action required by the accelerator device 1406. In one embodiment, instead of paging to host memory 1404, the re-encrypted memory pages 1530 may instead be stored directly to NVM 1440.

As shown in FIG. 15B, when data within the re-encrypted memory pages 1530 is paged back into the device memory 1425, the paging engine 1430 can retrieve the encrypted version of Page #A 1533 and Page #A metadata 1535 and decrypt the encrypted version of Page #A 1533 via the cryptographic engine 1424. Decryption logic 1542 within the cryptographic engine 1424 can decrypt the encrypted version of Page #A 1533 using the paging key 1423 and the counter value stored in the Page #A metadata 1535. The MAC page version number stored in the Page #A metadata 1535 allows the correct instance of the MAC page 1520 to be loaded to verify the integrity of the encrypted version of Page #A 1533. An operation 1555 is performed in which the MAC value generated for the decrypted version of Page #A 1512 is compared with the Page #A MAC value 1521 stored in the MAC page 1520. If the comparison passes, the cryptographic engine 1424 can re-encrypt the encrypted buffers within Page #A 1512 using HPA-based encryption based on the hardware physical address to which Page #A 1512 is to be stored. If the comparison fails, an interrupt 1560 is generated and the page-in operation is halted, as the difference in the MAC value indicates that Page #A 1512 may have been modified while stored as the encrypted version of Page #A 1533 in the host memory 1404 (or when paged to non-volatile memory) and may no longer be valid. The interrupt 1560 may be handled by software that is orchestrating the operations performed using the encrypted data, a driver associated with the accelerator device, or other software or hardware within the data processing system.

Figure 16:
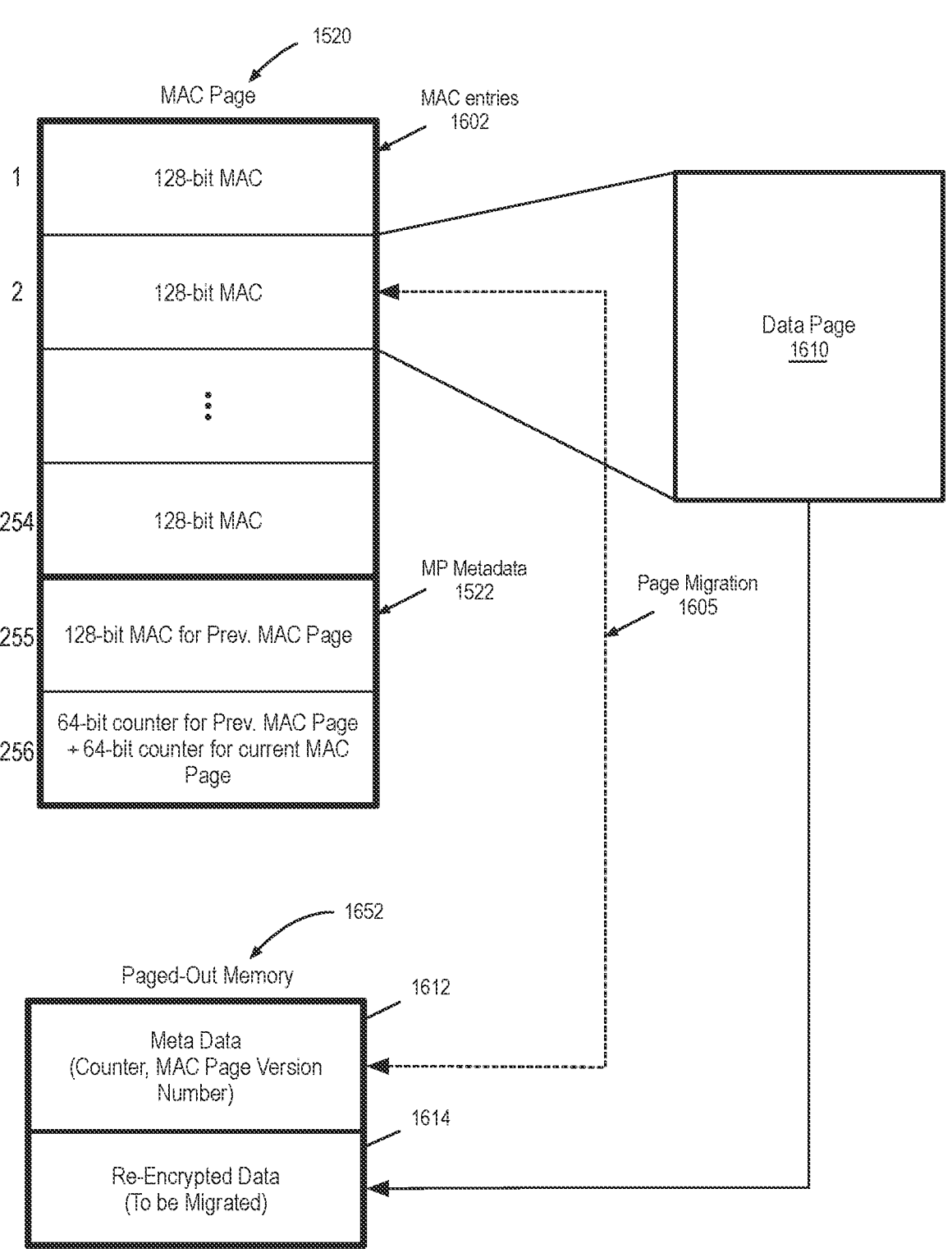
FIG. 16 illustrates exemplary details for a MAC page and metadata, according to an embodiment.

FIG. 16 illustrates exemplary details for the MAC page and paging metadata, according to an embodiment. The MAC page 1520 stores MAC entries 1602 and MAC page metadata 1522. The specific size of the MAC page 1520 may vary and in some instances may correlate with the physical memory page sizes supported by the accelerator device 1406 and the host processor 1402. For example, a 32-kilobyte instance of the MAC page 1520 can store 256 entries of 128-bits in size and may span eight 4-kilobyte physical memory pages. While 128-bit MAC values are described herein, embodiments are not limited to any specific size A portion of the 128-bit entries of the MAC page 1520 are reserved for MAC page metadata 1522, which in on embodiment includes an 128-bit MAC entry for the previous instance of the MAC page, and an 128-bit entry that includes a 64-bit counter for the previous instance of the MAC page and the 64-bit counter for the current instance of the MAC page 1520, where the counter for an instance of the MAC page 1520 is the starting counter value for that instance. While the MAC page metadata 1522 is illustrated as being stored in the final entries of the MAC page 1520, in one embodiment the MAC page metadata 1522 are stored in the initial entries of the MAC page 1520. For example, when a new instance of the MAC page 1520 is loaded into the reserved memory 1427, the 128-bit MAC for the previous MAC page may be stored as the initial 128-bit MAC in the new instance of the MAC page 1520 and the next 128-bit entry is used to store the initial 64-bit counter value associated with the previous instance of the MAC page 1520 and the initial 64-bit counter value that is representative of the current instance of the MAC page 1520. Successive counter values are then associated with each of the remaining 128-bit MAC entries stored in the new instance of the MAC page 1520. In one embodiment, given a counter value associated with a migrated page, which is stored as page metadata 1612 for the migrated page, a modulo-256 operation can be performed on the counter value to determine the entry in the MAC page 1520 that stores the MAC value for a migrated data page.

The remaining entries of the MAC page 1520 are used to store MAC entries 1602 for instances of data pages that are subject to page migration operation 1605. The page migration operation 1605 is used, for example, to migrate re-encrypted data 1614 for the data page 1610 from device memory 1425 to paged-out memory 1652 and to migrate the re-encrypted data 1614 back into device memory 1425. The paged-out memory 1652 can reside in host memory 1404 and/or NVM 1440, where data may be paged to host memory 1404 and subsequently paged to NVM 1440. Data may also be paged directly to NVM 1440. In one embodiment the accelerator device 1406 has direct access to or control of at least a portion of the NVM 1440. In one embodiment, the accelerator device 1406 may directly access at least a portion of the host memory 1404 via a protocol such as the CXL.mem protocol.

The page migration operation 1605 can also be used to migrate an instance of the MAC page 1520 when that instance becomes full. The instance of the MAC page 1520 is encrypted, a MAC is determined for the encrypted instance of the MAC page 1520, and this determined MAC is stored at a specific entry in the next instance of the MAC page 1520 that is loaded into the reserved memory 1427. This specific entry is a pre-determined entry within the MAC page metadata 1522 within the new instance of the MAC page 1520, where the MAC page metadata 1522 may be stored in a header or footer that resides at the initial or final entries of the new instance of the MAC page 1520. In one embodiment, the MAC page 1520 is encrypted using the paging key 1423 that is protected by the security controller 1422. In one embodiment, the MAC page 1520 is encrypted using a separate key, which may be a parent or child of the paging key 1423 on a key hierarchy, such as a root paging key from which the paging key 1423 is derived or a key that is derived based on the 1423 and additional cryptographic material.

The page metadata 1612 for the migrated page includes a counter value, which is the global counter value at the time in which the page migration operation 1605 is initiated, and the version number of the instance of the MAC page 1520 that stores the MAC value for the migrated page. In one embodiment, the version number of the instance of the MAC page 1520 is the global counter value that is current when configuring the new instance of the MAC page 1520, although other versioning schemes are used in other embodiments. The version number of the instance of the MAC page 1520 can be associated with various location identifiers that are used to locate previous instances of the MAC page 1520 that have been paged out. For example, the version number can be used a key or index into a data structure that stores a pointer for previous instances of the MAC page 1520 that have been paged out to enable those pages to be paged back in.

In one embodiment, the page migration operation 1605 is initiated by untrusted software via an instruction or command that is submitted to trusted hardware within the accelerator device 1406. In various embodiments, the page migration operation 1605 is managed by the application that performs operations using the encrypted data. The application may be, for example, a media player application that is managing the playback of DRM encrypted media but is not limited as such. In one embodiment, the driver for the accelerator device 1406 is also involved in the page migration operation 1605. As the driver executes on the host processor 1402, the driver is considered untrusted software when executed by a portion of the host processor 1402 that resides outside of the TCB. Thus, the driver is prevented from accessing unencrypted data within the data page 1610 during the page migration operation 1605.

In one embodiment, the application is responsible for ensuring that the appropriate instance of the MAC page 1520 is resident within the reserved memory 1427 when paging in an instance of the data page 1610 to enable the data page 1610 to be verified upon page-in. In such embodiment, the graphics driver may manage data structures that track the relationship between MAC page versions and the memory addresses that store the paged-out MAC pages. In one embodiment, the data structures that track the relationship between MAC page versions and the memory addresses is directly managed by the application.

Figure 17:
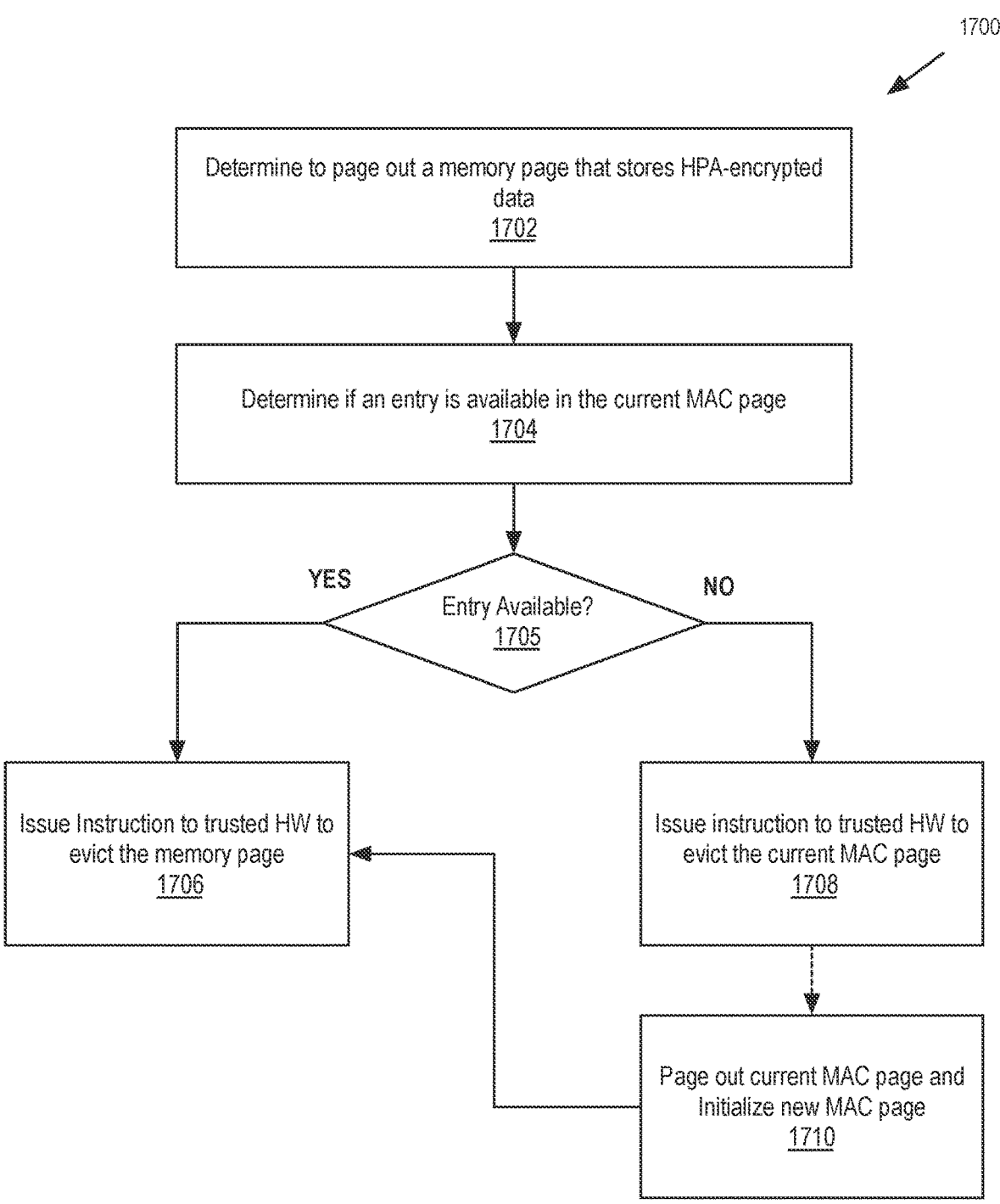
FIG. 17 illustrates a method for managing MAC pages during page migration, according to an embodiment.

FIG. 17 illustrates a method 1700 for managing MAC pages during page migration, according to an embodiment. Method 1700 is performed by untrusted software on a data processing system, which may be any combination of application logic and driver logic. The method 1700 is performed to facilitate page migration for a memory page that stores HPA-based encrypted data, which is data that is encrypted using cryptographic material that includes at least a portion of the hardware physical address of the data. The HPA-based encrypted data may not be properly decrypted if the data is copied to a different physical address, even if an attacker can otherwise direct the accelerator device to attempt to decrypt the data after it has been copied. In various configurations, the memory page may store discretely encrypted buffers, the entire page may be encrypted according to the base physical address of the memory page, or a combination of these encryption techniques may be used.

In one embodiment, an operation 1702 is performed to determine to page out a memory page that stores HPA-encrypted data, which is data that is encrypted using HPA-based encryption. An operation 1704 is then performed to determine if an entry is available in the current MAC page. The availability of an entry can be determined using a variety of techniques, including via a data structure that actively tracks the number of remaining entries in the current MAC page or by dynamically determining the number of available entries consumed and available based on the current global counter value modulo the number of entries stored in each MAC page. If an entry is available in the current MAC page (1705, YES), an operation 1706 is performed to issue an instruction to trusted hardware to evict the memory page. If an entry is not available in the current MAC page (1705, NO), then an operation 1708 is performed to issue an instruction to trusted hardware to evict the current MAC page. In response to the instruction to evict the current MAC page, an operation 1710 is be performed by the trusted hardware to page out the current MAC page and initialize a new MAC page. The untrusted software can then issue the instruction to the trusted hardware to evict the memory page. With additional reference to FIG. 14, the current MAC page can be paged out to host memory 1404 and/or NVM 1440. In one embodiment, the current MAC page may be paged out from the reserved memory 1427 of the device memory 1425 to another portion of the device memory 1425.

According to method 1700, if multiple memory pages are to be evicted, the untrusted software may face three scenarios. There may be enough entries in the current MAC page to store MAC values for all pages to be evicted, there may be enough entries in the current MAC page to store some but not all MAC values for the pages to be evicted, or there are insufficient entries for any of the pages to be evicted. If only a portion of the required entries are available, the page migration operation can span across multiple MAC pages, with MAC values for a first set of pages being stored in the current page and the MAC values for a second set of pages to be stored in the next MAC page after the current MAC page is evicted.

FIG. 18 illustrates a method 1800 to evict a memory page during page migration, according to an embodiment. The method 1800 can be performed by trusted hardware within an accelerator device in response to an instruction or command to evict a memory page that stores HPA-encrypted data. In one embodiment, the trusted hardware can receive instruction or command to evict a memory page that stores HPA-encrypted data, as shown at block 1802. The instruction or command can include or be associated with a first data buffer to store page data and a second data buffer to store memory page metadata. The trusted hardware can then perform an operation 1803 to decrypt HPA encrypted data within the memory page. The trusted hardware can then perform an operation 1804 to determine a MAC value for the memory page. The trusted hardware can then perform an additional operation 1806 to encrypt the memory page using a paging key and a current counter value. Operation 1804 can be performed using a cryptographic engine 1424 as in FIG. 14. The trusted hardware can then perform an operation 1808 to store the current counter value, MAC value, and MAC page version number to the memory page metadata. The trusted hardware then performs an operation 1810 to copy the encrypted page to the first data buffer and the memory page metadata to the second data buffer. Alternatively, the encrypted page and the memory page metadata may be copied to a single buffer. Operation 1810 can be performed using a paging engine 1430 as in FIG. 14. The trusted hardware can then perform an operation 1812 to store the MAC value of the memory page to MAC page.

FIG. 19 illustrates a method 1900 to evict a MAC page during page migration, according to an embodiment. The method 1900 can be performed by trusted hardware within an accelerator device in response to an instruction or command to evict a MAC page once all entries in the MAC page are filled. In one embodiment, the trusted hardware can receive instruction or command to evict the MAC page, where the instruction or command includes or is associated with a first data buffer to store MAC page data and a second data buffer to store MAC page metadata, as shown at block 1902. In one embodiment, the trusted hardware can perform an operation 1904 to encrypt the MAC page using a root page key and the current counter value. In this embodiment, the root page key is a parent key of the paging key 1423 on a key hierarchy. The MAC page can be encrypted using the cryptographic engine 1424 as in FIG. 14. The trusted hardware can perform an operation 1906 to determine a MAC value for the MAC page, which in one embodiment is determined based on the encrypted MAC page, the version number of the MAC page, and the current counter value. The trusted hardware can then perform an operation 1908 to store a current counter value and MAC page version to MAC page metadata. The trusted hardware can then perform an operation 1910 to copy encrypted MAC page to the first data buffer and the MAC page metadata to the second buffer. Alternatively, the encrypted MAC page and the MAC page metadata may be copied to a single buffer. Operation 1910 can be performed using a paging engine 1430 as in FIG. 14. In various embodiments and configurations, the paging engine 1430 can page out the MAC page to host memory 1404 and/or NVM 1440. In one embodiment the paging engine 1430 can page out the MAC page from the reserved memory 1427 to a non-reserved portion of the device memory 1425.

The trusted hardware can then perform an operation 1912 to initialize new MAC page having an incremented counter and version number. The trusted hardware can then perform an operation 1914 to store the MAC value of the evicted MAC page to an entry in the new MAC page and an additional operation 1916 to store the counter value of the evicted MAC page and the counter value of new MAC page to an entry in the new MAC page. The MAC value of the evicted MAC page, the counter value of the evicted MAC page, and the counter value of new MAC page are stored to pre-determined locations within the new MAC page that are earmarked for use to store the MAC page metadata.

FIG. 20 illustrates a method 2000 to restore a memory page and an associated MAC page during page migration, according to an embodiment. Method 2000 is performed by untrusted software on a data processing system in concert with trusted hardware. When an encrypted memory page is to be paged in for use by an accelerator device, the software can perform an operation 2002 to read the version number of the MAC page that stores the MAC value of the encrypted memory page to be restored. The version number of the page to be restored is stored in the metadata for the page and is visible to untrusted software. If the version number matches the current MAC page (2003, YES), the software can proceed to an operation 2006 to request the trusted hardware to page in the encrypted memory page. If the version number does not match the current MAC page (2003, NO), the software can perform an operation 2005 to request the trusted hardware to page in and verify the MAC page identified by MAC page version number. In one embodiment, the application can provide the MAC version number to a driver of the accelerator device and the driver can resolve the address of the requested MAC page and request the trusted hardware to page in the requested MAC page. In one embodiment, the application can track the addresses of the MAC pages and request the driver to page in a specific MAC page. Verification of the paged in MAC page can be performed using a register that stores the MAC of a MAC page to be paged in, which in one embodiment is the stored MAC 1436 of FIG. 14. The MAC value of the MAC page to be paged in can be read from the MAC page that stores that MAC value of the MAC page to be paged in and stored to the stored MAC 1436. In one embodiment, the MAC value of the MAC page to be paged in is stored in the next MAC page that is created when a MAC page is paged out for the first time.

In response to the request performed during operation 2006, the trusted hardware can perform an operation 2008 to verify the paged-in encrypted memory page using the memory page metadata and MAC value in the MAC page. With reference to FIG. 14, the paging engine 1430 can store the MAC of the MAC page to be paged in as the stored MAC 1436. This stored MAC 1436 can be used to verify the integrity of the requested MAC page upon page-in to the reserved memory 1427. To verify the paged-in encrypted memory, the encrypted memory page is decrypted and the decrypted memory page is verified based on the MAC value before buffers within the memory page are re-encrypted using HPA-based encryption.

Additional Exemplary Computing Device

Figure 21:
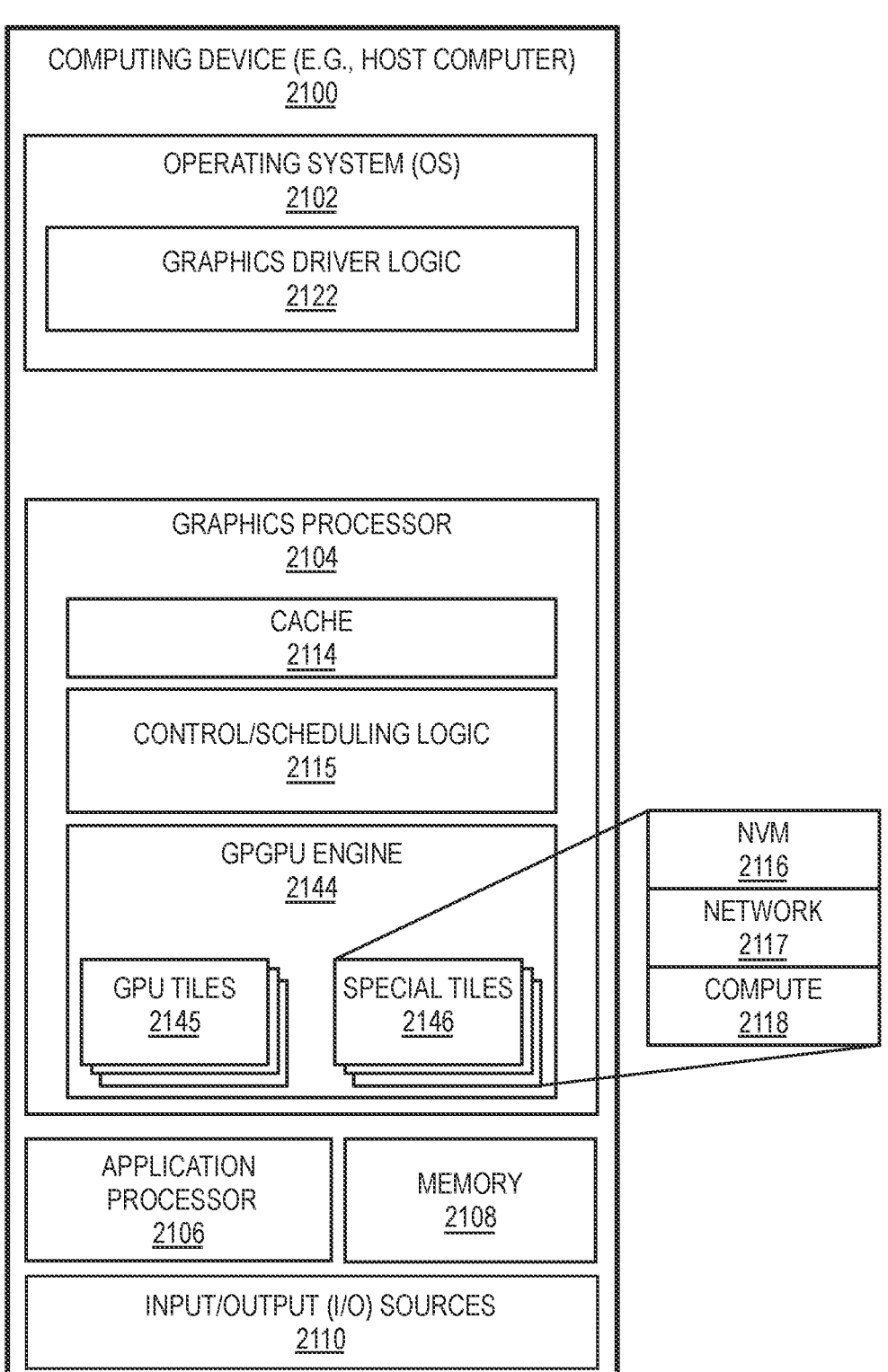
FIG. 21 is a block diagram of a computing device including a graphics processor, according to an embodiment

FIG. 21 is a block diagram of a computing device 2100 including a graphics processor 2104, according to an embodiment. Versions of the computing device 2100 may be or be included within a communication device such as a set-top box (e.g., Internet-based cable television set-top boxes, etc.), global positioning system (GPS)-based devices, etc. The computing device 2100 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2100 includes a mobile computing device employing an integrated circuit ("IC"), such as system on a chip ("SoC" or "SOC"), integrating various hardware and/or software components of computing device 2100 on a single chip. The computing device 2100 can be a computing device associated with the data processing system 100 as in of FIG. 1 or the data processing system 1400 of FIG. 14.

The computing device 2100 includes a graphics processor 2104. The graphics processor 2104 represents any graphics processor described herein. In one embodiment, the graphics processor 2104 includes a cache 2114, which can be a single cache or divided into multiple segments of cache memory, including but not limited to any number of L1, L2, L3, or L4 caches, render caches, depth caches, sampler caches, and/or shader unit caches. In one embodiment the graphics processor 2104 also includes control and scheduling logic 2115. The control and scheduling logic 2115 can be firmware executed by a microcontroller within the graphics processor 2104. The graphics processor 2104 also includes a GPGPU engine 2144 that includes one or more graphics engine(s), graphics processor cores, and other graphics execution resources as described herein. Such graphics execution resources can be presented in the forms including but not limited to execution units, shader engines, fragment processors, vertex processors, streaming multiprocessors, graphics processor clusters, or any collection of computing resources suitable for the processing of graphics resources or image resources or otherwise performing general purpose computational operations in a heterogeneous processor. The processing resources of the GPGPU engine 2144 can be included within multiple tiles of hardware logic connected to a substrate, as illustrated in FIG. 11B-11D. The GPGPU engine 2144 can include GPU tiles 2145 that include graphics processing and execution resources, caches, samplers, etc. The GPGPU engine 2144 can also include and one or more special tiles 2146 that include, for example, non-volatile memory 2116, network processing resources 2117, and/or general-purpose compute resources 2118.

As illustrated, in one embodiment, and in addition to the graphics processor 2104, the computing device 2100 may further include any number and type of hardware components and/or software components, including, but not limited to an application processor 2106, memory 2108, and input/output (I/O) sources 2110. The application processor 2106 can interact with a hardware graphics pipeline, as illustrated with reference to FIG. 3A, to share graphics pipeline functionality. Processed data is stored in a buffer in the hardware graphics pipeline and state information is stored in memory 2108. The resulting data can be transferred to a display controller for output via a display device, such as the display device 318 of FIG. 3A. The display device may be of various types, such as Cathode Ray Tube (CRT), Thin Film Transistor (TFT), Liquid Crystal Display (LCD), Organic Light Emitting Diode (OLED) array, etc., and may be configured to display information to a user via a graphical user interface.

The application processor 2106 can include one or processors, such as processor(s) 102 of FIG. 1 and may be the central processing unit (CPU) that is used at least in part to execute an operating system (OS) 2102 for the computing device 2100. The OS 2102 can serve as an interface between hardware and/or physical resources of the computing device 2100 and one or more users. The OS 2102 can include driver logic for various hardware devices in the computing device 2100. The driver logic can include graphics driver logic 2122, which can include the user mode graphics driver 1026 and/or kernel mode graphics driver 1029 of FIG. 10.

It is contemplated that in some embodiments the graphics processor 2104 may exist as part of the application processor 2106 (such as part of a physical CPU package) in which case, at least a portion of the memory 2108 may be shared by the application processor 2106 and graphics processor 2104, although at least a portion of the memory 2108 may be exclusive to the graphics processor 2104, or the graphics processor 2104 may have a separate store of memory. The memory 2108 may comprise a pre-allocated region of a buffer (e.g., framebuffer); however, it should be understood by one of ordinary skill in the art that the embodiments are not so limited, and that any memory accessible to the lower graphics pipeline may be used. The memory 2108 may include various forms of random-access memory (RAM) (e.g., SDRAM, SRAM, etc.) comprising an application that makes use of the graphics processor 2104 to render a desktop or 3D graphics scene. A memory controller hub, such as memory controller 116 of FIG. 1, may access data in the memory 2108 and forward it to graphics processor 2104 for graphics pipeline processing. The memory 2108 may be made available to other components within the computing device 2100. For example, any data (e.g., input graphics data) received from various I/O sources 2110 of the computing device 2100 can be temporarily queued into memory 2108 prior to their being operated upon by one or more processor(s) (e.g., application processor 2106) in the implementation of a software program or application. Similarly, data that a software program determines should be sent from the computing device 2100 to an outside entity through one of the computing system interfaces, or stored into an internal storage element, is often temporarily queued in memory 2108 prior to its being transmitted or stored.

The I/O sources can include devices such as touchscreens, touch panels, touch pads, virtual or regular keyboards, virtual or regular mice, ports, connectors, network devices, or the like, and can attach via a platform controller hub 130 as referenced in FIG. 1. Additionally, the I/O sources 2110 may include one or more I/O devices that are implemented for transferring data to and/or from the computing device 2100 (e.g., a networking adapter); or, for a large-scale non-volatile storage within the computing device 2100 (e.g., hard disk drive). User input devices, including alphanumeric and other keys, may be used to communicate information and command selections to graphics processor 2104. Another type of user input device is cursor control, such as a mouse, a trackball, a touchscreen, a touchpad, or cursor direction keys to communicate direction information and command selections to GPU and to control cursor movement on the display device. Camera and microphone arrays of the computing device 2100 may be employed to observe gestures, record audio and video and to receive and transmit visual and audio commands.

I/O sources 2110 configured as network interfaces can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing devices described herein may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), Open Computing Language (OpenCL®), CUDA®, DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

References herein to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

In the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present. Similarly, items listed in the form of "at least one of A, B, or C" can mean (A); (B); (C): (A and B); (B and C); or (A, B, and C).

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

The techniques described herein relate to an apparatus including a first memory device, a graphics processor coupled with the first memory device, and circuitry coupled with the first memory device and the graphics processor. The circuitry is configured to receive a request to page out a first memory page of the first memory device to a second memory device; generate a message authentication code (MAC) of the first memory page; store the MAC to a slot within a second memory page of the first memory device, where the slot within the second memory page corresponds with a first counter value of a counter included within the circuitry; encrypt the first memory page via a first page key and the first counter value to generate an encrypted first memory page; and copy the encrypted first memory page to the second memory device.

In one embodiment, the first memory page is configured to store encrypted data that is encrypted based on a hardware physical address (HPA) of the data and the circuitry is configured to decrypt the encrypted data before generation of the MAC for the first memory page. In one embodiment, the circuitry is configured to store the first counter value to first memory page metadata associated with the first memory page; store a second counter value associated with the second memory page to the first memory page metadata; and copy the first memory page metadata to the second memory device. In one embodiment, the circuitry is configured to receive a request to page in the encrypted first memory page to the first memory device; determine the slot within the second memory page that stores the MAC of the first memory page based on the first counter value stored to the first memory page metadata; decrypt the encrypted first memory page via the first page key and the first counter value; verify the first memory page based on the MAC of to the slot within the second memory page; and upon verification of the first memory page, encrypting data of the first memory page based on the HPA to which the data is to be stored; and store the first memory page to the first memory device. In one embodiment, the second memory page is stored to an access limited portion of the first memory device.

In one embodiment, the circuitry is configured to receive a request to page out the second memory page from the access limited portion of the first memory device; and encrypt the second memory page via a second page key and a second counter value associated with the second memory page to generate an encrypted second memory page, where the second page key differs from the first page key; and copy the encrypted second memory page from the access limited portion of the first memory device. In one embodiment, the circuitry is configured to copy the encrypted second memory page to the second memory device. In one embodiment, the circuitry is configured to initialize a successive instance of the second memory page in the access limited portion of the first memory device; and store second memory page metadata to the successive instance of the second memory page, the second memory page metadata including a MAC value of the encrypted second memory page, the second counter value, and a third counter value, where the third counter value is associated with the successive instance of the second memory page.

In one embodiment, the circuitry is configured to receive a request to page in the encrypted second memory page to the access limited portion of the first memory device; load the MAC value of the encrypted second memory page and the second counter value from the second memory page metadata of the successive instance of the second memory page; load the encrypted second memory page; decrypt the encrypted second memory page via the second page key and the second counter value; and store the second memory page to the access limited portion of the first memory device. In one embodiment, the second memory device is external to the apparatus and couples with the apparatus via a system interconnect. In one embodiment, the second memory device is a non-volatile memory device.

The techniques described herein additionally relate to a method including determining to page out a first memory page that includes data that is encrypted according to a hardware physical address (HPA) of the data, where the first memory page is associated with device memory of an accelerator device; determining if a slot is available in a second memory page to store a message authentication code (MAC) of the first memory page, the second memory page stored in an access limited portion of the device memory of the accelerator device; in response to a determination that a slot is available in the second memory page to store the MAC of the first memory page, issuing a first instruction to trusted hardware of the accelerator device to evict the first memory page from the device memory of the accelerator device, where the trusted hardware is configured to store the MAC of the first memory page to the slot in the second memory page; in response to a determination that a slot is not available in the second memory page to store the MAC of the first memory page issuing a second instruction to the trusted hardware to evict the second memory page from the access limited portion of the device memory of the accelerator device; and issuing the first instruction to the trusted hardware, where the trusted hardware is configured to store the MAC of the first memory page to a slot in a successive instance of the second memory page.

In one embodiment, the trusted hardware, in response to the first instruction, is configured to decrypt data that is encrypted according to the HPA of the data, encrypt the first memory page according to a first page key to generate an encrypted first memory page, and copy the encrypted first memory page to host memory of a data processing system that includes the accelerator device.

In one embodiment, the method additionally includes determining to page in the encrypted first memory page; determining the instance of the second memory page that stores the MAC of the first memory page; issuing a third instruction to the trusted hardware to page in the instance of the second memory page that stores the MAC of the first memory page; issuing a fourth instruction to the trusted hardware to page in the encrypted first memory page, where the trusted hardware is configured to decrypt the encrypted first memory page, verify the first memory page based on the MAC of the first memory page, and upon verification of the first memory page, encrypting data of the first memory page based on the HPA to which the data is to be stored.

In one embodiment, the method additionally includes determining the instance of the second memory page that stores the MAC of the first memory page based on metadata associated with the first memory page.

The techniques described herein additionally relate to a data processing system including a host processor; host memory coupled with the host processor; an accelerator device including accelerator device memory, a graphics processor coupled with the device memory, and circuitry coupled with the accelerator device memory and the graphics processor, circuitry configured to: receive a request to page out a first memory page of the accelerator device memory device to the host memory, where the first memory page is to store encrypted data that is encrypted based on a hardware physical address (HPA) of the data; decrypt the encrypted data; generate a message authentication code (MAC) of the first memory page; store the MAC to a slot within a second memory page of the accelerator device memory, where the slot within the second memory page corresponds with a first counter value of a counter included within the circuitry; encrypt the first memory page via a first page key and the first counter value to generate an encrypted first memory page; and copy the encrypted first memory page to the host memory.

In one embodiment, the circuitry of the accelerator device is configured to store the first counter value to first memory page metadata associated with the first memory page; store a second counter value associated with the second memory page to the first memory page metadata; and copy the first memory page metadata to the host memory.

In one embodiment the circuitry is configured to receive a request to page in the encrypted first memory page to the accelerator device memory; determine the slot within the second memory page that stores the MAC of the first memory page based on the first counter value stored to the first memory page metadata; decrypt the encrypted first memory page via the first page key and the first counter value; verify the first memory page based on the MAC of to the slot within the second memory page; and upon verification of the first memory page, encrypting data of the first memory page based on the HPA to which the data is to be stored; and store the first memory page to the accelerator device memory.

In one embodiment, the second memory page is stored to an access limited portion of the first accelerator device memory and the circuitry is configured to: receive a request to page out the second memory page from the access limited portion of the accelerator device memory; and encrypt the second memory page via a second page key and a second counter value associated with the second memory page to generate an encrypted second memory page, where the second page key differs from the first page key copy the encrypted second memory page from the access limited portion of the accelerator device memory; initialize a successive instance of the second memory page in the access limited portion of the accelerator device memory; and store second memory page metadata to the successive instance of the second memory page, the second memory page metadata including a MAC value of the encrypted second memory page, the second counter value, and a third counter value, where the third counter value is associated with the successive instance of the second memory page.

In one embodiment, the circuitry is configured to receive a request to page in the encrypted second memory page to the access limited portion of the accelerator device memory; load the MAC value of the encrypted second memory page and the second counter value from the second memory page metadata of the successive instance of the second memory page; load the encrypted second memory page; decrypt the encrypted second memory page via the second page key and the second counter value; and store the second memory page to the access limited portion of the accelerator device memory.

The specification and drawings are, accordingly, to be regarded in an illustrative rather than a restrictive sense. Those skilled in the art will appreciate that the broad techniques of the embodiments described herein can be implemented in a variety of forms. Therefore, while the embodiments have been described in connection with examples thereof, the true scope of the embodiments should not be so limited since other modifications will become apparent to the skilled practitioner upon a study of the drawings, specification, and following claims.

What is claimed is:

1. An accelerator device comprising:
   a first memory device;
   a graphics processor coupled with the first memory device; and
   circuitry coupled with the first memory device and the graphics processor, the circuitry configured to:
      receive a request to page out a first memory page of the first memory device to a second memory device, wherein the first memory page is configured to store encrypted data that is encrypted based on a hardware physical address (HPA) of the data;
      decrypt the encrypted data
      generate a message authentication code (MAC) of the first memory page;
      store the MAC to a slot within a second memory page of the first memory device, wherein the slot within the second memory page corresponds with a first counter value of a counter included within the circuitry;
      encrypt the first memory page via a first page key and the first counter value to generate an encrypted first memory page; and
      copy the encrypted first memory page to the second memory device.

2. The accelerator device as in claim 1, wherein the circuitry is configured to:
   store the first counter value to first memory page metadata associated with the first memory page;
   store a second counter value associated with the second memory page to the first memory page metadata; and
   copy the first memory page metadata to the second memory device.

3. The accelerator device as in claim 2, wherein the circuitry is configured to:
   receive a request to page in the encrypted first memory page to the first memory device;
   determine the slot within the second memory page that stores the MAC of the first memory page based on the first counter value stored to the first memory page metadata;
   decrypt the encrypted first memory page via the first page key and the first counter value;
   verify the first memory page based on the MAC of to the slot within the second memory page;
   upon verification of the first memory page, encrypting data of the first memory page based on the HPA to which the data is to be stored; and
   store the first memory page to the first memory device.

4. The accelerator device as in claim 1, wherein the second memory page is stored to an access limited portion of the first memory device.

5. The accelerator device as in claim 4, wherein the circuitry is configured to:
   receive a request to page out the second memory page from the access limited portion of the first memory device;
   encrypt the second memory page via a second page key and a second counter value associated with the second memory page to generate an encrypted second memory page, wherein the second page key differs from the first page key; and
   copy the encrypted second memory page from the access limited portion of the first memory device.

6. The accelerator device as in claim 5, wherein the circuitry is configured to copy the encrypted second memory page to the second memory device.

7. The accelerator device as in claim 5, wherein the circuitry is configured to:
   initialize a successive instance of the second memory page in the access limited portion of the first memory device; and
   store second memory page metadata to the successive instance of the second memory page, the second memory page metadata including a MAC value of the encrypted second memory page, the second counter value, and a third counter value, wherein the third counter value is associated with the successive instance of the second memory page.

8. The accelerator device as in claim 7, wherein the circuitry is configured to:
   receive a request to page in the encrypted second memory page to the access limited portion of the first memory device;
   load the MAC value of the encrypted second memory page and the second counter value from the second memory page metadata of the successive instance of the second memory page;
   load the encrypted second memory page;
   decrypt the encrypted second memory page via the second page key and the second counter value; and
   store the second memory page to the access limited portion of the first memory device.

9. The accelerator device as in claim 1, wherein the second memory device is external to the accelerator device and couples with the accelerator device via a system interconnect.

10. The accelerator device as in claim 1, wherein the second memory device is a non-volatile memory device.

11. A method comprising:
   determining to page out a first memory page that includes data that is encrypted according to a hardware physical address (HPA) of the data, wherein the first memory page is associated with device memory of an accelerator device;

determining if a slot is available in a second memory page to store a message authentication code (MAC) of the first memory page, the second memory page stored in an access limited portion of the device memory of the accelerator device;

in response to a determination that a slot is available in the second memory page to store the MAC of the first memory page, issuing a first instruction to trusted hardware of the accelerator device to evict the first memory page from the device memory of the accelerator device, wherein the trusted hardware is configured to store the MAC of the first memory page to the slot in the second memory page; and in response to a determination that a slot is not available in the second memory page to store the MAC of the first memory page:

issuing a second instruction to the trusted hardware to evict the second memory page from the access limited portion of the device memory of the accelerator device; and issuing the first instruction to the trusted hardware, wherein the trusted hardware is configured to store the MAC of the first memory page to a slot in a successive instance of the second memory page.

12. The method as in claim 11, wherein the trusted hardware, in response to the first instruction, is configured to decrypt data that is encrypted according to the HPA of the data, encrypt the first memory page according to a first page key to generate an encrypted first memory page, and copy the encrypted first memory page to host memory of a data processing system that includes the accelerator device.

13. The method as in claim 12, further comprising:

determining to page in the encrypted first memory page;

determining the instance of the second memory page that stores the MAC of the first memory page;

issuing a third instruction to the trusted hardware to page in the instance of the second memory page that stores the MAC of the first memory page; and issuing a fourth instruction to the trusted hardware to page in the encrypted first memory page, wherein the trusted hardware is configured to decrypt the encrypted first memory page, verify the first memory page based on the MAC of the first memory page, and upon verification of the first memory page, encrypting data of the first memory page based on the HPA to which the data is to be stored.

14. The method as in claim 12, further comprising determining the instance of the second memory page that stores the MAC of the first memory page based on metadata associated with the first memory page.

15. A data processing system comprising:

a host processor;

host memory coupled with the host processor;

an accelerator device including accelerator device memory, a graphics processor coupled with the device memory, and circuitry coupled with the accelerator device memory and the graphics processor, circuitry configured to:

receive a request to page out a first memory page of the accelerator device memory device to the host memory, wherein the first memory page is configured to store encrypted data that is encrypted based on a hardware physical address (HPA) of the data;

decrypt the encrypted data;

generate a message authentication code (MAC) of the first memory page;

store the MAC to a slot within a second memory page of the accelerator device memory, wherein the slot within the second memory page corresponds with a first counter value of a counter included within the circuitry;

encrypt the first memory page via a first page key and the first counter value to generate an encrypted first memory page; and copy the encrypted first memory page to the host memory.

16. The data processing system as in claim 15, wherein the circuitry is configured to:

store the first counter value to first memory page metadata associated with the first memory page;

store a second counter value associated with the second memory page to the first memory page metadata; and copy the first memory page metadata to the host memory.

17. The data processing system as in claim 16, wherein the circuitry is configured to:

receive a request to page in the encrypted first memory page to the accelerator device memory;

determine the slot within the second memory page that stores the MAC of the first memory page based on the first counter value stored to the first memory page metadata;

decrypt the encrypted first memory page via the first page key and the first counter value;

verify the first memory page based on the MAC of to the slot within the second memory page;

upon verification of the first memory page, encrypting data of the first memory page based on the HPA to which the data is to be stored; and store the first memory page to the accelerator device memory.

18. The data processing system as in claim 15, wherein the second memory page is stored to an access limited portion of the first accelerator device memory and the circuitry is configured to:

receive a request to page out the second memory page from the access limited portion of the accelerator device memory;

encrypt the second memory page via a second page key and a second counter value associated with the second memory page to generate an encrypted second memory page, wherein the second page key differs from the first page key;

copy the encrypted second memory page from the access limited portion of the accelerator device memory;

initialize a successive instance of the second memory page in the access limited portion of the accelerator device memory; and store second memory page metadata to the successive instance of the second memory page, the second memory page metadata including a MAC value of the encrypted second memory page, the second counter value, and a third counter value, wherein the third counter value is associated with the successive instance of the second memory page.

19. The data processing system as in claim 18, wherein the circuitry is configured to:

receive a request to page in the encrypted second memory page to the access limited portion of the accelerator device memory;

load the MAC value of the encrypted second memory page and the second counter value from the second memory page metadata of the successive instance of the second memory page;

load the encrypted second memory page;

decrypt the encrypted second memory page via the second page key and the second counter value; and store the second memory page to the access limited portion of the accelerator device memory.

\* \* \* \* \*